(12) United States Patent
Barel et al.

(10) Patent No.: US 11,840,247 B2
(45) Date of Patent: Dec. 12, 2023

(54) SYSTEM AND METHOD FOR DEFINING A SPECIFICATION OF A VEHICLE

(71) Applicant: REE AUTOMOTIVE LTD., Kibbutz Glil Yam (IL)

(72) Inventors: Daniel Barel, Herzliya (IL); Keren Shemesh, Herzliya (IL); Ran Dekel, Nofit (IL); Damian Andrew Harty, Staffordshire (GB); Ami Berger, Tel Aviv (IL); Kimberly Mathers, Windsor (CA)

(73) Assignee: REE Automotive Ltd., Kibbutz Glil-Yam (IL)

( * ) Notice: Subject to any disclaimer, the term of this patent is extended or adjusted under 35 U.S.C. 154(b) by 0 days.

(21) Appl. No.: 17/992,013

(22) Filed: Nov. 22, 2022

(65) Prior Publication Data

US 2023/0099914 A1 Mar. 30, 2023

Related U.S. Application Data

(63) Continuation of application No. PCT/IB2022/053092, filed on Apr. 3, 2022.
(Continued)

(51) Int. Cl.
*B62D 63/02* (2006.01)
*B60W 50/08* (2020.01)
*B60W 50/00* (2006.01)

(52) U.S. Cl.
CPC ......... *B60W 50/085* (2013.01); *B62D 63/025* (2013.01); *B60W 2050/0063* (2013.01)

(58) Field of Classification Search
CPC . B60W 2510/08; B60L 2270/40; B60L 50/66; B60L 3/04; B60L 3/12; B60L 50/60; B60L 1/02; B60L 2200/46; B60L 3/0023; B60L 15/20; B60L 2200/40; B60L 58/10; B60L 2210/10; B60L 2240/28; B60L 2240/34; B60L 2240/42; B60L 50/50;
(Continued)

(56) References Cited

U.S. PATENT DOCUMENTS 10,081,387 B2 * 9/2018 El Aile ................. B62D 6/007
10,259,514 B2 * 4/2019 Kentley-Klay ........ B60Q 5/006
(Continued)

OTHER PUBLICATIONS

International search report for PCT/IB2022/053092 dated Oct. 12, 2022.
(Continued)

*Primary Examiner* — Masud Ahmed
(74) *Attorney, Agent, or Firm* — Marc Van Dyke; Momentum IP

(57) ABSTRACT

Methods, systems, and networks for controlling design and manufacture of mechanically and electrically compliant VCM-based vehicles, in which a user manually and explicitly defines at least one vehicle characteristic and at least one VCM characteristic. User selection of one or more vehicle characteristics ensures that the selection of VCM characteristics will be that of VCM characteristics compatible with the selected vehicle characteristics. Similarly, user selection of one or more VCMs or VCM characteristics ensures that the selection of vehicle characteristics will be that of vehicle characteristics compatible with the selected VCM or VCM characteristics.

5 Claims, 59 Drawing Sheets

Related U.S. Application Data

(60) Provisional application No. 63/173,460, filed on Apr. 11, 2021.

(58) Field of Classification Search
CPC ............. B60L 2200/36; B60L 2260/32; B60L 3/0007; B60L 3/0092; B60L 1/003; B60L 15/32; B60L 2200/44; B60L 2220/42; B60L 2240/12; B60L 2240/20; B60L 2240/622; B60L 2240/662; B60L 2260/50; B60L 50/15; B60L 50/61; B60L 53/51; B60L 53/65; B60L 53/80; B60L 7/12; B60L 15/2009; B60L 15/2036; B60L 15/42; B60L 2200/26; B60L 2200/28; B60L 2200/30; B60L 2210/20; B60L 2220/20; B60L 2220/46; B60L 2240/16; B60L 2240/18; B60L 2240/24; B60L 2240/36; B60L 2240/421; B60L 2240/423; B60L 2240/441; B60L 2240/445; B60L 2240/461; B60L 2240/545; B60L 2240/547; B60L 2240/549; B60L 2240/625; B60L 2240/72; B60L 2250/16; B60L 2250/20; B60L 2250/26; B60L 2260/28; B60L 2260/54; B60L 2270/145; B60L 3/0015; B60L 3/003; B60L 3/0046; B60L 3/0076; B60L 3/102; B60L 50/00; B60L 50/16; B60L 50/30; B60L 50/40; B60L 50/52; B60L 50/64; B60L 50/71; B60L 50/75; B60L 53/12; B60L 53/52; B60L 53/63; B60L 53/665; B60L 58/12; B60L 58/16; B60L 58/18; B60L 7/04; B60L 8/003; B60L 2210/00

See application file for complete search history.

(56) References Cited

U.S. PATENT DOCUMENTS

| | | | | |
|---|---|---|---|---|
| 10,479,427 | B2* | 11/2019 | Scaringe | B60K 1/04 |
| 11,186,217 | B2* | 11/2021 | Honda | G06Q 10/1093 |
| 11,305,936 | B2* | 4/2022 | Sullivan | B66F 9/065 |
| 2005/0252305 | A1* | 11/2005 | Hubbard | B60W 20/30 73/860 |
| 2005/0255964 | A1* | 11/2005 | Heap | B60W 10/08 477/3 |
| 2005/0256623 | A1* | 11/2005 | Hubbard | B60W 10/08 701/54 |
| 2016/0129958 | A1* | 5/2016 | Byrnes | B60L 15/32 180/12 |
| 2017/0197678 | A1* | 7/2017 | Scaringe | B60K 1/00 |
| 2021/0001940 | A1* | 1/2021 | Claesson | B62D 63/04 |

OTHER PUBLICATIONS

International search opinion for PCT/IB2022/053092 dated Oct. 12, 2022.

* cited by examiner

CONSTRAINT-ENGINE

INSTRUCTIONS TO COMPUTE, FOR THE SELECTED INITIAL VEHICLE CHARACTERISTIC(S), VCM-RELATED MECHANICAL AND ELECTRICAL CONSTRAINTS ON A PLURALITY OF VCM CHARACTERISTICS, WHICH CONSTRAINTS ARE REQUIRED FOR THE VEHICLE TO BE COMPLIANT 150

INSTRUCTIONS TO COMPUTE, FOR SELECTED INITIAL VEHICLE CHARACTERISTIC(S), ADDITIONAL MECHANICAL AND ELECTRICAL CONSTRAINTS ON A PLURALITY OF ADDITIONAL VEHICLE CHARACTERISTICS, WHICH CONSTRAINTS ARE REQUIRED FOR THE VEHICLE TO BE COMPLIANT 152

COMPATIBILITY-ENGINE

INSTRUCTIONS TO COMPUTE A FIRST SUBSET OF VCM CHARACTERISTICS THAT ARE COMPATIBLE WITH THE VCM-RELATED MECHANICAL AND ELECTRICAL CONSTRAINTS 160

INSTRUCTIONS TO PROVIDE THE FIRST SUBSET OF VCM CHARACTERISTICS TO THE DISPLAY-ENGINE IN A SPECIFIC ORDER 162

INSTRUCTIONS TO COMPUTE A SECOND SUBSET OF ADDITIONAL VEHICLE CHARACTERISTICS THAT ARE COMPATIBLE WITH THE ADDITIONAL MECHANICAL AND ELECTRICAL CONSTRAINTS 164

INSTRUCTIONS TO PROVIDE THE SECOND SUBSET OF ADDITIONAL VEHICLE CHARACTERISTICS TO THE DISPLAY-ENGINE IN A SECOND SPECIFIC ORDER 166

ORDERING-ENGINE

INSTRUCTIONS TO RECEIVE SELECTION OF VCM CHARACTERISTIC(S) COMPATIBLE WITH THE VCM-RELATED MECHANICAL AND ELECTRICAL CONSTRAINTS 170

INSTRUCTIONS TO RECEIVE SELECTION OF VCM CHARACTERISTIC(S) COMPATIBLE WITH THE VCM-RELATED MECHANICAL AND ELECTRICAL CONSTRAINTS 174

INSTRUCTIONS TO GENERATE A SPECIFICATION OF A MECHANICALLY AND ELECTRICALLY COMPLIANT VCM-BASED VEHICLE BASED ON THE SELECTED INITIAL VEHICLE CHARACTERISTIC(S) AND THE SELECTED VCM(S) 172

INSTRUCTIONS TO GENERATE AN ENGINEERING DESIGN SPECIFICATION FOR THE MECHANICALLY AND ELECTRICALLY COMPLIANT VCM-BASED VEHICLE 176

INSTRUCTIONS TO ELECTRONICALLY TRANSMIT THE ENGINEERING DESIGN SPECIFICATION TO A MANUFACTURING FACILITY 178

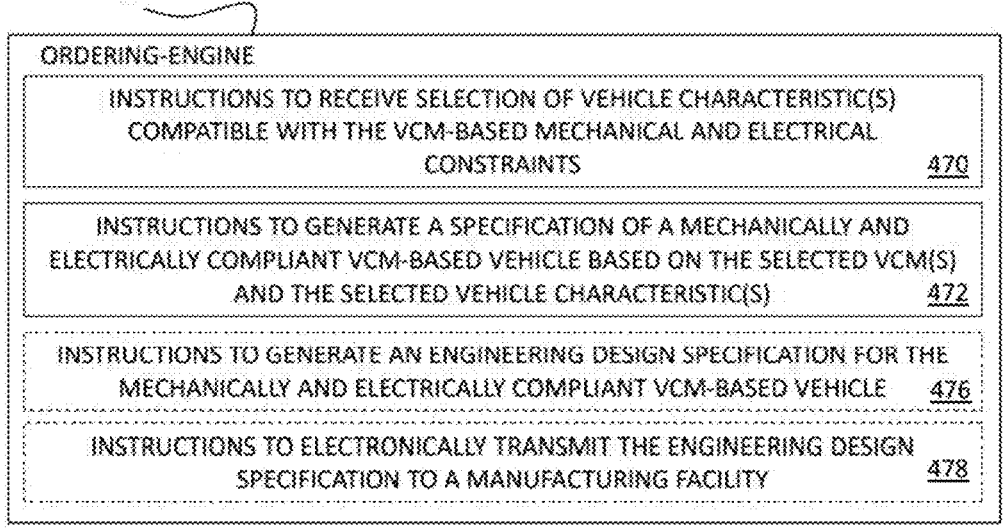
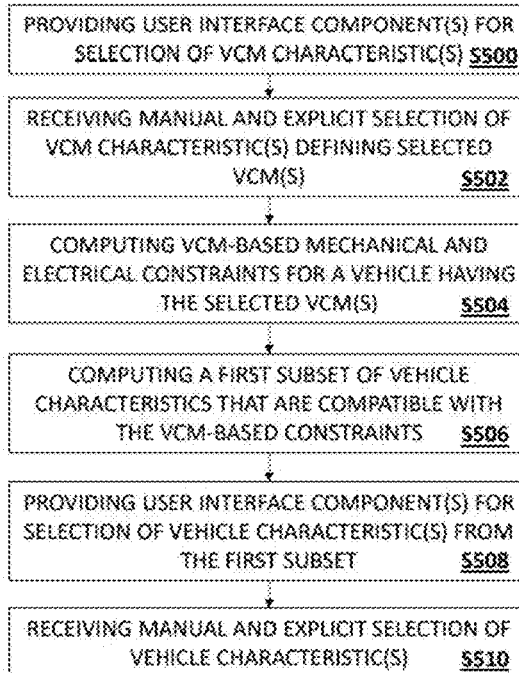
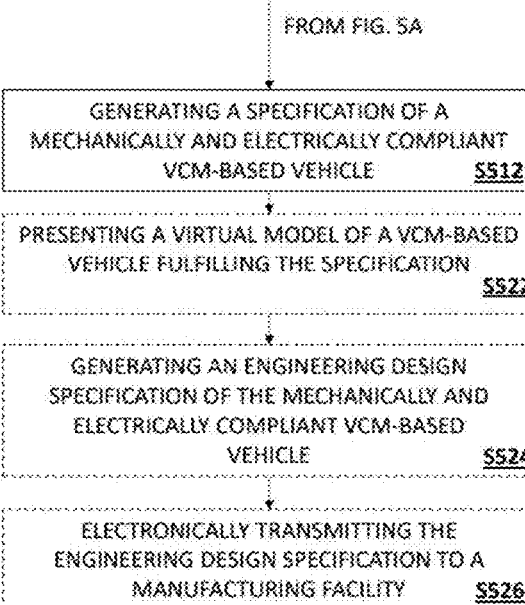

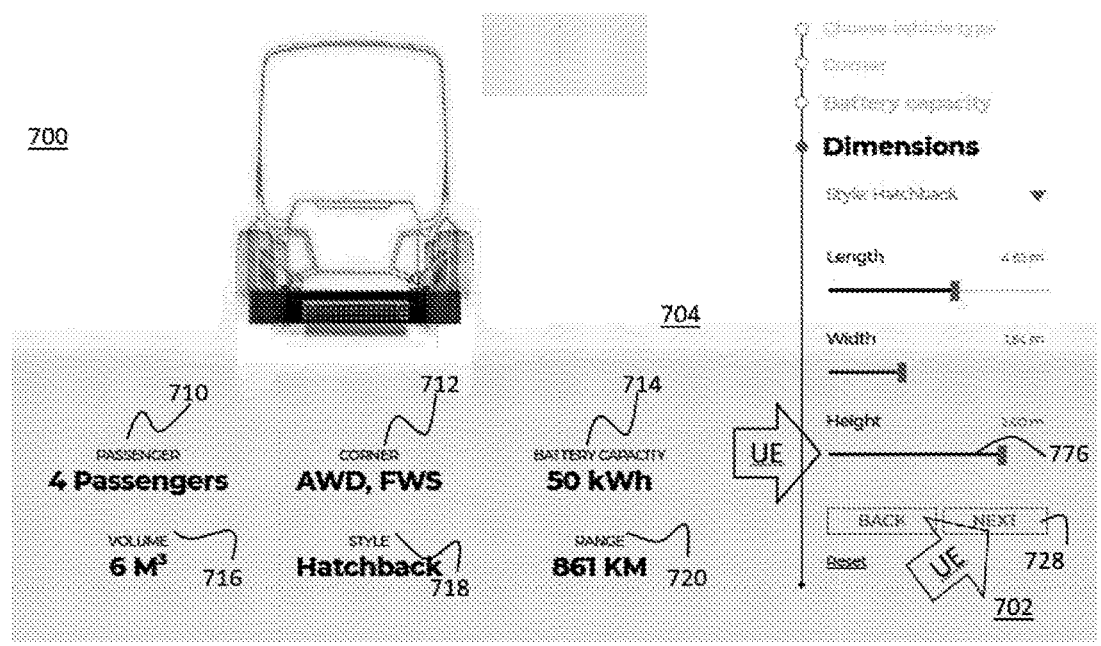

FIG. 8W

YOUR PLATFORM

  

Corner & Battery
AWD Drive by wire
FWS Steer by wire
20 kW x 4 Motor
50 kWh Battery capacity
861 km Range
Regenerative single wheel brake-by-wire Type & Architecture
Passenger Vehicle type style
4 Passengers Payload
Urban Usage
5 ECU Zone electronics architecture
ASIL-D, ISO 26262 Safety standards
Autonomous Ready
OTA updates Dimensions
Hatchback Body style
4.63 m Length
1.54 m Width
2 m Vehicle height
6 M³ Volume

FIG. 8X

THIS IS WHAT CAN BE DONE WITH IT

YOUR PLATFORM

  

Corner & Battery

AWD Drive by wire

FWS Steer by wire

30 kW x 4 Motor

30 kWh Battery capacity

372 km Range

Regenerative single wheel brake-by-wire

Type & Architecture

Passenger Vehicle type style

4 Passengers Payload

Urban/ Highway mix Usage

5 ECU Zone electronics architecture

ASIL-D, ISO 26262 Safety standards

Autonomous Ready

OTA updates

Dimensions

Robotaxi Body style

2.35 m Length

1.06 m Width

2.05 m Vehicle height

1 M³ Volume

FIG. 9X

THIS IS WHAT CAN BE DONE WITH IT

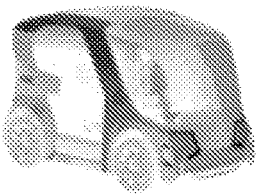 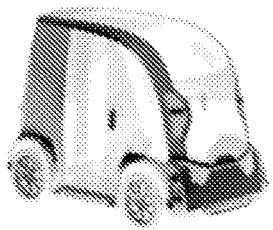

FIG. 9Y

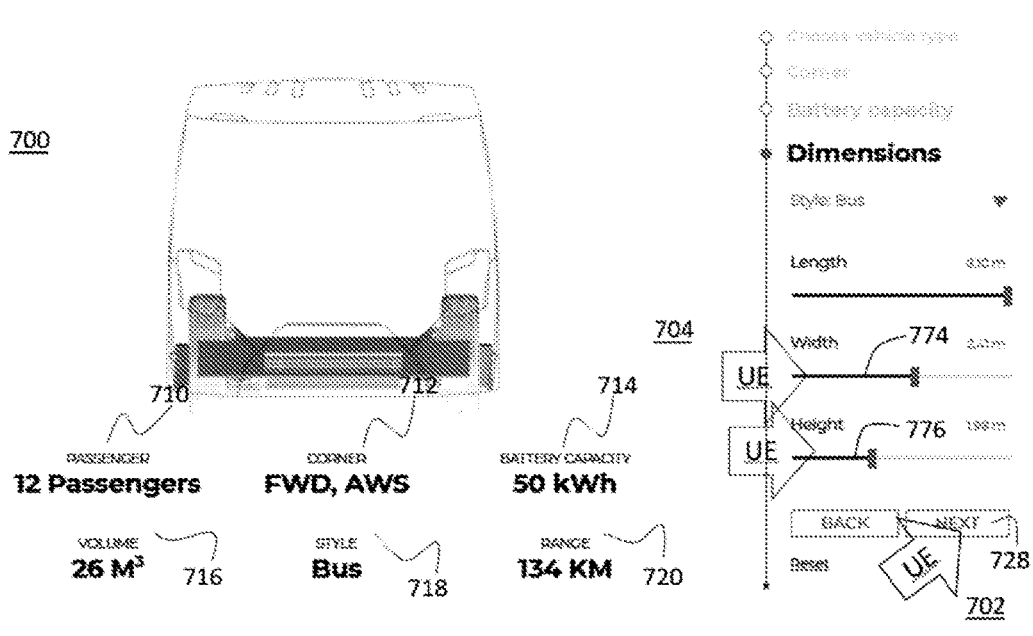

FIG. 10W

YOUR PLATFORM

Corner & Battery

FWD Drive by wire

AWS Steer by wire

100 kW x 4 Motor

50 kWh Battery capacity

134 km Range

Regenerative single wheel brake-by-wire

Type & Architecture

Passenger Vehicle type style

12 Passengers Payload

Urban/ Highway mix Usage

5 ECU Zone electronics architecture

ASIL-D, ISO 26262 Safety standards

Autonomous Ready

OTA updates

Dimensions

Bus Body style

8.1 m Length

2.41 m Width

1.98 m Vehicle height

26 M³ Volume

FIG. 10X

THIS IS WHAT CAN BE DONE WITH IT

YOUR PLATFORM

  

Corner & Battery

AWD Drive by wire

AWS Steer by wire 30 kW x 4 Motor 40 kWh Battery capacity 533 km Range

Regenerative single wheel brake-by-wire

Type & Architecture

Cargo Vehicle type style

350 Kg Payload

Urban/ Highway mix Usage

5 ECU Zone electronics architecture

ASIL-D, ISO 26262 Safety standards

Autonomous Ready

OTA updates

Dimensions

Last Mile Delivery Body style 2.43 m Length 1.01 m Width 1.1 m Vehicle height

1 M³ Volume

FIG. 11X

THIS IS WHAT CAN BE DONE WITH IT

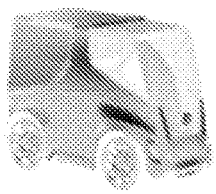 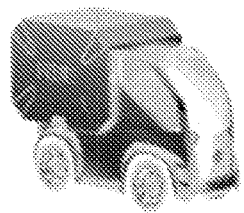 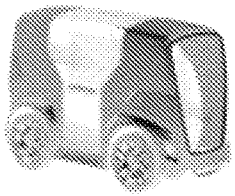

FIG. 11Y

SYSTEM AND METHOD FOR DEFINING A SPECIFICATION OF A VEHICLE

CROSS-REFERENCE TO RELATED APPLICATIONS

PCT/IB2022/053092, filed on Apr. 3, 2022, is incorporated herein by reference in its entirety.

BACKGROUND OF THE INVENTION

In recent years, autonomous and electronic cars have been developed. One of the technologies that assists in the development of autonomous and electronic cars is that of the vehicle-corner-module (VCM), which are typically mounted to the wheels, and as such are also known as wheel-corner-modules.

VCMs are electro-mechanical systems related to vehicular motion control, and are based on a modular design around the geometric boundaries of a conventional wheel. The typical VCM may include one or more of an electrical wheel propulsion motor, a friction brake, a steering system and a suspension system, as well as one or more subsystems responsible for longitudinal, lateral, and vertical motion of the vehicle.

There is therefore a need in the art for a system and a method for controlling manufacture of electrically and mechanically compliant VCM-based vehicles.

SUMMARY OF EMBODIMENTS OF THE INVENTION

Some embodiments of the invention relate to methods and systems for controlling design and manufacture of mechanically and electrically compliant VCM-based vehicles, in which a user manually and explicitly defines at least one vehicle characteristic and at least one VCM characteristic.

There is thus provided, in accordance with an embodiment of the teachings herein, a method of controlling manufacture of a mechanically and electrically compliant Vehicle-Corner-Module (VCM) based vehicle, the method including:
a. providing to a display device, associated with a user-operated device, one or more user interface components for manual and explicit selection of one or more initial vehicle characteristics of the vehicle for display thereon;
b. receiving manual and explicit selection of one or more selected initial vehicle characteristics;
c. for the one or more selected initial vehicle characteristics, computing VCM-related mechanical and electrical constraints on a plurality of VCM characteristics, which mechanical and electrical constraints are required for the VCM-based vehicle having the one or more selected initial vehicle characteristics to be compliant;
d. computing a first subset of the plurality of VCM characteristics which are compatible with the VCM-related mechanical and electrical constraints, the first subset being a proper subset of the VCM characteristics;
e. for each VCM characteristic in the first subset, providing to the display device one or more respective user interface components for manual and explicit selection of the VCM characteristic for display thereon, wherein, for each the VCM characteristic, the one or more respective user interface components are provided for display in a specific order;
f. responsive to manual and explicit selection of one or more VCM characteristics in the first subset defining one or more selected VCMs, generating a specification of a mechanically and electrically compliant VCM-based vehicle including the selected initial vehicle characteristics and the one or more selected VCMs.

In some embodiments, the method further includes:
g. at least for the one or more selected initial vehicle characteristics, computing additional mechanical and electrical constraints on a plurality of additional vehicle characteristics of the vehicle, which mechanical and electrical constraints are required for the VCM-based vehicle to be compliant;
h. computing a second subset of the plurality of additional vehicle characteristics which are compatible with the additional VCM-based mechanical and electrical constraints, the second subset being a proper subset of the additional vehicle characteristics; and
i. for each additional vehicle characteristic in the second subset, providing to the display device one or more respective user interface components for manual and explicit selection of the additional vehicle characteristic for display thereon, wherein, for each the additional vehicle characteristic, the one or more respective user interface components are provided for display in a second specific order; and
wherein the generating of the specification of the mechanically and electrically compliant VCM-based vehicle is also responsive to manual and explicit selection of one or more additional vehicle characteristics in the second subset.

There is further provided, in accordance with another embodiment of the teachings herein, a system for defining a specification of a mechanically and electrically compliant Vehicle-Corner-Module (VCM)-based vehicle, the system including:
a server network interface for connection to at least one network, the at least one network including at least one other device or system having a user interface including at least one input interface and at least one display;
at least one server processor; and
at least one server storage medium for instructions execution by the at least one server processor, the server storage medium having stored:
instructions forming a display-engine, including:
instructions to provide to the at least one other device or system, for display on the at least one display, one or more user interface components for manual and explicit selection of one or more initial vehicle characteristics of the vehicle;
instructions to receive the manual and explicit selection of the one or more initial vehicle characteristics;
instructions to provide to the at least one other device or system, for display on the at least one display, one or more user interface components for manual and explicit selection of one or more VCM characteristics, which VCM characteristics are compatible with the one or more selected initial vehicle characteristics; and
instructions to receive the manual and explicit selection of the one or more VCM characteristics defining selected VCMs;
instructions, forming a constraint-engine, to compute, for the one or more selected initial vehicle characteristics, VCM-related mechanical and electrical constraints on a plurality of VCM characteristics, which VCM-related mechanical and electrical constraints are required for the vehicle including the one or more selected initial vehicle characteristics to be compliant;

instructions forming a compatibility-engine, including:
  instructions to compute a first subset of the plurality of VCM characteristics that are compatible with the VCM-related mechanical and electrical constraints, the first subset being a proper subset of the plurality of VCM characteristics; and
  instructions to provide the VCM characteristics in the first subset, to the display engine, in a specific order; and instructions forming an ordering-engine, including:
  instructions to receive from the display-engine manual and explicit selection of the one or more VCM characteristics compatible with the VCM-related mechanical and electrical constraints; and
  instructions to generate a specification of a mechanically and electrically compliant CVM-based vehicle based on the one or more selected VCMs and the one or more selected initial vehicle characteristics.

There is also provided, in accordance with yet another embodiment of the teachings herein, a network designed for defining a specification of a mechanically and electrically compliant Vehicle-Corner-Module (VCM)-based vehicle by a user using a computing device at a first network node on the network, the computing device associated with at least one input interface and with at least one display, data sent via the network including, in order:

a. one or more of one or more user interface components, rules, or datasets for manual and explicit selection of one or more initial vehicle characteristics for display on the at least one display;
b. manual and explicit selection, by the user, of one or more initial vehicle characteristics;
c. one or more of one or more user interface components, rules, or datasets for manual and explicit selection of one or more VCM characteristics which are compatible with mechanical and electrical constraints required for a vehicle including the one or more selected initial vehicle characteristics to be compliant;
d. manual and explicit selection of one or more the compatible VCM characteristics to define one or more selected VCMs; and
e. a specification of a mechanically and electrically compliant VCM-based vehicle including the one or more selected initial vehicle characteristics and the selected one or more VCMs.

In some embodiments, data sent via the network further includes:

f. one or more of one or more user interface components, rules, or datasets for manual and explicit selection of one or more additional vehicle characteristics which are compatible with mechanical and electrical constraints required for a vehicle including the one or more selected initial vehicle characteristics to be compliant; and
g. manual and explicit selection of one or more the compatible additional vehicle characteristics,
  wherein the specification of the mechanically and electrically compliant VCM-based vehicle is also responsive to manual and explicit selection of one or more additional vehicle characteristics in the second subset.

There is additionally provided, in accordance with an additional embodiment of the teachings herein, a method of controlling manufacture of a mechanically and electrically compliant Vehicle-Corner-Module (VCM) based vehicle, the method including:

a. providing to a display device, one or more user interface components for manual and explicit selection of one or more VCM characteristics of one or more VCMs for display thereon;
b. receiving manual and explicit selection of one or more VCM characteristics of one or more VCMs, to define one or more selected VCMs;
c. for the one or more selected VCMs, computing VCM-based mechanical and electrical constraints on a plurality of vehicle characteristics of the vehicle, which VCM-based mechanical and electrical constraints are required for the vehicle including the one or more selected VCMs to be compliant;
d. computing a subset of the plurality of vehicle characteristics which are compatible with the VCM-based mechanical and electrical constraints, the subset being a proper subset of the plurality of vehicle characteristics;
e. for each vehicle characteristic in the subset, providing to the display device one or more respective user interface components for manual and explicit selection of the vehicle characteristic for display thereon, wherein, for each the vehicle characteristic, the one or more respective user interface components are provided for display in a specific order; and
f. responsive to manual and explicit selection of one or more vehicle characteristics in the subset, generating a specification of a mechanically and electrically compliant VCM-based vehicle including the one or more selected VCMs and the selected one or more vehicle characteristics.

There is further provided, in accordance with another embodiment of the teachings herein, a system for defining a specification of a mechanically and electrically compliant Vehicle-Corner-Module (VCM)-based vehicle, the system including:

a server network interface for connection to at least one network, the at least one network including at least one other device or system having a user interface including at least one input interface and at least one display;
at least one server processor; and
at least one server storage medium for instructions execution by the at least one server processor, the server storage medium having stored:
  instructions forming a display-engine, including:
    instructions to provide to the at least one other device or system, for display on the at least one display, one or more user interface components for manual and explicit selection of one or more VCM characteristics;
    instructions to receive the manual and explicit selection of the one or more VCM characteristics, thereby to define one or more selected VCMs;
    instructions to provide to the at least one other device or system, for display on the at least one display, one or more user interface components for manual and explicit selection of one or more vehicle characteristics of the vehicle, which vehicle characteristics are compatible with the one or more selected VCMs; and
    instructions to receive the manual and explicit selection of the one or more vehicle characteristics;

instructions, forming a constraint-engine, to compute, for the one or more selected VCMs, VCM-based mechanical and electrical constraints on a plurality of vehicle characteristics of the vehicle, which VCM-based mechanical and electrical constraints are required for the vehicle including the one or more selected VCMs to be compliant;

instructions forming a compatibility-engine, including:
  instructions to compute a subset of the plurality of vehicle characteristics that are compatible with the VCM-based mechanical and electrical constraints, the subset being a proper subset of the plurality of vehicle characteristics; and
  instructions to provide the vehicle characteristics in the subset, to the display engine, in a specific order; and instructions forming an ordering-engine, including:
  instructions to receive from the display-engine manual and explicit selection of the one or more vehicle characteristics compatible with the VCM-based mechanical and electrical constraints; and
  instructions to generate a specification of a mechanically and electrically compliant CVM-based vehicle based on the one or more selected VCMs and the selected one or more vehicle characteristics.

There is also provided, in accordance with yet another embodiment of the teachings herein, a network designed for defining a specification of a mechanically and electrically compliant Vehicle-Corner-Module (VCM)-based vehicle by a user using a computing device at a first network node on the network, the computing device associated with at least one input interface and with at least one display, data sent via the network including, in order:

one or more of one or more user interface components, rules, or datasets for manual and explicit selection of one or more VCM characteristics of one or more VCMs for display on the at least one display;

manual and explicit selection, by the user, of one or more VCM characteristics of one or more VCMs, to define one or more selected VCMs;

one or more of one or more user interface components, rules, or datasets for manual and explicit selection of one or more vehicle characteristics which are compatible with mechanical and electrical constraints required for a vehicle including the one or more selected VCMs to be compliant;

manual and explicit selection of one or more vehicle characteristics in the proper subset; and a specification of a mechanically and electrically compliant VCM-based vehicle including the one or more selected VCMs and the selected one or more vehicle characteristics.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof.

BRIEF DESCRIPTION OF THE FIGURES

FIGS. 1B-1E are schematic block diagrams of software operational-engines forming part of the system of FIG. 1A;

FIGS. 4B-4E are schematic block diagrams of software operational-engines forming part of the system of FIG. 4A;

FIGS. 5A and 5B together are a flow chart of a method for controlling design and manufacture of a mechanically and electrically compliant VCM-based vehicle according to another embodiment of the disclosed technology;

DETAILED DESCRIPTION OF SOME EMBODIMENTS OF THE INVENTION

Figure 1A:
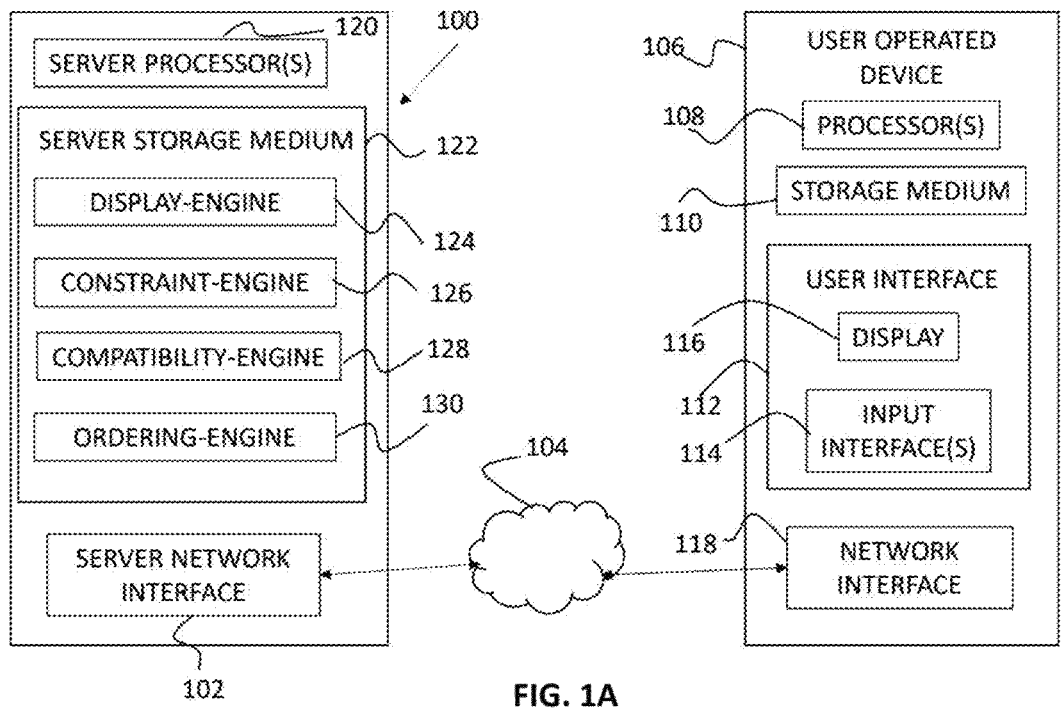
FIG. 1A is a schematic block diagram of a system for controlling design and manufacture of a mechanically and electrically compliant VCM-based vehicle according to an embodiment of the disclosed technology.

The invention, in some embodiments, relates to methods and systems for controlling design and manufacture of mechanically and electrically compliant VCM-based vehicles, in which a user manually and explicitly defines at least one vehicle characteristic and at least one VCM characteristic.

The present disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

As discussed hereinabove in the "Background" section, the present invention relates to VCM-based vehicles. Generally, in such vehicles, the braking, steering and suspension systems are controlled by means of electrical or electro-mechanical actuators and linkages, which are operated upon input from a control system. VCMs according to the present invention are designed to easily attach to a vehicle platform constructed for the specific purpose, for example by means of bolted connections and/or a power connector. All functions are controlled via an electrical system, connecting the steering column to the VCM. VCM-based vehicle according to present invention may contain two or four VCMs.

There are many challenges in configuration of VCM-based vehicles. For example, the modularity of VCMs provides tremendous flexibility to vehicle manufacturers and designers, as well as to end users, in configuring custom-made VCM-based vehicles. However, the engineering of such VCM-based vehicles defines unique VCM-specific limiting factors to the configuration of such vehicles, which are often unknown to, or overlooked by, vehicle designers. For example, due to the extreme modularity provided by VCMs, a vehicle designer may design a VCM-based vehicle which is theoretically possible, but which is mechanically and/or electrically unsound, or has severe safety faults or flaws.

As such, configuration of a VCM-based vehicle is highly error prone, and can result in electrically and/or mechanically non-compliant vehicles, particularly when the person carrying out the configuring is not someone skilled in the art of VCM-based vehicles.

The present invention solves this problem, as well as other problems, by providing a system and a method for controlling manufacture of electrically and mechanically compliant VCM-based vehicles. More specifically, the present invention allows a user to configure, based on selection of available options, VCM-based vehicles which are electrically and mechanically compliant and safe, and which meet the specific engineering constraints and limitations which are unique to VCM-based vehicles.

Reference is now made to FIG. 1A, which is a schematic block diagram of a system 100 for controlling design and manufacture of a mechanically and electrically compliant VCM-based vehicle according to an embodiment of the disclosed technology, and to FIGS. 1B-1E, which are schematic block diagrams of software operational-engines forming part of system 100 of FIG. 1A.

As seen in FIG. 1A, system 100, which may be a server, includes a server network interface 102 for connection to at least one network 104. The network 104 includes at least one other user-operated device 106, which is typically another remote computing device. User-operated device 106 has one or more processors 108, at least one storage medium 110, which may be a non-transitory computer readable storage medium, storing instructions to be executed by processor(s) 108. User-operated device 106 further has, or is associated with, a user interface 112 including at least one input interface 114 and at least one display 116, as well as its own network interface 118 connected to network 104.

Input interface(s) 114 may include one or more of a keyboard, a mouse, a touch-screen, a touch-pad, a microphone, or any other device or mechanism suitable for providing input to processor(s) 108, as defined hereinbelow in the definitions section.

Display(s) 116 may include any suitable type of display, including a screen, a projector, and the like, provided that the display is functionally associated with input interface(s) 114 for the user to provide input based on, or relating to, displayed elements or components.

System 100 further includes at least one server-processor 120 and at least one server storage medium 122, which may be a non-transitory computer readable storage medium, storing instructions to be executed by server-processor(s) 120. Server storage medium(a) 122 includes instructions forming a display-engine 124, instructions forming a constraint-engine 126, instructions forming a compatibility-engine 128, and instructions forming an ordering-engine 130.

Figure 1B:
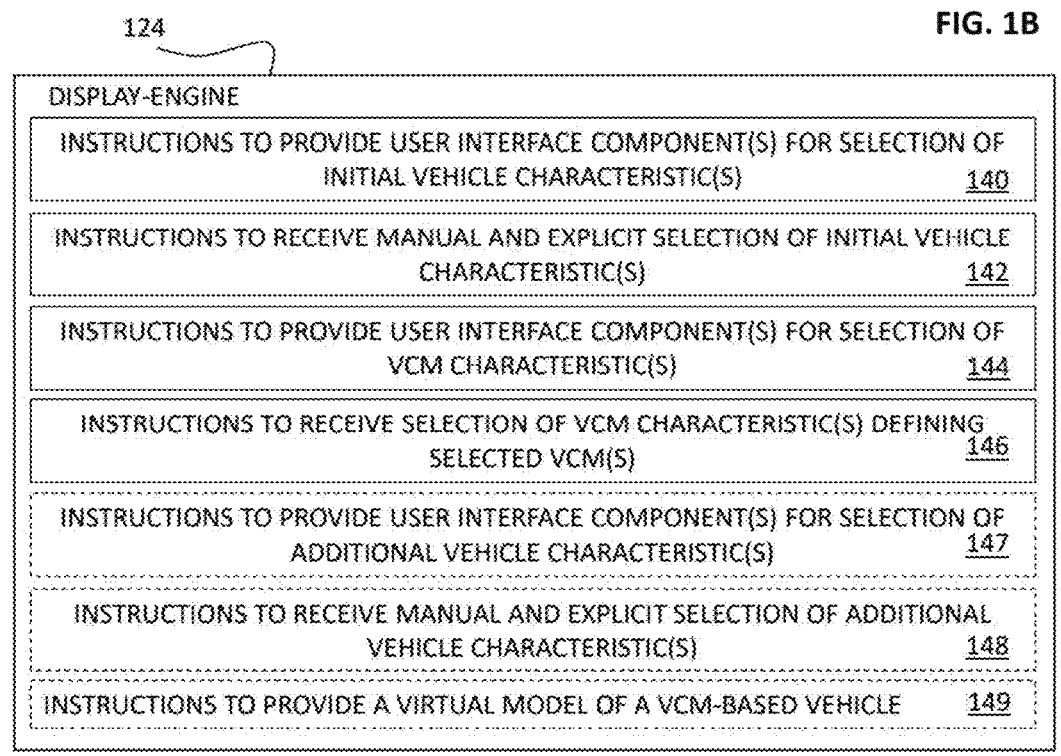

As seen in FIG. 1B, the instructions stored in server storage medium 122, which form part of display-engine 124, include:

Instructions 140 to provide to user-operated device 106, one or more user interface components for manual and explicit selection of one or more initial vehicle characteristics of the VCM-based vehicle. The user interface components are suitable for display on display(s) 116;

Instructions 142 to receive, from user-operated device 106, manual and explicit selection of one or more selected initial vehicle characteristics. Typically, the selected initial vehicle characteristic(s) was selected using input interface(s) 114, by a user interacting with the user interface components displayed on display(s) 116;

Instructions 144 to provide to user-operated device 106, one or more user interface components for manual and explicit selection of one or more VCM characteristics. The VCM characteristic(s) are compatible with selected initial vehicle characteristic(s). The user interface components are suitable for display on display(s) 116; and Instructions 146 to receive, from user-operated device 106, manual and explicit selection of one or more selected VCM characteristics, defining one or more selected VCMs. Typically, the selected VCM characteristic(s) was selected using input interface(s) 114, by a user interacting with the user interface components displayed on display(s) 116.

In some embodiments, instructions 144 include instructions to provide, as part of the user interface components for selection of VCM characteristic(s), a pre-defined range of data which is compatible with the selected initial vehicle characteristic(s). In some embodiments, instructions 144 include instructions to provide to user-operated device 106 user interface components for a plurality of VCM characteristics, some of which are incompatible with the selected initial vehicle characteristic(s), and to additionally provide logic rules for the processor of user-operated device 106 to limit the components for which user interface components are displayed to those which are compatible with the selected vehicle characteristic(s). In some embodiments, instructions 144 include instructions to provide to user-operated device 106 user interface components for a plurality of VCM characteristics, some of which are incompatible with the selected initial vehicle characteristic(s), and to additionally provide logic rules for the processor of user-operated device 106 to display only a subset of the user interface components which are compatible with the selected vehicle characteristic(s). In some embodiments, the user interface components and the logic rules are provided to the user-operated device separately. For example, all the plurality of user interface components, including compatible and incompatible user interface components, may be provided to the user-operated device in advance, and the logic rules may be provided following selection of the initial vehicle characteristic(s).

In some embodiments, the one or more selected VCMs include at least two VCMs, a first of the at least two VCMs being of a first type, and a second of the at least two VCMs being of a second type, the second type being different from the first type, as shown in the examples hereinbelow.

Instructions 144 and 146 are adapted to be executed following execution of instructions included in constraint-engine 126 and in compatibility engine 128, as explained in further detail hereinbelow.

In some embodiments, the instructions stored in server storage medium 122, which form part of display-engine 124 may further include:

Instructions 147 to provide to user-operated device 106, one or more additional user interface components for manual and explicit selection of one or more additional vehicle characteristics of the VCM-based vehicle. The additional vehicle characteristic(s) are compatible with selected initial vehicle characteristic(s), and in some cases also with the selected VCM(s) or VCM characteristic(s). The additional user interface components are suitable for display on display(s) 116; and instructions 148 to receive, from user-operated device 106, manual and explicit selection of one or more selected additional vehicle characteristics. Typically, the selected additional vehicle characteristic(s) was selected using input interface(s) 114, by a user interacting with the additional user interface components displayed on display(s) 116.

In some embodiments, instructions 147 include instructions to provide, as part of the user interface components for selection of additional vehicle characteristic(s), a pre-defined range of data which is compatible with the selected initial vehicle characteristic(s). In some embodiments, instructions 147 include instructions to provide to user-operated device 106 user interface components for a plurality of additional vehicle characteristics, some of which are incompatible with the selected initial vehicle characteristic(s), and to additionally provide logic rules for the processor of user-operated device 106 to limit the components for which user interface components are displayed to those which are compatible with the selected initial vehicle characteristic(s). In some embodiments, instructions 147 include instructions to provide to user-operated device 106 user interface components for a plurality of additional vehicle characteristics, some of which are incompatible with the selected initial vehicle characteristic(s), and to additionally provide logic rules for the processor of user-operated device 106 to display only a subset of the user interface components which are compatible with the selected initial vehicle characteristic(s). In some embodiments, the user interface components and the logic rules are provided to the user-operated device separately. For example, all the plurality of user interface components, including compatible and incompatible user interface components, may be provided to the user-operated device in advance, and the logic rules may be provided following selection of the initial vehicle characteristic(s).

In some embodiments, the instructions 147 and 148 are executed in parallel to, or concurrently with, execution of instructions 144 and 146, respectively. In such embodiments, the additional vehicle characteristic(s) for which additional user interface components are provided in instructions 147 are compatible with the selected initial vehicle characteristic(s).

In some other embodiments, the instructions 147 and 148 are executed following execution of instructions 144 and 146. In such embodiments, the additional vehicle characteristic(s) for which additional user interface components are provided in instructions 147 are compatible with the selected initial vehicle characteristic(s) and with the selected VCM characteristic(s) or with the selected VCMs.

Instructions 147 and 148 are adapted to be executed following execution of instructions included in constraint-engine 126 and in compatibility engine 128, as explained in further detail hereinbelow.

In some embodiments, the instructions stored in server storage medium 122, which form part of display-engine 124 may further include instructions 149 to provide to user-operated device 106 a virtual model of at least one mechanically and electrically compliant VCM-based vehicle fulfilling a specification generated by system 100, as explained in further detail hereinbelow.

Instructions 149 are adapted to be executed following execution of instructions included in ordering-engine 130.

As seen in FIG. 1C, the instructions stored in server storage medium 122, which form part of constraint-engine 126, include instructions 150 to compute, for the selected initial vehicle characteristic(s) received by display-engine 124 when executing instructions 142, VCM-related mechanical and electrical constraints on a plurality of VCM characteristics. The mechanical and electrical constraints are required for a VCM-based vehicle including the selected initial vehicle characteristic(s) to be compliant. The instructions 150 are adapted to be executed following execution of instructions 142 of display-engine 124, once the user's selection of initial vehicle characteristic(s) is known.

In some embodiments, the instructions stored in server storage medium 122, which form part of constraint-engine 126 may further include instructions 152 to compute, for the selected initial vehicle characteristic(s) received by display-engine 124 when executing instructions 142, and in some cases also for the selected VCM characteristic(s) or the selected VCM(s) received by display engine 124 when executing instructions 146, additional mechanical and electrical constraints on a plurality of additional vehicle characteristics. The additional mechanical and electrical constraints are required for a VCM-based vehicle including the selected initial vehicle characteristic(s), and in some cases also the selected VCM characteristic(s) or the selected VCM(s), to be compliant.

In some embodiments, the instructions 152 are adapted to be executed following execution of instructions 142 of display-engine 124 once the user's selection of initial vehicle characteristic(s) is known, for example in parallel to execution of instructions 150. In such embodiments, the additional mechanical and electrical constraints are required for a VCM-based vehicle including the selected initial vehicle characteristic(s) to be compliant.

In some embodiments, the instructions 152 are adapted to be executed following execution of instructions 142 and 146 of display-engine 124 and following execution of instructions 150, once the user's selection of initial vehicle characteristic(s) and of VCM characteristic(s) or VCM(s) is known. In such embodiments, the additional mechanical and electrical constraints are required for a VCM-based vehicle including the selected initial vehicle characteristic(s) and the selected VCM characteristic(s) to be compliant.

Turning to FIG. 1D, it is seen that the instructions stored in server storage medium 122, which form part of compatibility-engine 128, include:

Instructions 160 to compute a first subset of VCM characteristics that are compatible with the VCM-related mechanical and electrical constraints, which constraints were computed by execution of instructions 150 of constraint engine 126; and Instructions 162 to provide the first subset of VCM characteristics to display engine 124 in a specific order, suitable for providing to the user-operated device 106, for example as part of execution of instructions 144 of display engine 124.

In some embodiments, the instructions 162 comprise instructions to provide to the display engine logic rules for generating the first subset of VCM characteristics, e.g. for identifying which VCM characteristics should be provided by the display engine or should be displayed at user-operated device 106.

Instructions 160 and 162 are adapted to be executed following execution of instructions 150 included in constraint-engine 126 and prior to execution of instructions 144 and 146 included in display-engine 124.

In some embodiments, the instructions stored in server storage medium 122, which form part of compatibility-engine 128 may further include:

Instructions 164 to compute a second subset of additional vehicle characteristics that are compatible with the additional mechanical and electrical constraints, which constraints were computed by execution of instructions 152 of constraint engine 126; and Instructions 166 to provide the second subset of additional vehicle characteristics to display engine 124 in a second specific order, suitable for providing to the user-operated device 106, for example as part of execution of instructions 148 of display engine 124.

In some embodiments, the instructions 166 comprise instructions to provide to the display engine logic rules for generating the second subset of additional vehicle characteristics, e.g. for identifying which additional vehicle characteristics should be provided by the display engine or should be displayed at user-operated device 106.

Instructions 164 and 166 are adapted to be executed following execution of instructions 152 included in constraint-engine 126 and prior to execution of instructions 147 and 148 included in display-engine 124.

In some embodiments, in which instructions 152 are executed in parallel to execution of instructions 150, instructions 164 and 166 may be executed in parallel to, or concurrently with, execution of instructions 160 and 162. In such embodiments, the additional vehicle characteristic(s) in the second subset are compatible with the selected initial vehicle characteristic(s).

In some other embodiments, in which instructions 152 are executed following execution of instructions 150 and of instructions 144 and 146, instructions 164 and 166 are executed following execution of instructions 160 and 162. In such embodiments, the additional vehicle characteristic(s) in the second subset are compatible with the selected initial vehicle characteristic(s) and with the selected VCM characteristic(s) or with the selected VCMs.

Turning to FIG. 1E, it is seen that the instructions stored in server storage medium 122, which form part of ordering-engine 130, include:

Instructions 170 to receive the selection of VCM characteristic(s) compatible with the VCM-related mechanical and electrical constraints, for example as received from the user by execution of instructions 146 of display engine 124; and Instructions 172 to generate a specification of a mechanically and electrically compliant VCM-based vehicle based on the selected initial vehicle characteristic(s) and the selected VCM characteristic(s) and the selected VCM(s).

In some embodiments, in which instructions 147, 148, 152, 164, and 166 are executed to enable user to select additional vehicle characteristic(s) which are compliant with the selected initial vehicle characteristic(s), and in some cases with the selected VCM characteristic(s), the instructions stored in server storage medium 122, which form part of ordering-engine 130 may further include instructions 174 to receive the selection of additional vehicle characteristic(s) compatible with the additional mechanical and electrical constraints, for example as received from the user by execution of instructions 148 of display engine 124. In some such embodiments, the generated specification may also be based on the selected additional vehicle characteristic(s).

In some embodiments, the specification generated by execution of instructions 172 may be, or may include, an engineering specification. In some embodiments, the specification generated by execution of instructions 172 may be, or may include, a design specification. In some embodiments, the specification generated by execution of instructions 172 may be, or may include, a manufacturing specification.

In some embodiments, the instructions stored in server storage medium 122, which form part of ordering-engine 130 may further include:

Instructions 176 to generate an engineering design specification for the mechanically and electrically compliant VCM-based vehicle; and Instructions 178 to electronically transmit the specification generated by execution of instructions 172, and/or the engineering design specification, generated by execution of instructions 176, to a manufacturing facility, for manufacturing of a mechanically and electrically compliant VCM-based vehicle fulfilling the specification. For example, the electronic transmission may be via server network interface 102 and via network 104, or via any other suitable network.

In some embodiments, compatibility engine 128 may be a machine learning engine. In some such embodiments, and the specific order determined during execution of instructions 162 may be determined based on a plurality of previous selections of initial vehicle characteristic(s) and corresponding selections of VCM characteristic(s).

In some such embodiments, VCM characteristic(s) identified to be frequently selected together with a specific initial vehicle characteristic, are higher in the specific order when the selected initial vehicle characteristic is the specific initial vehicle characteristic than VCM characteristic(s) identified to be less frequently selected together with the specific initial vehicle characteristic.

In some such embodiments, instructions 144 to provide the one or more user interface components for manual and explicit selection of one or more VCM characteristics include instructions to provide only ones of the VCM characteristics identified to be frequently selected together with the selected initial vehicle characteristics, and instructions to additionally provide a user interface component allowing the user to request presentation of additional, less frequently selected, VCM characteristics.

In some embodiments, the second specific order determined during execution of instructions 166 is determined based on a plurality of previous selections of initial vehicle characteristics and/or VCM characteristics and corresponding selections of additional vehicle characteristics.

In some such embodiments, additional vehicle characteristic(s) identified to be frequently selected together with a specific initial vehicle characteristics or with a specific VCM, are higher in the second specific order when the selected initial vehicle characteristic is the specific initial vehicle characteristic or when the selected VCM is the specific VCM, than additional vehicle characteristic(s) identified to be less frequently selected together with the specific initial vehicle characteristic or the specific VCM.

In some embodiments, instructions 148 to provide the one or more user interface components for manual and explicit selection of one or more additional vehicle characteristics include instructions to provide only ones of the additional vehicle characteristics identified to be frequently selected together with the selected initial vehicle characteristics or the selected one or more VCMs, and to additionally provide another user interface component allowing the user to request presentation of additional, less frequently selected, additional vehicle characteristics.

In some embodiments, at least one server processor 120 comprises multiple separate server processors, each one associated with one of display-engine 124, constraint-engine 126, compatibility-engine 128, and ordering-engine 130, for execution of instructions forming part of the associated engine.

In some embodiments, at least one server storage medium 122 comprises multiple separate server storage media for storing the instructions of each of display-engine 124, constraint-engine 126, compatibility-engine 128, and ordering-engine 130.

It is appreciated that some VCM characteristics may be unaffected by, or independent from, the selection of vehicle characteristics. Additionally, some vehicle parameters may be unaffected by, or independent from, the selection of VCM characteristics.

For example, according to some embodiments, a calculated length of the platform chassis of the vehicle is not affected by the selection of the VCM type (e.g. steering type, driving type) by more than 10%. In some embodiments, the calculated length of the platform chassis of the vehicle is not affected by the selection of the VCM type (e.g. steering type, driving type) by more than 5%.

As another example, according to some embodiments, the calculated width of the platform chassis of the vehicle is not affected by the selection of the VCM type (e.g. steering type, driving type) by more than 10%. In some embodiments, the calculated width of the platform chassis of the vehicle is not affected by the selection of the VCM type (e.g. steering type, driving type) by more than 5%. As yet another example, according to some embodiments, the calculated payload of the vehicle is not affected by the selection of the VCM type (e.g. steering type, driving type) by more than 10%. In some embodiments, the calculated payload of the vehicle is not affected by the selection of the VCM type (e.g. steering type, driving type) by more than 5%.

By contrast, according to some embodiments, a range of steering radius may be calculated based on one or more of the size of the vehicle (e.g. length, width), and type of VCM steering selection (e.g. AWS, RWS), as discussed in further detail hereinbelow.

Figure 2A:
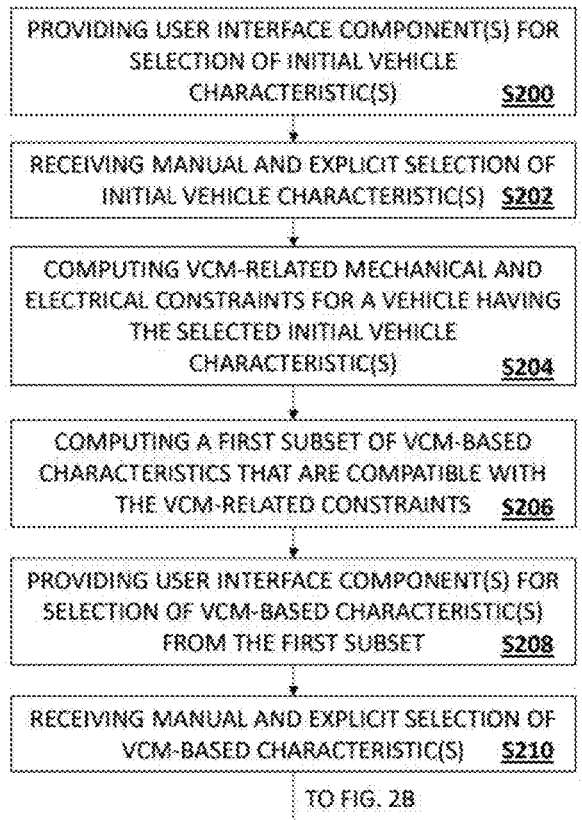
FIGS. 2A and 2B together are a flow chart of a method for controlling design and manufacture of a mechanically and electrically compliant VCM-based vehicle according to an embodiment of the disclosed technology.
Figure 2B:
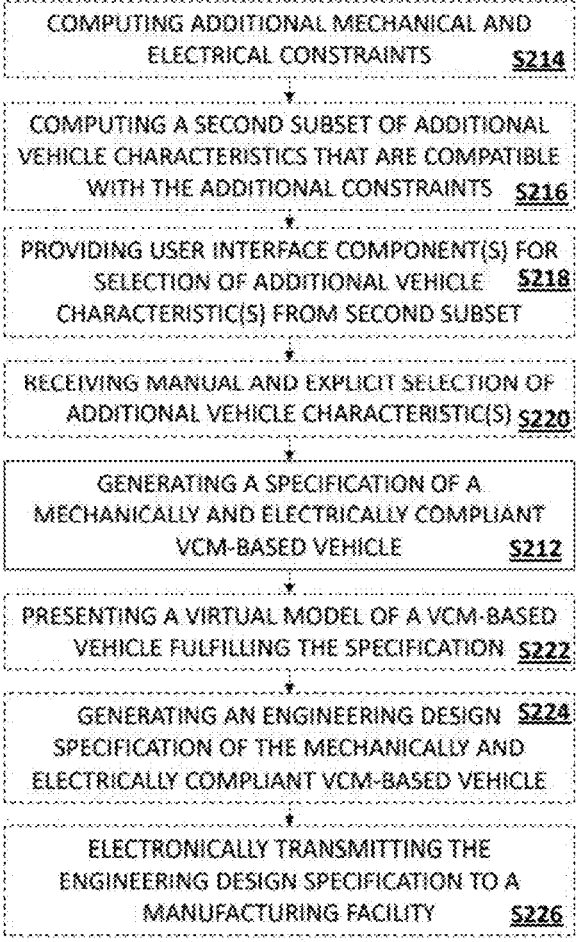

FIGS. 2A and 2B, together, are a flow chart of a method for controlling design and manufacture of a mechanically and electrically compliant VCM-based vehicle according to an embodiment of the disclosed technology. The method may be implemented using system 100 of FIGS. 1A to 1E.

At step S200 of FIG. 2A, the system (e.g. system 100 of FIG. 1A) provides to a display (e.g. display 116 of FIG. 1A) of a networked device (e.g. user-operated device 106 of FIG. 1A), user interface components for selection of one or more initial vehicle characteristics (e.g., by execution of instructions 140, FIG. 1B). Subsequently, at step S202, manual and explicit selection of one or more initial vehicle characteristics is received by the system (e.g., by execution of instructions 142, FIG. 1B). The manual and explicit selection may be provided using one or more input interfaces (e.g. interfaces 114 of FIG. 1A) of the networked device.

Responsive to receipt of the selected initial vehicle characteristic(s), at step S204, the system computes VCM-related mechanical and electrical constraints on a plurality of VCM characteristics (e.g., by execution of instructions 150, FIG. 1C). The mechanical and electrical constraints are required for the VCM-based vehicle having the selected initial vehicle characteristic(s) to be compliant. The system computes a first subset of the plurality of VCM characteristics which are compatible with the VCM-related mechanical and electrical constraints at step S206 (e.g., by execution of instructions 160, FIG. 1D). Typically, the first subset is a proper subset of the VCM characteristics.

At step S208, for each VCM characteristic in the first subset, the system provides to the display of the user-operated device one or more respective user interface components for manual and explicit selection of the VCM characteristic for display thereon, (e.g., by execution of instructions 162, FIG. 1D, and of instructions 144, FIG. 1B). For each such VCM characteristic, the one or more respective user interface components are provided for display in a specific order. In some embodiments, step S208 includes providing the user interface components corresponding to the VCM characteristics also in a characteristic-specific order of the VCM characteristics in the first subset.

Subsequently, at step S210, manual and explicit selection of one or more VCM characteristics is received by the system (e.g., by execution of instructions 146, FIG. 1B). The manual and explicit selection may be provided using the one or more input interfaces of the networked device.

In some embodiments, the one or more selected VCMs include at least two VCMs, a first of the at least two VCMs being of a first type, and a second of the at least two VCMs being of a second type, the second type being different from the first type.

As seen in FIG. 2B, responsive to receipt of the selected VCM characteristic(s) in the first subset defining one or more selected VCMs, at step S212, the system generates a specification of a mechanically and electrically compliant VCM-based vehicle including the selected initial vehicle characteristics and the one or more selected VCMs.

In some embodiments, the specification may be, or may include, an engineering specification. In some embodiments, the specification may be, or may include, a design specification. In some embodiments, the specification may be, or may include, a manufacturing specification.

As seen in FIG. 2B, in some embodiments, at step S214, the system computes additional mechanical and electrical constraints on a plurality of additional vehicle characteristics (e.g., by execution of instructions 152, FIG. 1C). The additional mechanical and electrical constraints are required for the VCM-based vehicle having the selected initial vehicle characteristic(s) to be compliant. The system computes a second subset of the plurality of additional vehicle characteristics which are compatible with the additional mechanical and electrical constraints at step S216 (e.g., by execution of instructions 164, FIG. 1D). Typically, the second subset is a proper subset of the additional vehicle characteristics.

At step S218, for each additional vehicle characteristic in the second subset, the system provides to the display of the remote device one or more respective user interface components for manual and explicit selection of the additional vehicle characteristic for display thereon, (e.g., by execution of instructions 166, FIG. 1D, and of instructions 147, FIG. 1B). For each such additional vehicle characteristic, the one or more respective user interface components are provided for display in a second specific order. In some embodiments, step S218 includes providing the user interface components corresponding to the additional vehicle characteristics also in a characteristic-specific order of the additional vehicle characteristics in the second subset.

Subsequently, at step S220, manual and explicit selection of one or more additional vehicle characteristics is received by the system (e.g., by execution of instructions 148, FIG. 1B). The manual and explicit selection of the additional vehicle characteristic(s) may be provided using the one or more input interfaces of the networked device.

In such embodiments, the specification of the mechanically and electrically compliant VCM-based vehicle generated at step S212 is also responsive to receipt of the manual and explicit selection of one or more additional vehicle characteristics in the second subset. The specification of the mechanically and electrically compliant VCM-based vehicle additionally includes the selected additional vehicle characteristic(s).

In some embodiments, steps S214 to S220 are carried out simultaneously or concurrently with steps S204 to S210.

In some such embodiments, the specific order of display of the interface components for each VCM characteristic and the second specific order for display of the interface components for each additional vehicle characteristic are determined using a machine-learning engine based on a plurality of previous selections of initial vehicle characteristics and corresponding selections of VCM characteristics and additional vehicle characteristics. For example, in the specific order, VCM characteristics identified, in previous selections, to be frequently selected together with a specific initial vehicle characteristic, may be higher in the specific order when the selected initial vehicle characteristic is the specific initial vehicle characteristic than VCM characteristics identified to be less frequently selected together with the specific initial vehicle characteristic. As another example, in the second specific order, additional vehicle characteristics identified, in previous selections, to be frequently selected together with a specific initial vehicle characteristic, may be higher in the second specific order when the selected initial vehicle characteristic is the specific initial vehicle characteristic than additional vehicle characteristics identified to be less frequently selected together with the specific initial vehicle characteristic.

In some such embodiments, step S208 and/or step S218 may include providing for display only ones of the VCM characteristics or additional vehicle characteristics identified to be frequently selected together with the selected initial vehicle characteristic, and providing at least one user interface component allowing a user to request presentation of additional, less frequently selected, VCM characteristics or additional vehicle characteristics.

In some other embodiments, steps S214 to S220 are carried out subsequent to step S210 and prior to step S212. In such embodiments, the additional mechanical and electrical constraints computed at step S214 are required for a VCM-based vehicle having the selected initial vehicle characteristic(s) and the selected VCM(s) to be compliant.

In some embodiments, the specific order of display of the interface components for each additional vehicle characteristic is determined using a machine-learning engine based on a plurality of previous selections of initial vehicle characteristics and corresponding selections of VCM characteristics.

For example, in the specific order, VCM characteristics identified, in previous selections, to be frequently selected together with a specific initial vehicle characteristic, are higher in the specific order when the selected initial vehicle characteristic is the specific initial vehicle characteristic, than VCM characteristics identified to be less frequently selected together with the specific initial vehicle characteristic. In some such embodiments, step S208 includes providing for display only ones of the VCM characteristics identified to be frequently selected together with the selected initial vehicle characteristic, and providing at least one user interface component allowing a user to request presentation of additional, less frequently selected, VCM characteristics.

In some embodiments, the second specific order of display of the interface components for each additional vehicle based characteristic is determined using the machine-learning engine based on a plurality of previous selections of initial vehicle characteristics and VCM characteristics and corresponding selections of additional vehicle characteristics.

For example, in the second specific order, additional vehicle characteristics identified, in previous selections, to be frequently selected together with a specific initial vehicle characteristic or with a specific VCM characteristic, are higher in the second specific order when the selected initial vehicle characteristic is the specific initial vehicle characteristic or when the selected VCM characteristic is the specific VCM characteristic, than additional vehicle characteristics identified to be less frequently selected together with the specific initial vehicle characteristic or the specific VCM characteristic. In some such embodiments, step S218 includes providing for display only ones of the additional vehicle characteristics identified to be frequently selected together with the selected initial vehicle characteristic or the selected VCM characteristics, and providing at least one other user interface component allowing a user to request presentation of additional, less frequently selected, additional vehicle characteristics.

In some embodiments, the method may further include, at step S222, which is carried out following step S212, presenting a virtual model of at least one mechanically and electrically compliant VCM-based vehicle fulfilling the generated specification.

In some embodiments, the method may further include, at step S224, which is carried out following step S212, generating, based on the specification generated at step S212, an engineering design specification for the VCM-based vehicle.

In some embodiments, the method may further include, at step S226, which may be carried out following step S212 or following step S224, electronically transmitting the specification generated at step S212 and/or the engineering design specification generated at step S224 to a manufacturing facility for manufacture of a mechanically and electrically compliant VCM-based vehicle fulfilling the specification.

Figure 3:
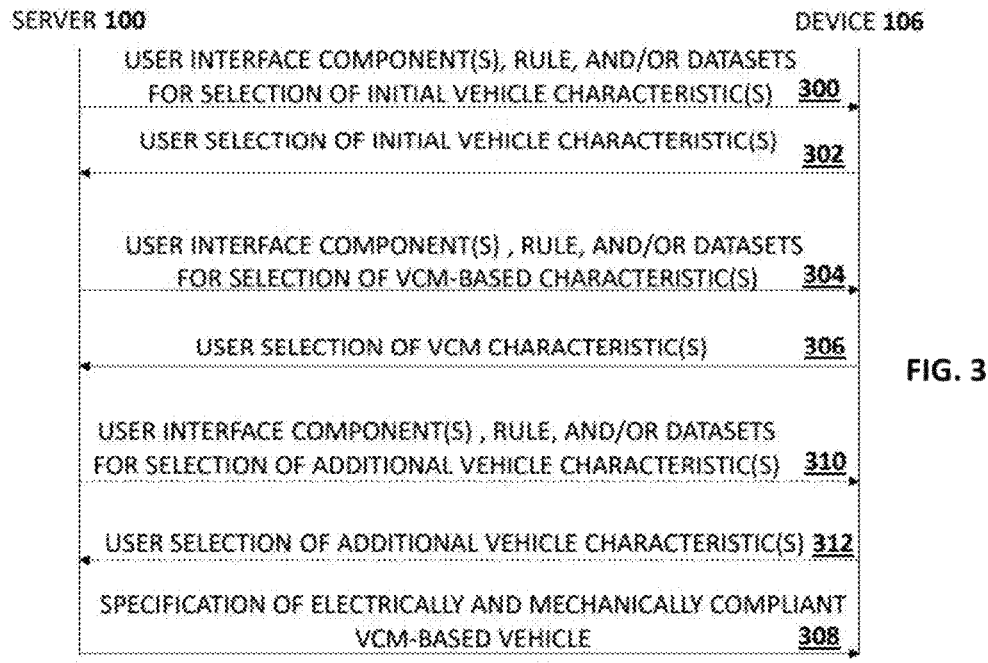
FIG. 3 illustrates a flow of information in a network associated with the system of FIGS. 1A to 1E when implementing the method of FIGS. 2A-2B.

Reference is now made to FIG. 3, which illustrates a flow of information in a network, such as network 104 of FIG. 1A, when implementing the method of FIGS. 2A-2B. The network includes a computing device at a first network node on the network and used by a user, such as computing user-operated device 106 of FIG. 1A, and a system or server at a second node on the network, such as system 100 of FIG. 1A. The computing device is associated with at least one input interface and with at least one display, such as input interface(s) 114 and display(s) 116 of FIG. 1A. The flow of information in the network is designed for defining a specification of a mechanically and electrically compliant VCM-based vehicle based on user input responsive to information provided by the server.

In FIG. 3, the flow of data in the network is illustrated in order from the top of the drawing to the bottom. Data sent via the network includes, in order:

a. one or more user interface components, rules, and/or datasets for manual and explicit selection of one or more initial vehicle characteristics for display on the at least one display, transmitted from server 100 to user-operated device 106 at reference numeral 300;

b. manual and explicit selection, by the user, of one or more initial vehicle characteristics, transmitted from user-operated device 106 to server 100 at reference numeral 302;

c. one or more user interface components, rules, and/or datasets for manual and explicit selection of VCM characteristics which are compatible with mechanical and electrical constraints required for a vehicle including the one or more selected initial vehicle characteristic(s) to be compliant. For each such VCM characteristic, the one or more respective user interface components may be in a specific order, transmitted from server 100 to user-operated device 106 at reference numeral 304;

d. manual and explicit selection of one or more VCM characteristics which are compatible with the selected initial vehicle characteristics to define one or more selected VCMs, transmitted from user-operated device 106 to server 100 at reference numeral 306; and e. a specification of a mechanically and electrically compliant VCM-based vehicle including the one or more selected initial vehicle characteristics and the selected one or more VCMs, transmitted from server 100 to user-operated device 106 at reference numeral 308.

In some embodiments, the data sent via the network includes additional data, transmitted prior to the transmission 308 of the specification. The additional data includes:

f. one or more user interface components, rules, and/or datasets for manual and explicit selection of the additional vehicle characteristic, wherein, for each additional vehicle characteristics which are compatible with mechanical and electrical constraints required for a vehicle including the one or more selected initial vehicle characteristic(s) to be compliant. For each such additional vehicle characteristic, the one or more respective user interface components may be in a second specific order transmitted from server 100 to user-operated device 106 at reference numeral 310; and g. manual and explicit selection of one or more additional vehicle characteristics which are compatible with the initial selected vehicle characteristic(s), transmitted from user-operated device 106 to server 100 at reference numeral 312.

In some such embodiments, the specification of the mechanically and electrically compliant VCM-based vehicle transmitted at reference numeral 308 is also responsive to manual and explicit selection of one or more additional vehicle characteristics in the second subset, received in transmission 312.

In some embodiments, the data transmitted at reference numeral 310 is transmitted together with the data transmitted at reference numeral 304, and the data transmitted at reference numeral 312 is transmitted together with the data transmitted at reference numeral 306.

In some other embodiments, the data transmitted at reference numerals 310 and 312 is transmitted subsequently to the data transmitted at reference numerals 304 and 306, and prior to the data transmitted at reference numeral 308. In some such embodiments, the additional vehicle characteristic, transmitted at reference numeral 310, are compatible with mechanical and electrical constraints required for a vehicle including the one or more selected initial vehicle characteristics and the one or more selected VCMs to be compliant.

In some embodiments, the data sent via the network further includes a virtual model of at least one mechanically and electrically compliant VCM-based vehicle fulfilling the specification, which may be transmitted from server 100 to user-operated device 106.

In some embodiments, the network further includes a second computing device at another network node, the second computing device being associated with a manufacturing facility for manufacture of a mechanically and electrically compliant VCM-based vehicles. In some such embodiments, the data transmitted via the network further includes the specification, or an engineering design specification, transmitted, from the server via the network, to the second computing device.

Figure 4A:
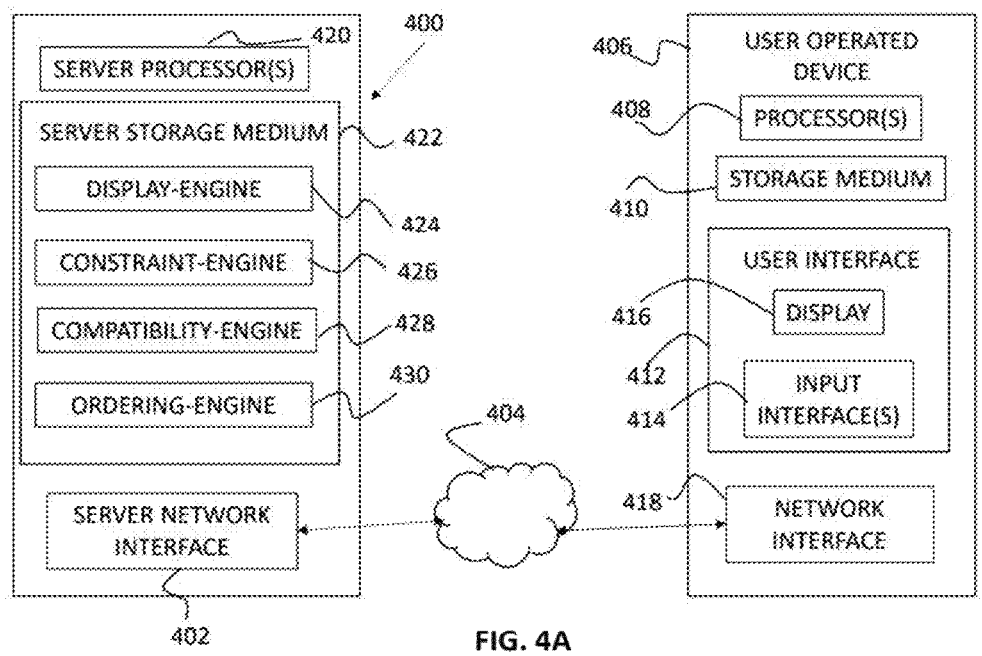
FIG. 4A is a schematic block diagram of a system for controlling design and manufacture of a mechanically and electrically compliant VCM-based vehicle according to another embodiment of the disclosed technology.

Reference is now made to FIG. 4A, which is a schematic block diagram of a system 400 for controlling design and manufacture of a mechanically and electrically compliant VCM-based vehicle according to an embodiment of the disclosed technology, and to FIGS. 4B-4E, which are schematic block diagrams of software operational-engines forming part of system 400 of FIG. 4A.

As seen in FIG. 4A, system 400, which may be a server, includes a server network interface 402 for connection to at least one network 404. The network 404 includes at least one user-operated device 406, which is typically another remote computing device. User-operated device 406 has one or more processors 408, at least one storage medium 410, which may be a non-transitory computer readable storage medium, storing instructions to be executed by processor(s) 408. User-operated device 406 further has, or is associated with, a user interface 412 including at least one input interface 414 and at least one display 416, as well as its own network interface 418 connected to network 404.

Input interface(s) 414 may include one or more of a keyboard, a mouse, a touch-screen, a touch-pad, a microphone, or any other device or mechanism suitable for providing input to processor(s) 408, as defined hereinbelow in the definitions section.

Display(s) 416 may include any suitable type of display, including a screen, a projector, and the like, provided that the display is functionally associated with input interface(s) 414 for the user to provide input based on, or relating to, displayed elements or components.

System 400 further includes at least one server processor 420 and at least one server storage medium 422, which may be a non-transitory computer readable storage medium, storing instructions to be executed by server processor(s) 420. The non-transitory computer readable storage medium (a) includes instructions forming a display-engine 424, instructions forming a constraint-engine 426, instructions forming a compatibility-engine 428, and instructions forming an ordering-engine 430.

Figure 4B:
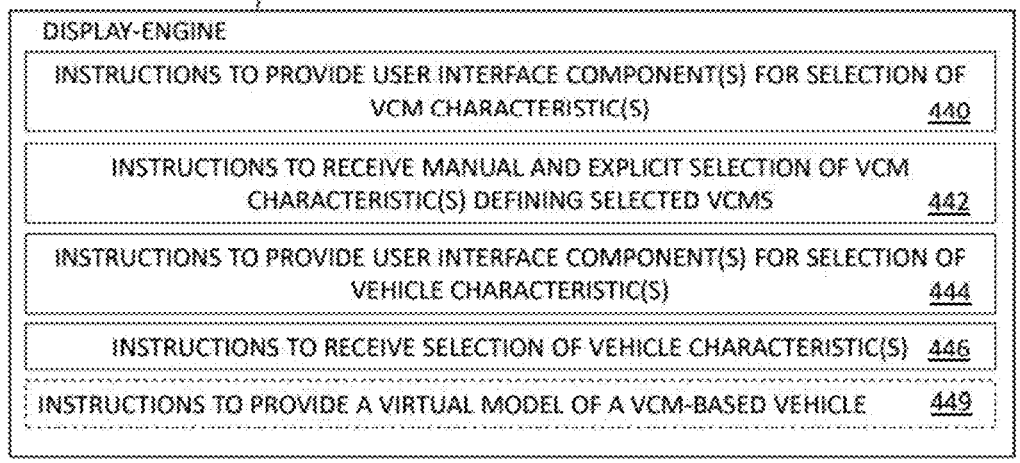

As seen in FIG. 4B, the instructions stored in server storage medium 422, which form part of display-engine 424, include:

Instructions 440 to provide to user-operated device 406, one or more user interface components for manual and explicit selection of one or more VCM characteristics. The user interface components are suitable for display on display(s) 416;

Instructions 442 to receive, from user-operated device 406, manual and explicit selection of one or more selected VCM characteristics, defining one or more selected VCMs. Typically, the selected VCM characteristic(s) was selected using input interface(s) 414, by a user interacting with the user interface components displayed on display(s) 416;

Instructions 444 to provide to user-operated device 406, one or more user interface components for manual and explicit selection of one or more vehicle characteristics of the VCM-based vehicle. The vehicle characteristic(s) are compatible with selected VCM(s). The user interface components are suitable for display on display(s) 416; and Instructions 446 to receive, from user-operated device 406, manual and explicit selection of one or more selected vehicle characteristics. Typically, the selected VCM characteristic(s) was selected using input interface(s) 414, by a user interacting with the user interface components displayed on display(s) 416.

In some embodiments, instructions 444 include instructions to provide, as part of the user interface components for selection of vehicle characteristic(s), a pre-defined range of data which is compatible with the selected VCM characteristic(s). In some embodiments, instructions 444 include instructions to provide to user-operated device 406 user interface components for a plurality of vehicle characteristics, some of which are incompatible with the selected VCM characteristic(s), and to additionally provide logic rules for the processor of user-operated device 406 to limit the components for which user interface components are displayed to those which are compatible with the selected VCM characteristic(s). In some embodiments, instructions 444 include instructions to provide to user-operated device 406 user interface components for a plurality of vehicle characteristics, some of which are incompatible with the selected VCM characteristic(s), and to additionally provide logic rules for the processor of user-operated device 406 to display only a subset of the user interface components which are compatible with the selected VCM characteristic(s). In some embodiments, the user interface components and the logic rules are provided to the user-operated device separately. For example, all the plurality of user interface components, including compatible and incompatible user interface components, may be provided to the user-operated device in advance, and the logic rules may be provided following selection of the VCM characteristic(s).

In some embodiments, the one or more selected VCMs include at least two VCMs, a first of the at least two VCMs being of a first type, and a second of the at least two VCMs being of a second type, the second type being different from the first type, as shown in the examples hereinbelow.

Instructions 444 and 446 are adapted to be executed following execution of instructions included in constraint-engine 426 and in compatibility engine 428, as explained in further detail hereinbelow.

In some embodiments, the instructions stored in server storage medium 422, which form part of display-engine 424 may further include instructions 449 to provide to user-operated device 406 a virtual model of at least one mechanically and electrically compliant VCM-based vehicle fulfilling a specification generated by system 400, as explained in further detail hereinbelow.

Instructions 449 are adapted to be executed following execution of instructions included in ordering-engine 430.

Figure 4C:
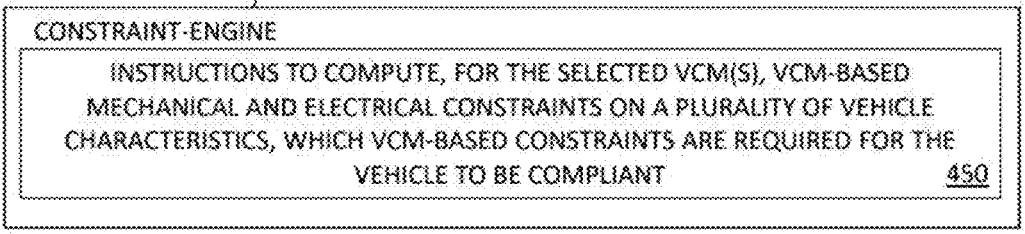

As seen in FIG. 4C, the instructions stored in server storage medium 422, which form part of constraint-engine 426, include instructions 450 to compute, for the selected VCM(s) received by display-engine 424 when executing instructions 442, VCM-based mechanical and electrical constraints on a plurality of vehicle characteristics of the VCM-based vehicle. The mechanical and electrical constraints are required for a VCM-based vehicle including the selected VCM(s) to be compliant. The instructions 450 are adapted to be executed following execution of instructions 442 of display-engine 424, once the user's selection of VCM(s) is known.

Figure 4D:
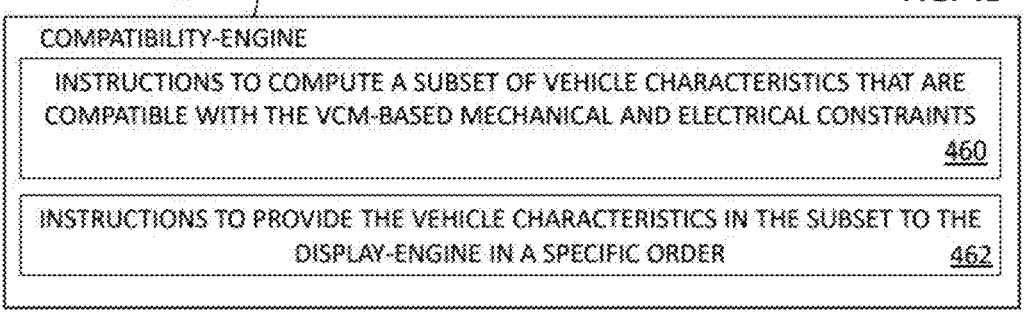

Turning to FIG. 4D, it is seen that the instructions stored in server storage medium 422, which form part of compatibility-engine 428, include:

Instructions 460 to compute a subset of vehicle characteristics that are compatible with the VCM-based mechanical and electrical constraints, which constraints were computed by execution of instructions 450 of constraint engine 426; and Instructions 462 to provide the subset of vehicle characteristics to display engine 424 in a specific order, suitable for providing to the remote user-operated device 406, for example as part of execution of instructions 444 of display engine 424.

In some embodiments, the instructions 462 comprise instructions to provide to the display engine logic rules for generating the subset of vehicle characteristics, e.g. for identifying which VCM characteristics should be provided by the display engine or should be displayed at user-operated device 406.

Instructions 460 and 462 are adapted to be executed following execution of instructions 450 included in constraint-engine 426 and prior to execution of instructions 444 and 446 included in display-engine 424.

Turning to FIG. 4E, it is seen that the instructions stored in server storage medium 422, which form part of ordering-engine 430, include:

Instructions 470 to receive the selection of vehicle characteristic(s) compatible with the VCM-based mechanical and electrical constraints, for example as received from the user by execution of instructions 446 of display-engine 424; and Instructions 472 to generate a specification of a mechanically and electrically compliant VCM-based vehicle based on the selected VCM(s) and the selected vehicle characteristic(s).

In some embodiments, the specification generated by execution of instructions 472 may be, or may include, an engineering specification. In some embodiments, the specification generated by execution of instructions 472 may be, or may include, a design specification. In some embodiments, the specification generated by execution of instructions 472 may be, or may include, a manufacturing specification.

In some embodiments, the instructions stored in server storage medium 422, which form part of ordering-engine 430 may further include:

Instructions 476 to generate an engineering design specification for the mechanically and electrically compliant VCM-based vehicle; and Instructions 478 to electronically transmit the specification generated by execution of instructions 472, and/or the engineering design specification, generated by execution of instructions 476, to a manufacturing facility, for manufacturing of a mechanically and electrically compliant VCM-based vehicle fulfilling the specification. For example, the electronic transmission may be via network interface 402 and via network 404, or via any other suitable network.

In some embodiments, compatibility engine 428 may be a machine learning engine. In some such embodiments, and the specific order determined during execution of instructions 462 may be determined based on a plurality of previous selections of VCM(s) and corresponding selections of vehicle characteristic(s).

In some such embodiments, vehicle characteristic(s) identified to be frequently selected together with a specific VCM, are higher in the specific order when the selected VCM is the specific VCM than vehicle characteristic(s) identified to be less frequently selected together with the specific VCM.

In some such embodiments, instructions 444 to provide the one or more user interface components for manual and explicit selection of one or more vehicle characteristics include instructions to provide only ones of the vehicle characteristics identified to be frequently selected together with the selected VCM(s), and instructions to additionally provide a user interface component allowing the user to request presentation of additional, less frequently selected, vehicle characteristics.

In some embodiments, at least one server processor 420 comprises multiple separate server processors, each one associated with one of display-engine 424, constraint-engine 426, compatibility-engine 428, and ordering-engine 430, for execution of instructions forming part of the associated engine.

In some embodiments, at least one server storage medium 422 comprises multiple separate server storage media for storing the instructions of each of display-engine 424, constraint-engine 426, compatibility-engine 428, and ordering-engine 430.

It is appreciated that some VCM characteristics may be unaffected by, or independent from, the selection of vehicle characteristics. Additionally, some vehicle parameters may be unaffected by, or independent from, the selection of VCM characteristics.

For example, according to some embodiments, a calculated length of the platform chassis of the vehicle is not affected by the selection of the VCM type (e.g. steering type, driving type) by more than 10%. In some embodiments, the calculated length of the platform chassis of the vehicle is not affected by the selection of the VCM type (e.g. steering type, driving type) by more than 5%.

As another example, according to some embodiments, the calculated width of the platform chassis of the vehicle is not affected by the selection of the VCM type (e.g. steering type, driving type) by more than 10%. In some embodiments, the calculated width of the platform chassis of the vehicle is not affected by the selection of the VCM type (e.g. steering type, driving type) by more than 5%. As yet another example, according to some embodiments, the calculated payload of the vehicle is not affected by the selection of the VCM type (e.g. steering type, driving type) by more than 10%. In some embodiments, the calculated payload of the vehicle is not affected by the selection of the VCM type (e.g. steering type, driving type) by more than 5%.

By contrast, according to some embodiments, a range of steering radius may be calculated based on one or more of the size of the vehicle (e.g. length, width), and type of VCM steering selection (e.g. AWS, RWS), as discussed in further detail hereinbelow.

FIGS. 5A and 5B, together, are a flow chart of a method for controlling design and manufacture of a mechanically and electrically compliant VCM-based vehicle according to an embodiment of the disclosed technology. The method may be implemented using system 400 of FIGS. 4A to 4E.

At step S500 of FIG. 5A, the system (e.g. system 400 of FIG. 4A) provides to a display (e.g. display 416 of FIG. 4A) of a networked device (e.g. user-operated device 406 of FIG. 4A), user interface components for selection of one or more VCM characteristics (e.g., by execution of instructions 440, FIG. 4B). Subsequently, at step S502, manual and explicit selection of one or more VCM characteristics is received by the system (e.g., by execution of instructions 442, FIG. 4B). The manual and explicit selection may be provided using one or more input interfaces (e.g. interfaces 414 of FIG. 4A) of the networked device. The selected VCM characteristic(s) define one or more selected VCMs.

In some embodiments, the one or more selected VCMs include at least two VCMs, a first of the at least two VCMs being of a first type, and a second of the at least two VCMs being of a second type, the second type being different from the first type.

Responsive to receipt of the selected VCM(s), at step S504, the system computes VCM-based mechanical and electrical constraints on a plurality of vehicle characteristics (e.g., by execution of instructions 450, FIG. 4C). The mechanical and electrical constraints are required for the VCM-based vehicle having the selected VCM(s) to be compliant. The system computes a subset of the plurality of vehicle characteristics which are compatible with the VCM-based mechanical and electrical constraints at step S506 (e.g., by execution of instructions 460, FIG. 4D). Typically, the subset is a proper subset of the vehicle characteristics.

At step S508, for each vehicle characteristic in the subset, the system provides to the display of the remote device one or more respective user interface components for manual and explicit selection of the vehicle characteristic for display thereon, (e.g., by execution of instructions 462, FIG. 4D, and of instructions 444, FIG. 4B). For each such vehicle characteristic, the one or more respective user interface components are provided for display in a specific order. In some embodiments, step S508 includes providing the user interface components corresponding to the vehicle characteristics also in a characteristic-specific order of the vehicle characteristics in the subset.

Subsequently, at step S510, manual and explicit selection of one or more vehicle characteristics is received by the system (e.g., by execution of instructions 446, FIG. 4B). The manual and explicit selection may be provided using the one or more input interfaces of the networked device.

As seen in FIG. 5B, responsive to receipt of the selected vehicle characteristic(s) from the subset, at step S512, the system generates a specification of a mechanically and electrically compliant VCM-based vehicle including the selected VCM(s) and the selected vehicle characteristic(s).

In some embodiments, the specification may be, or may include, an engineering specification. In some embodiments, the specification may be, or may include, a design specification. In some embodiments, the specification may be, or may include, a manufacturing specification.

In some embodiments, the method may further include, at step S522, which is carried out following step S512, presenting a virtual model of at least one mechanically and electrically compliant VCM-based vehicle fulfilling the generated specification.

In some embodiments, the method may further include, at step S524, which is carried out following step S512, generating, based on the specification generated at step S512, an engineering design specification for the VCM-based vehicle.

In some embodiments, the method may further include, at step S526, which may be carried out following step S512 or following step S524, electronically transmitting the specification generated at step S512 and/or the engineering design specification generated at step S524 to a manufacturing facility for manufacture of a mechanically and electrically compliant VCM-based vehicle fulfilling the specification.

Figure 6:
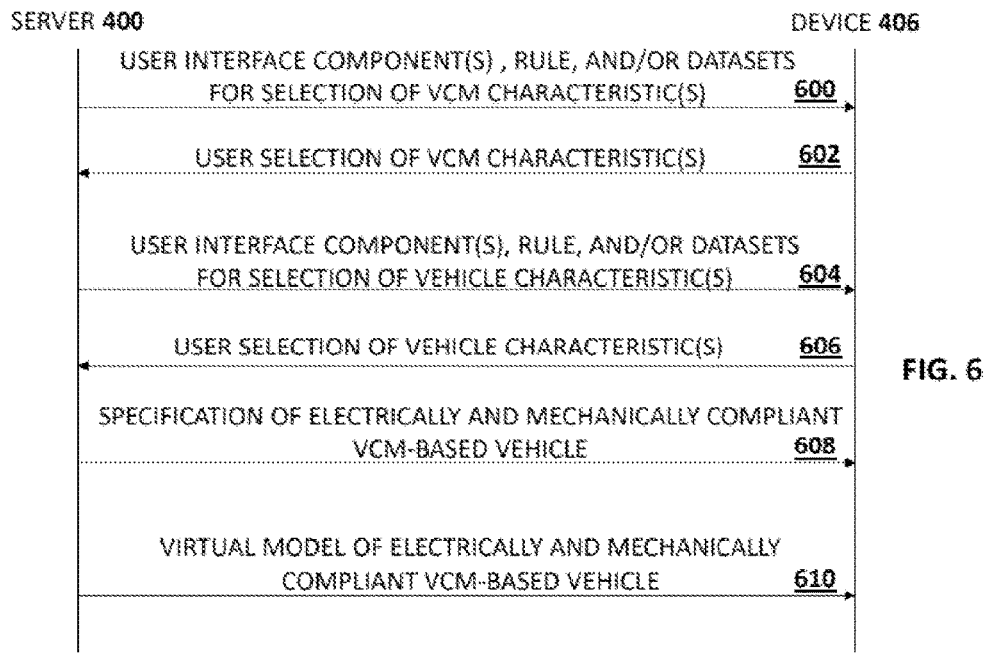
FIG. 6 illustrates a flow of information in a network associated with the system of FIGS. 4A to 4E when implementing the method of FIGS. 5A-5B.

Reference is now made to FIG. 6, which illustrates a flow of information in a network, such as network 404 of FIG. 4A, when implementing the method of FIGS. 5A-5B. The network includes a computing device at a first network node on the network and used by a user, such as computing user-operated device 406 of FIG. 4A, and a system or server at a second node on the network, such as system 400 of FIG. 4A. The computing device is associated with at least one input interface and with at least one display, such as input interface(s) 414 and display(s) 416 of FIG. 4A. The flow of information in the network is designed for defining a specification of a mechanically and electrically compliant VCM-based vehicle based on user input responsive to information provided by the server.

In FIG. 6, the flow of data in the network is illustrated in order from the top of the drawing to the bottom. Data sent via the network includes, in order:

a. one or more user interface components, rules, and/or datasets for manual and explicit selection of one or more VCM characteristics for display on the at least one display, transmitted from server 400 to user-operated device 406 at reference numeral 600;

b. manual and explicit selection, by the user, of one or more VCM characteristics defining one or more selected VCMs, transmitted from user-operated device 406 to server 400 at reference numeral 602;

c. one or more user interface components, rules, and/or datasets for manual and explicit selection of vehicle characteristics which are compatible with mechanical and electrical constraints required for a vehicle including the one or more selected VCM characteristic(s) to be compliant. For each such vehicle characteristic, the one or more respective user interface components may be in a specific order, transmitted from server 400 to user-operated device 406 at reference numeral 604;

d. manual and explicit selection of one or more vehicle characteristics which are compatible with the selected VCM characteristic(s), transmitted from user-operated device 406 to server 400 at reference numeral 606; and e. a specification of a mechanically and electrically compliant VCM-based vehicle including the selected VCM (s) and the selected vehicle characteristic(s), transmitted from server 400 to user-operated device 406 at reference numeral 608.

In some embodiments, the data sent via the network further includes a virtual model of at least one mechanically and electrically compliant VCM-based vehicle fulfilling the specification, which may be transmitted from server 400 to user-operated device 406 at reference numeral 610.

In some embodiments, the network further includes a second computing device at another network node, the second computing device being associated with a manufacturing facility for manufacture of a mechanically and electrically compliant VCM-based vehicles. In some such embodiments, the data transmitted via the network further includes the specification, or an engineering design specification, transmitted, from the server via the network, to the second computing device.

The skilled artisan will recognize that in any of the embodiments of any one of FIGS. 1A to 6, the specification may be automatically transmitted to a manufacturing facility for manufacturing of a mechanically and electrically compliant VCM-based vehicle fulfilling the specification. Alternatively or additionally, a mechanically and electrically compliant VCM-based vehicle fulfilling the specification may be automatically manufactured or assembled, in response to receipt of the specification. For the purpose of such manufacturing or assembly, requisite electronic and/or mechanical elements, such as robots and/or conveyor belts and/or pickers and/or drones may be used. The electronic and/or mechanical elements are configured to operate responsively to receipt of the specification so as to automatically manufacture and/or assemble the VCM-based vehicle.

Reference is now made to FIGS. 7A-7E, which illustrate components of a Graphic User Interface (GUI) 700 for controlling design and manufacture of a mechanically and electrically compliant VCM-based vehicle according to embodiments of the disclosed technology. As seen, GUI 700 may appear on a display, such as display 116 of user-operated device 106 (FIG. 1A). The content of GUI 700 may be provided to the device by the server, such as server 100 (FIG. 1A), as discussed in detail hereinabove.

As seen in FIGS. 7A to 7E, GUI 700 includes a selection region 702 and a presentation region 704. Selection region 702 includes user interface components (UICs) for manual and explicit user selection of desired characteristics for the vehicle, whereas presentation region 704 is adapted to present to the user their selections, and how such selections would affect the design of the vehicle.

As seen, presentation region 704 includes an image region and a text region. Image region presents an image representation of the user's selections, whereas text region presents a textual representation of the user's selections. In the illustrated embodiment, the text region includes a passenger/payload field 710, a corner field 712, a battery capacity field 714, a volume field 716, a style field 718, and a range field 720. However, text region 708 may include fewer fields, additional fields, or different fields from those illustrated in FIGS. 7A to 7E. As explained in further detail hereinbelow, choices made by the user interacting with user interface components in selection region 702 are reflected in the image and text regions of presentation region 704.

Figure 7A:
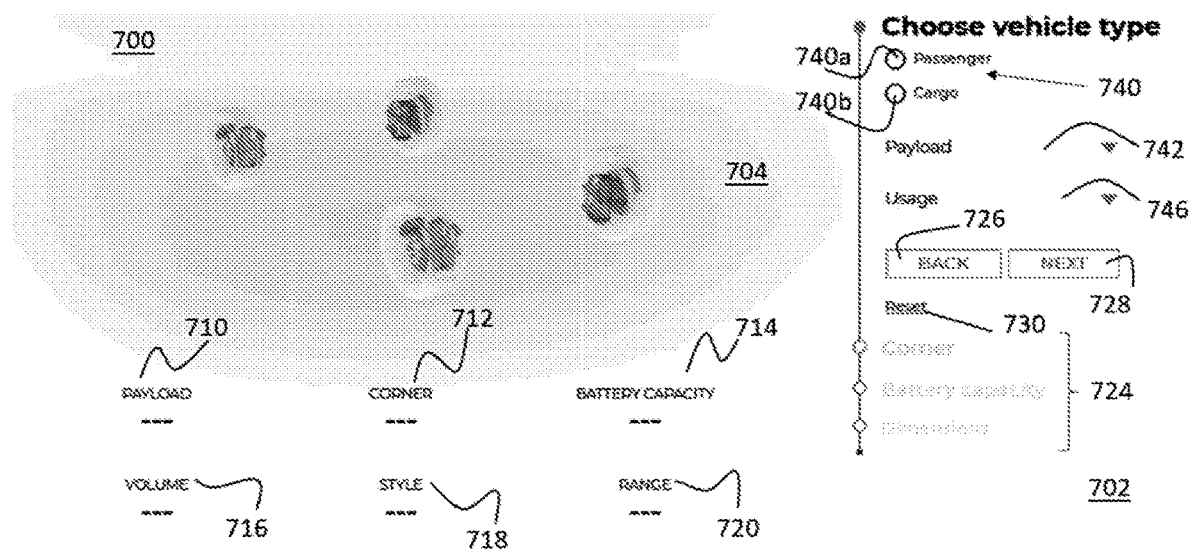
FIGS. 7A-7E illustrate components of a Graphic User Interface (GUI) for controlling design and manufacture of a mechanically and electrically compliant VCM-based vehicle according to embodiments of the disclosed technology.
Figure 7B:
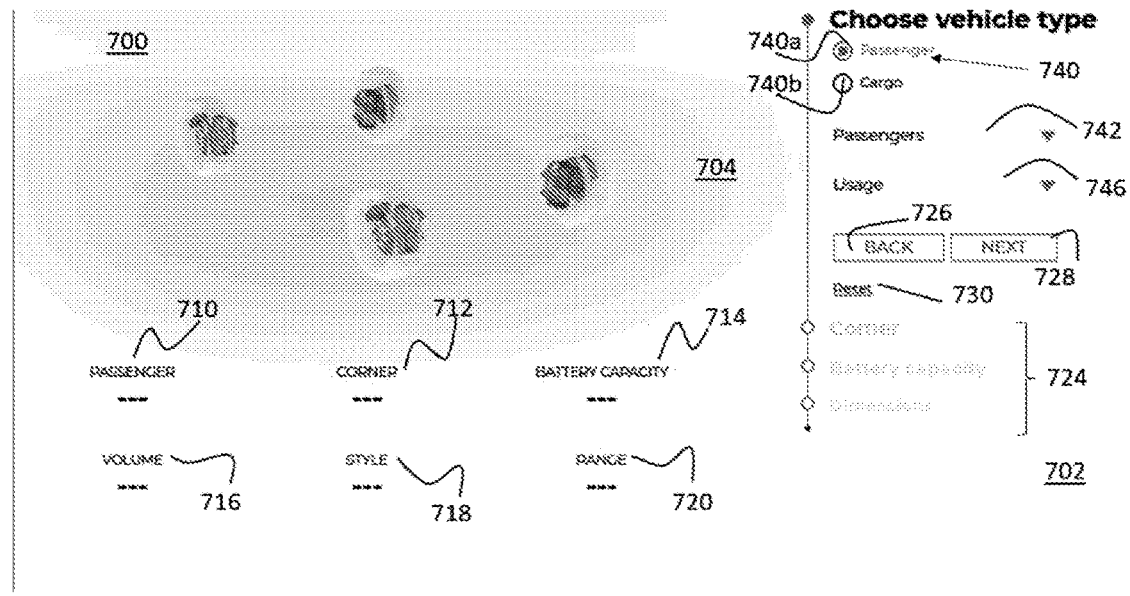
Figure 7C:
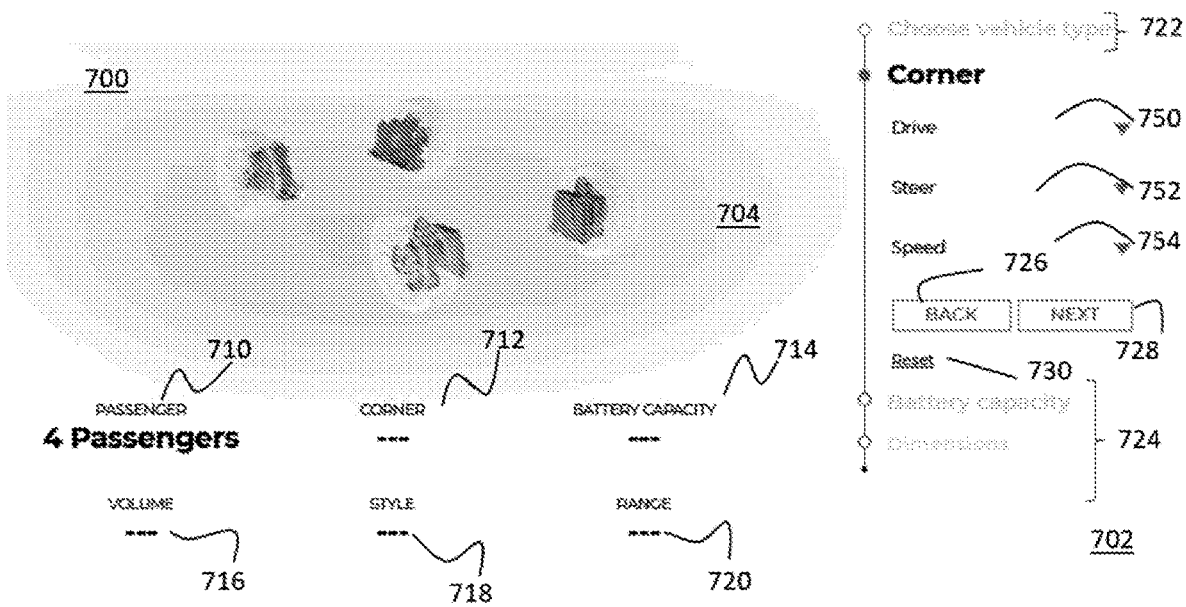
Figures 7D, 7E:
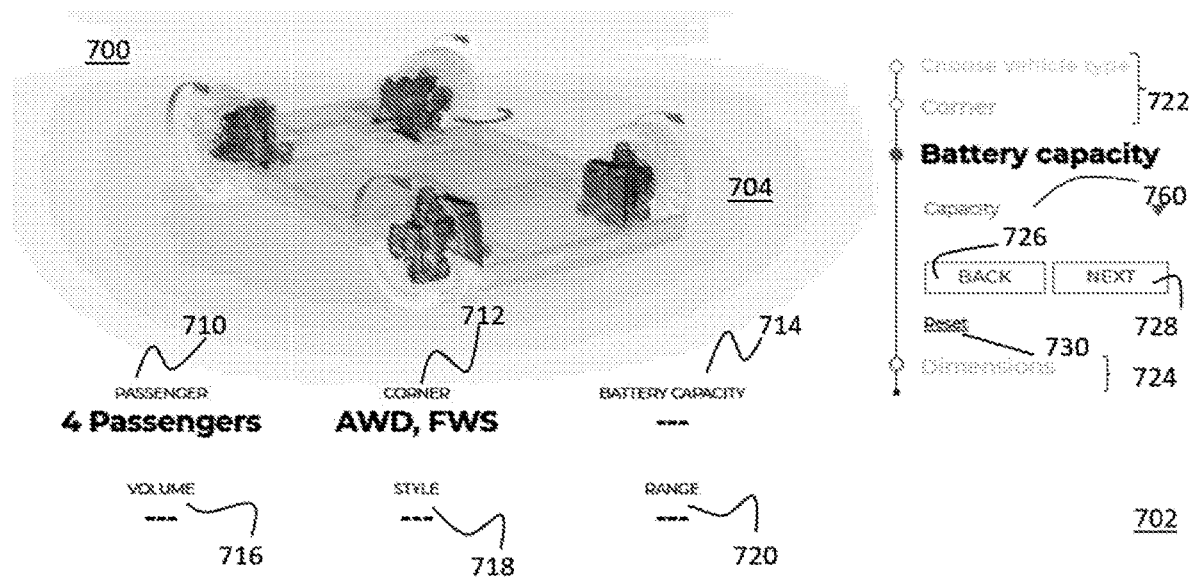

Selection region 702 is divided into four different segments: a vehicle type segment illustrated in FIGS. 7A and 7B, a corner segment illustrated in FIG. 7C, a battery segment illustrated in FIG. 7D, and a dimensions segment illustrated in FIG. 7E. In each of the segments, the selection region 702 includes a listing 722 of segments that still need to be completed (if such exist), and a listing 724 of segments already completed (if such exist). Additionally, each of the segments includes a 'BACK' UIC, here shown as 'BACK' button 726, which, when engaged by the user, returns the GUI to the previous segment, a 'NEXT' UIC, here shown as 'NEXT' button 728, which, when engaged by the user, moves the GUI to the next segment, and a 'RESET' UIC, here shown as 'Reset' link 730, which, when engaged by the user, resets the user selections in the current segment.

Turning specifically to FIG. 7A, it is seen that in the vehicle type segment, GUI 700 prompts the user to manually and explicitly select some characteristics of the vehicle. In the illustrated embodiment of GUI 700, the vehicle type segment includes a 'Type' UIC 740 allowing the user to select whether the type of vehicle being designed is a passenger vehicle or a cargo vehicle. In the illustrated embodiment, the 'Type' UIC includes two radio buttons—button 740*a* for selection of a passenger vehicle and button 740*b* for selection of a cargo vehicle. However, any other suitable 'Type' UIC, such as a dropdown list, a switch movable between multiple positions representing the different possible types, and the like, may be used to allow the user to select the type of vehicle.

The vehicle type segment further includes a user interface component that enables the user to select the maximal payload, or maximal number of passengers, the vehicle will be able to carry.

FIG. 7A illustrates a 'Payload' UIC 742, which may be the default UIC or may appear when the user engages the 'Type' UIC to select a 'Cargo' type. 'Payload' UIC 742 is illustrated as a dropdown menu, which, when engaged by the user, allows the user to select a single maximal payload value for the vehicle. However, the dropdown menu may be replaced by any other suitable 'Payload' UIC, such as radio buttons, a switch movable between different payload values, a checklist, and the like. As described hereinbelow, the options listed in the 'Payload' UIC are typically in weight units, such as in Kg.

FIG. 7B illustrates a 'Passengers' UIC 744, which may be the default UIC or may appear when the user engages the 'Type' UIC to select a 'Passenger' type. 'Passengers' UIC 744 is illustrated as a dropdown menu, which, when engaged by the user, allows the user to select a single maximal number of passengers for the vehicle. However, the dropdown menu may be replaced by any other suitable 'Passengers' UIC, such as radio buttons, a switch movable between different passenger numbers, a checklist, and the like.

As shown in FIGS. 7A and 7B, the vehicle type segment further includes a 'Usage' UIC 746, illustrated as a dropdown menu, which, when engaged by the user, allows the user to select a desired usage of the vehicle. Typically, desired usages may include whether the vehicle is intended for urban driving, highway driving, off-road driving, and the like. However, the 'Usage' UIC may be used to denote other aspects of usage of the vehicle, such as if the vehicle is intended to carry any special equipment (e.g. wheelchair ramp) and the like. The dropdown menu may be replaced by any other suitable 'Usage' UIC, such as radio buttons, a switch movable between different usage options, a checklist, and the like.

Turning now to FIG. 7C, it is seen that in the corner segment, the passenger/payload field 710 is filled out based on the user's selections in the vehicle type segment. In the illustrated embodiment of GUI 700, the corner segment includes a 'Drive' UIC 750 allowing the user to select which wheels control the driving of the vehicle being designed. In the illustrated embodiment, 'Drive' UIC 750 is illustrated as a dropdown menu. For example, the dropdown menu may include the values 'front wheel drive', 'back wheel drive', and 'all wheel drive'. However, the dropdown menu may be replaced by any other suitable 'Drive' UIC, such as radio buttons, a switch movable between different values, a checklist, and the like.

The corner segment further includes a 'Steer' UIC 752, which, when engaged by the user, allows the user to select which wheels control the steering of the vehicle being designed. In the illustrated embodiment, 'Steer' UIC 752 is illustrated as a dropdown menu. For example, the dropdown menu may include the values 'front wheel steering' and 'all wheel steering'. However, the dropdown menu may be replaced by any other suitable 'Steer' UIC, such as radio buttons, a switch movable between different values, a checklist, and the like.

The corner segment may further include a 'Speed' UIC 754, which, when engaged by the user, allows the user to select the maximal speed of the vehicle being designed. In the illustrated embodiment, 'Speed' UIC 754 is illustrated as a dropdown menu. For example, the maximal speed of the vehicle may be defined in Kilometers per Hour (KpH) or in Miles per Hour (MpH). However, the dropdown menu may be replaced by any other suitable 'Speed' UIC, such as radio buttons, a slider movable between different values, a checklist, and the like.

Referring to FIG. 7D, it is seen that in the battery segment, the corner field 712 is filled out based on the user's selections in the corner segment (in addition to the passenger/payload field 710 remaining filled out, as it was in the corner segment). Additionally, the image shown in the image portion of presentation region 704 is updated to reflect the choices made by the user with respect to the number of passengers and with respect to the corners.

In the illustrated embodiment of GUI 700, the battery segment includes a 'Capacity' UIC 760 allowing the user to select the desired battery capacity of the vehicle being designed. In the illustrated embodiment, 'Capacity' UIC 760 is illustrated as a dropdown menu. For example, the dropdown menu may include values measured in Kilowatt Hour (kWh). However, the dropdown menu may be replaced by any other suitable 'Capacity' UIC, such as radio buttons, a switch or slider movable between different values, a checklist, and the like.

Turning now to FIG. 7E, it is seen that in the dimensions segment, the battery capacity field 714 is filled out based on the user's selections in the battery segment (in addition to the passenger/payload field 710 and the corner field 712 remaining filled out, as they were in the battery segment). Additionally, the image shown in the image portion of presentation region 704 is updated to enable the user to visualize the changes to dimensions, as will be selected by user engagement with the dimensions segment of GUI 700.

In the illustrated embodiment of GUI 700, the dimensions segment includes a 'Body Style' UIC 770 allowing the user to select the desired shape, or style, of the vehicle being designed. In the illustrated embodiment, 'Body Style' UIC 770 is illustrated as a dropdown menu. For example, the dropdown menu may include values such as 'Sedan', 'Taxi', 'Van', 'Truck', 'Bus', and the like. However, the dropdown menu may be replaced by any other suitable 'Body Style' UIC, such as radio buttons, a switch or slider movable between different values, a checklist, and the like.

In the illustrated embodiment of GUI 700, the dimensions segment further includes a 'Length' UIC 772, a 'Width' UIC 774, and a 'Height' UIC 776 allowing the user to select the desired dimensions of the vehicle being designed. In the illustrated embodiment, each of UICs 772, 774, and 776 is illustrated as slider, allowing the user to select any of a plurality of values between a minimal value for the dimension and a maximal value for the dimension. Such a slider allows for extreme user flexibility in the design of the vehicle dimensions. Additionally, in the illustrated embodiment the selected value for each dimension is also displayed in a text field adjacent the dimension name. In some embodiments, as the sliders 772, 774, and/or 776 are moved, the volume field 716 may be updated to reflect the volume of a vehicle of the currently selected dimensions. In some embodiments, in which the dimensions of the vehicle impact the maximal range it is possible to drive using a (previously selected) specific battery capacity, as the sliders 772, 774, and/or 776 are moved, the range field 720 may be updated to reflect the maximal range of a vehicle of the currently selected dimensions and the previously selected battery capacity. In some embodiments, any one or more of sliders 772, 774, and 776 may be replaced by any other suitable dimension UIC, such as radio buttons, a dropdown menu, a checklist, and the like. However, use of such alternative UICs may limit the user's selection to specific pre-defined values, and may allow the user less flexibility in designing the vehicle.

In some embodiments, different UICs may appear in the different segments of the GUI. For example, in some embodiments, 'Body Style' UIC 770 may form part of the vehicle type segment, instead of part of the dimensions segment as in the illustrated embodiment. As another example, in some embodiments, 'Usage' UIC 746 may form part of the corner segment, instead of part of the vehicle type segment as in the illustrated embodiment.

Additionally, in some embodiments, the regions of GUT 700 may be arranged differently on the display. For example, in the illustrated embodiment, selection region 702 is displayed on the left hand side of GUI 700, whereas presentation region 704 is displayed on the right hand side, with the image portion disposed above the text portion. However, in other embodiments, the selection region may be placed differently relative to the presentation region.

For example, the selection region may be disposed on the left hand side of the GUI, and the presentation region may be disposed on the right hand side. Additionally or alternatively, the image portion of the presentation region may be disposed beneath the text portion. In some embodiments, the text portion of presentation region 704 may include additional fields, or may include fewer fields. For example, the text may include a text field for each selection made by user engagement of any UIC.

Furthermore, in some embodiments, the indication of segments already completed (similar to list 722) and of segments to still be completed (similar to list 724) may, for example, form part of the text portion of the presentation region, and may include a different form of indication of completion, such as a check-mark.

It is appreciated that some VCM characteristics may be unaffected by, or independent from, the selection of vehicle characteristics. Additionally, some vehicle parameters may be unaffected by, or independent from, the selection of VCM characteristics.

For example, according to some embodiments, a calculated length of the platform chassis of the vehicle is not affected by the selection of the VCM type (e.g. steering type, driving type) by more than 10%. In some embodiments, the calculated length of the platform chassis of the vehicle is not affected by the selection of the VCM type (e.g. steering type, driving type) by more than 5%.

As another example, according to some embodiments, the calculated width of the platform chassis of the vehicle is not affected by the selection of the VCM type (e.g. steering type, driving type) by more than 10%. In some embodiments, the calculated width of the platform chassis of the vehicle is not affected by the selection of the VCM type (e.g. steering type, driving type) by more than 5%. As yet another example, according to some embodiments, the calculated payload of the vehicle is not affected by the selection of the VCM type (e.g. steering type, driving type) by more than 10%. In some embodiments, the calculated payload of the vehicle is not affected by the selection of the VCM type (e.g. steering type, driving type) by more than 5%.

By contrast, according to some embodiments, a range of steering radius may be calculated based on one or more of the size of the vehicle (e.g. length, width), and type of VCM steering selection (e.g. AWS, RWS), as discussed in further detail hereinbelow.

Figure 8A:
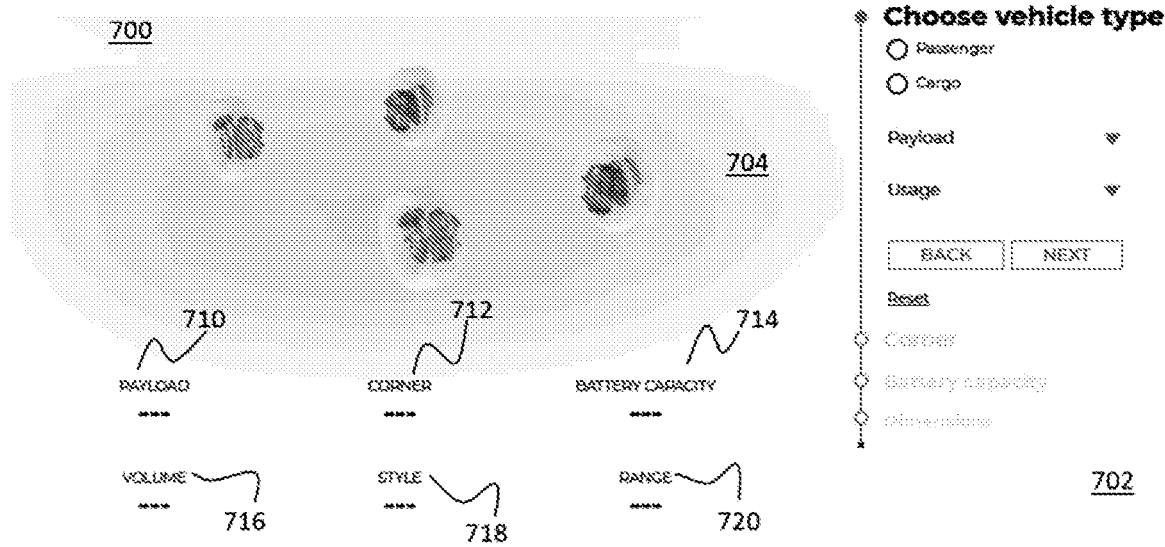
FIGS. 8A-8Y illustrate a first example of user engagements with the user interface components of FIGS. 7A-7E.
Figure 8B:
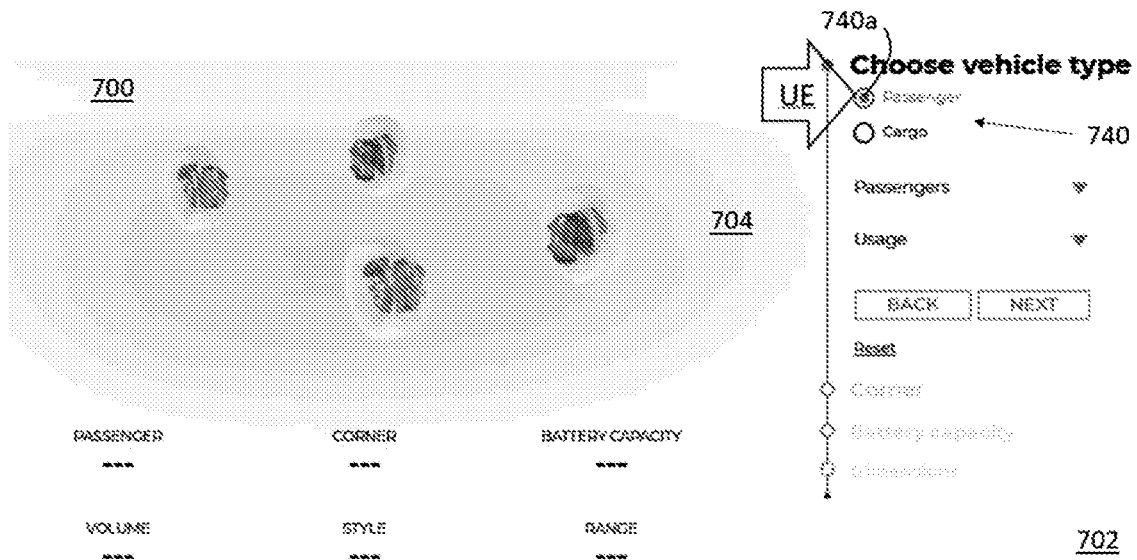
Figure 8C:
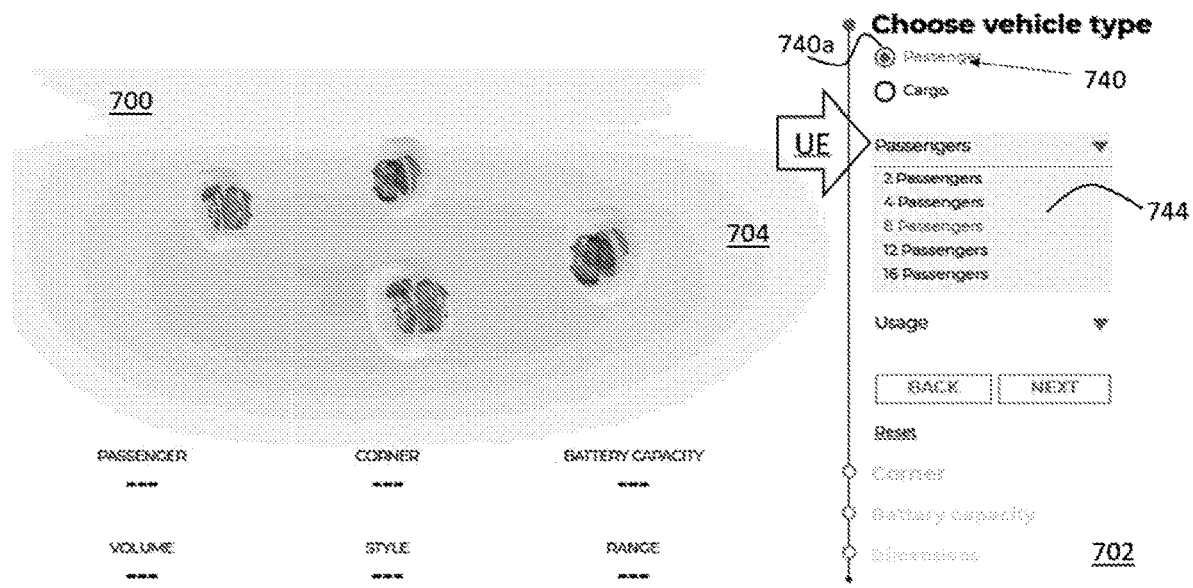
Figure 8D:
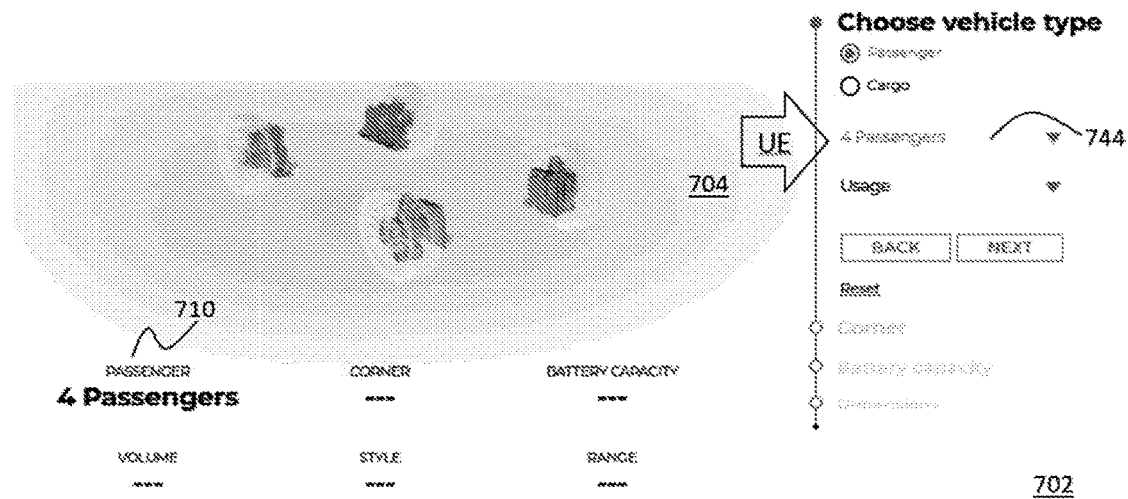
Figure 8E:
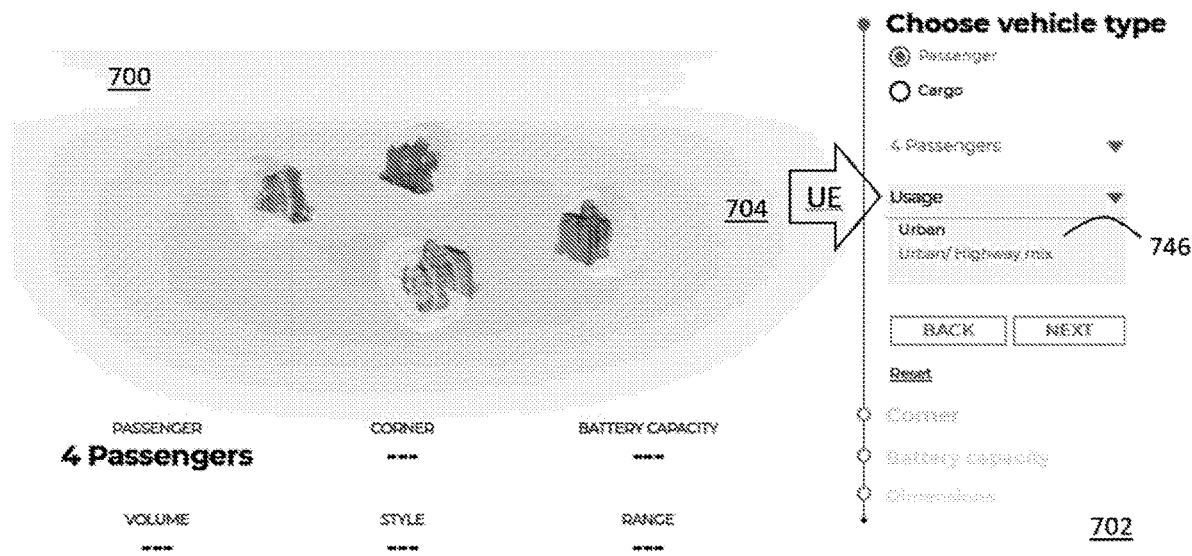
Figure 8F:
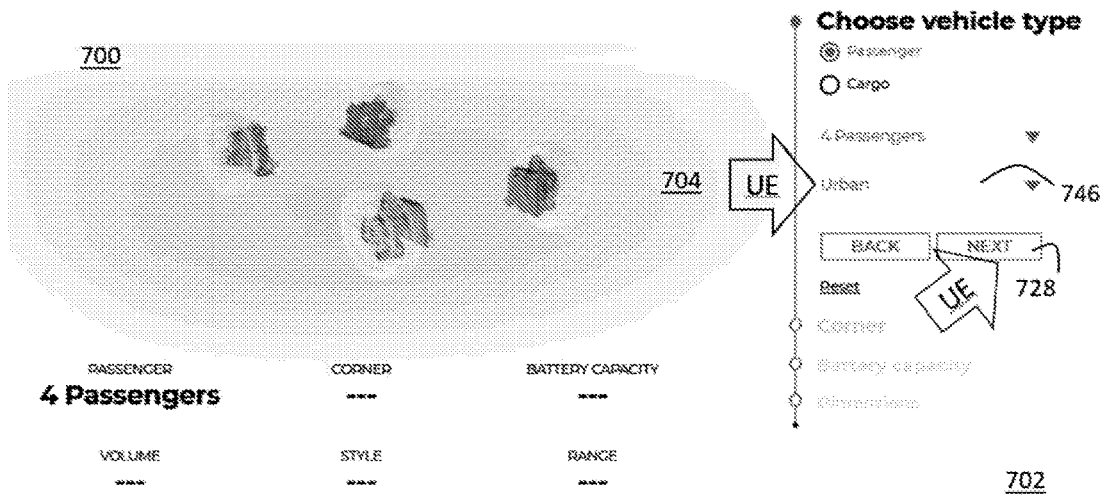
Figure 8G:
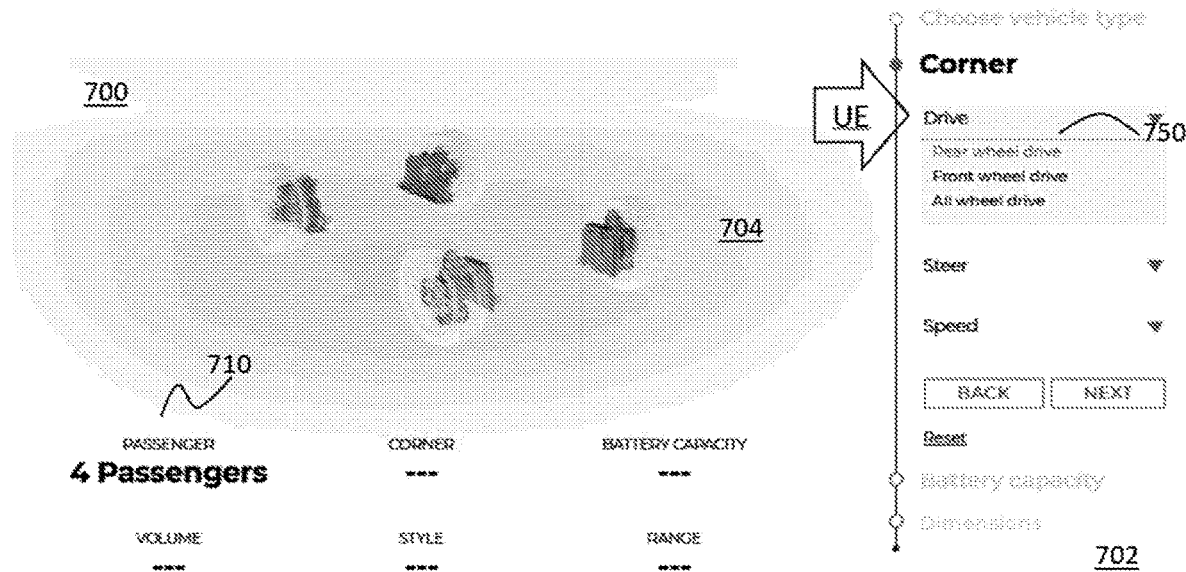
Figure 8H:
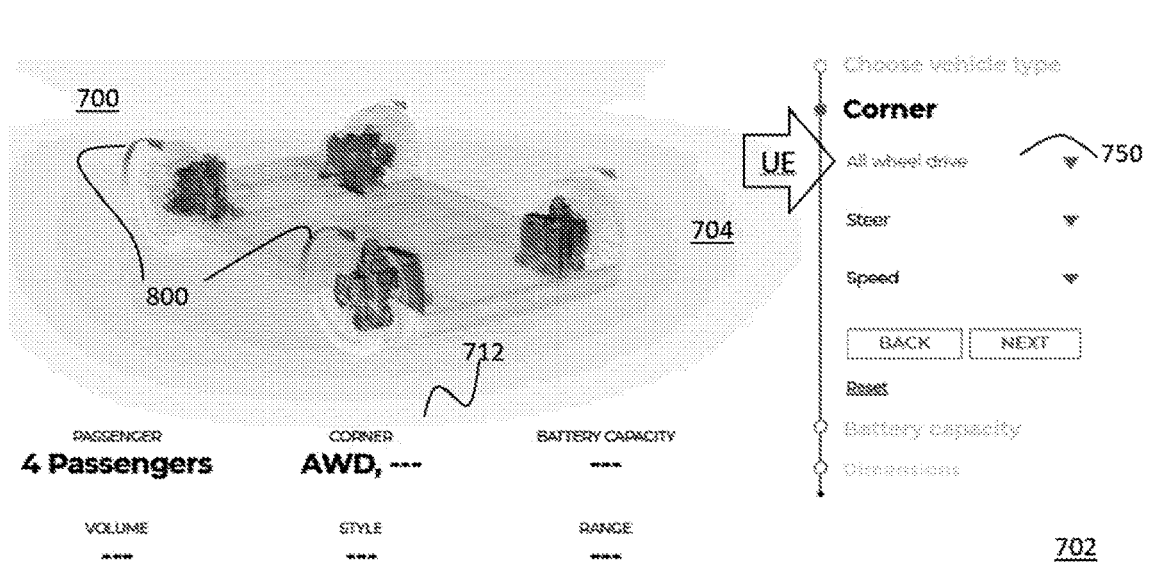
Figure 8I:
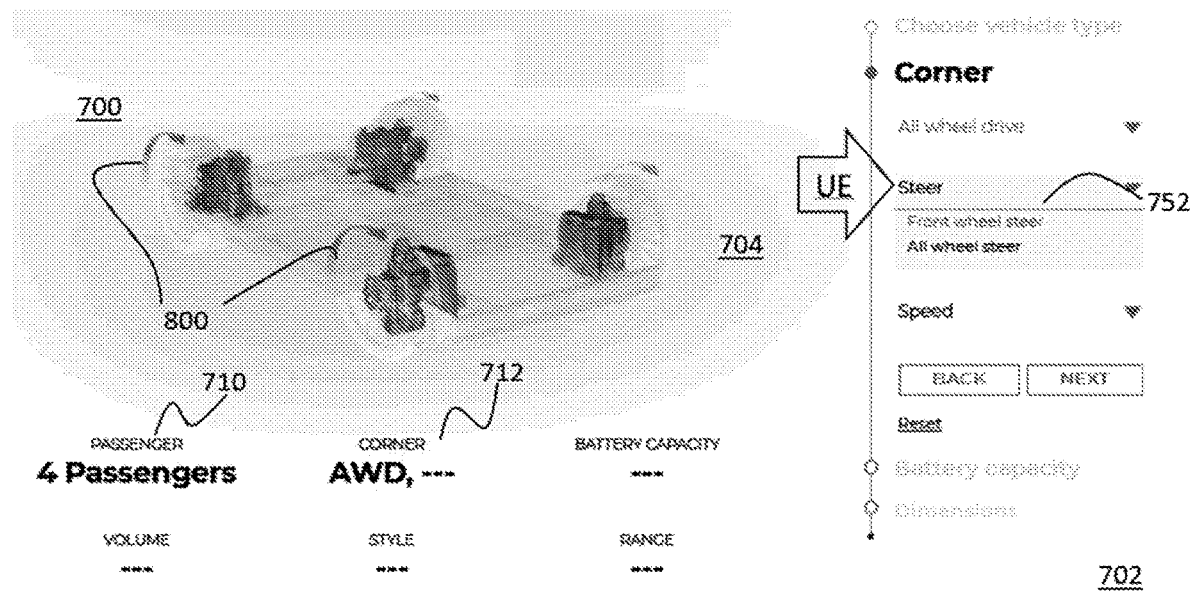
Figure 8J:
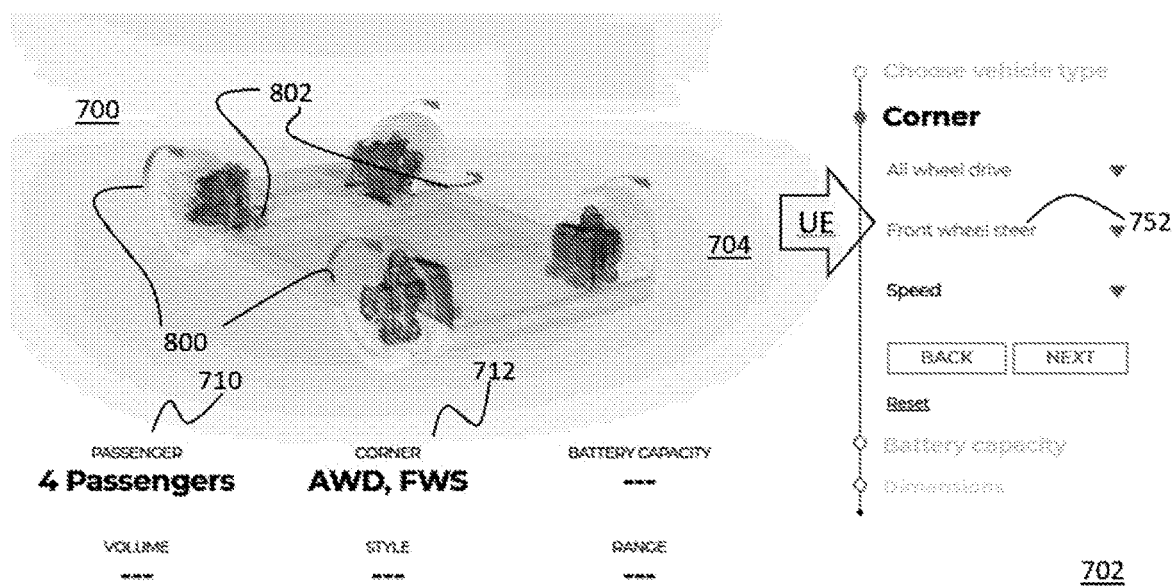
Figure 8K:
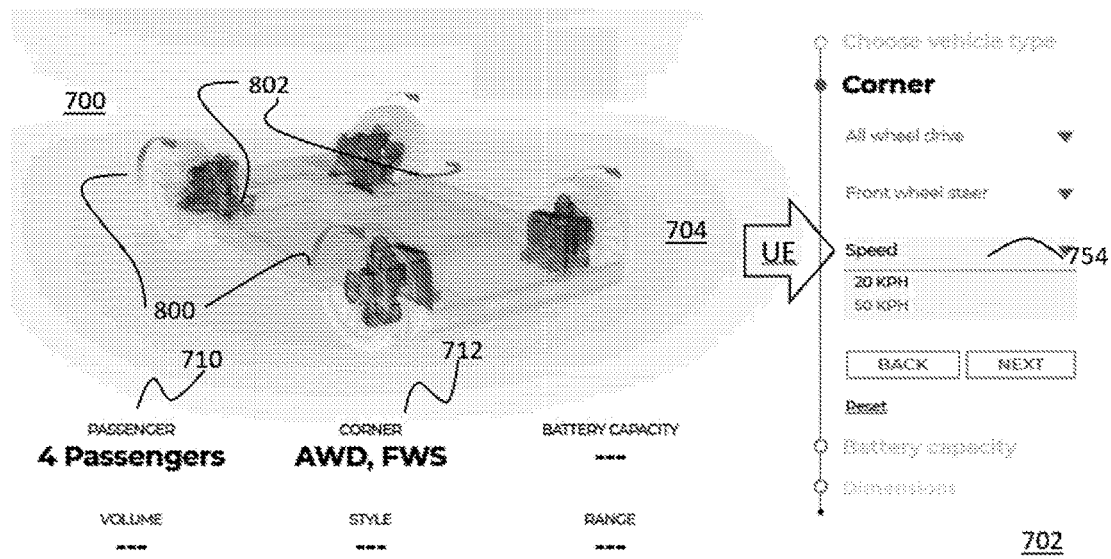
Figure 8L:
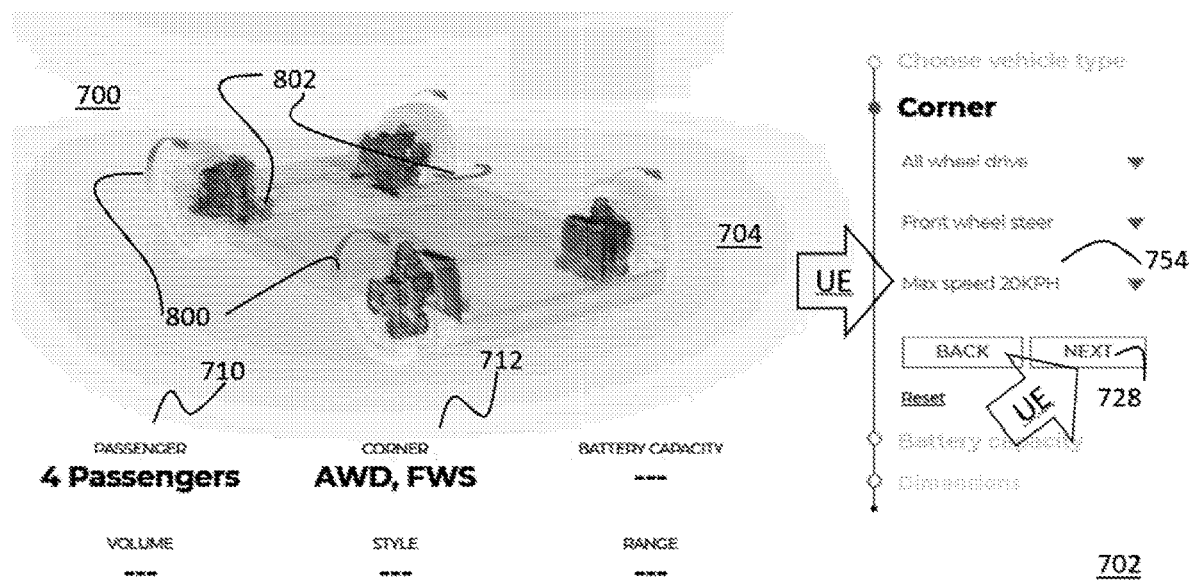
Figure 8M:
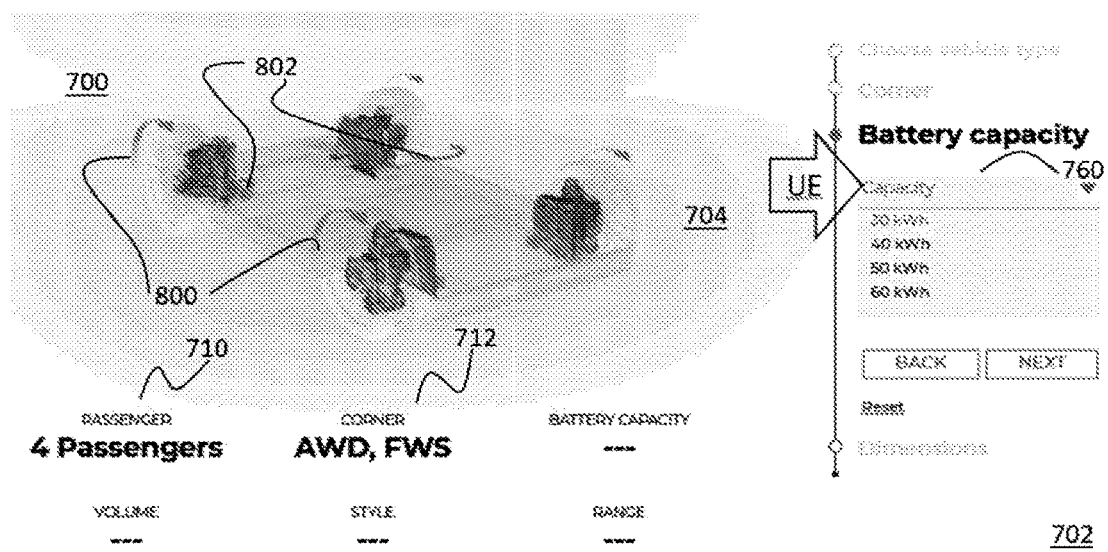
Figure 8N:
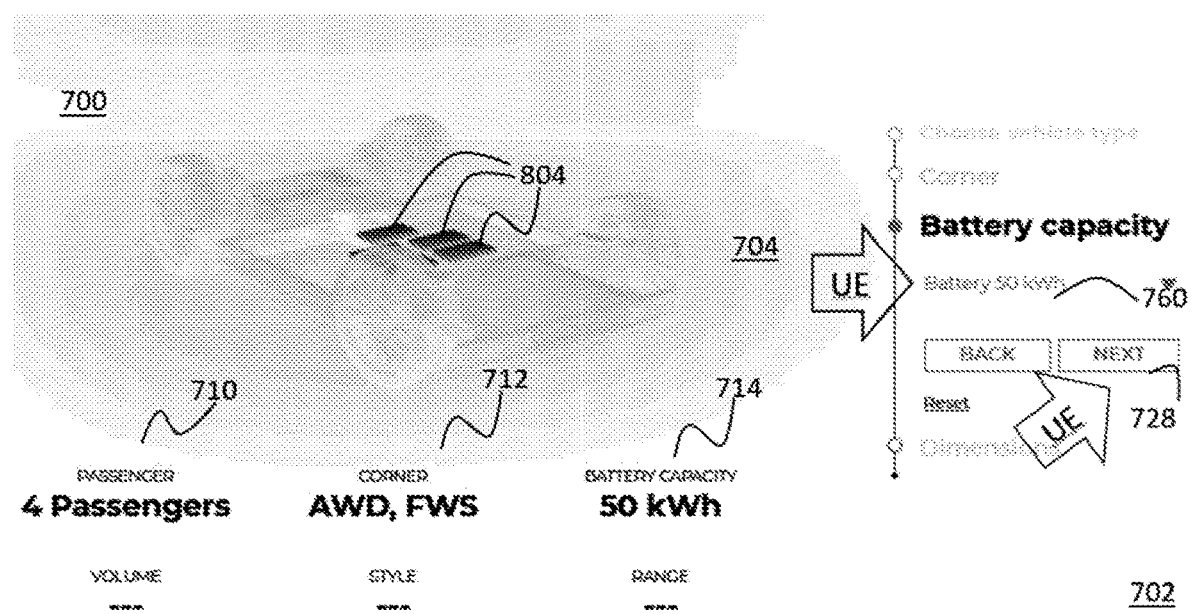
Figure 8O:
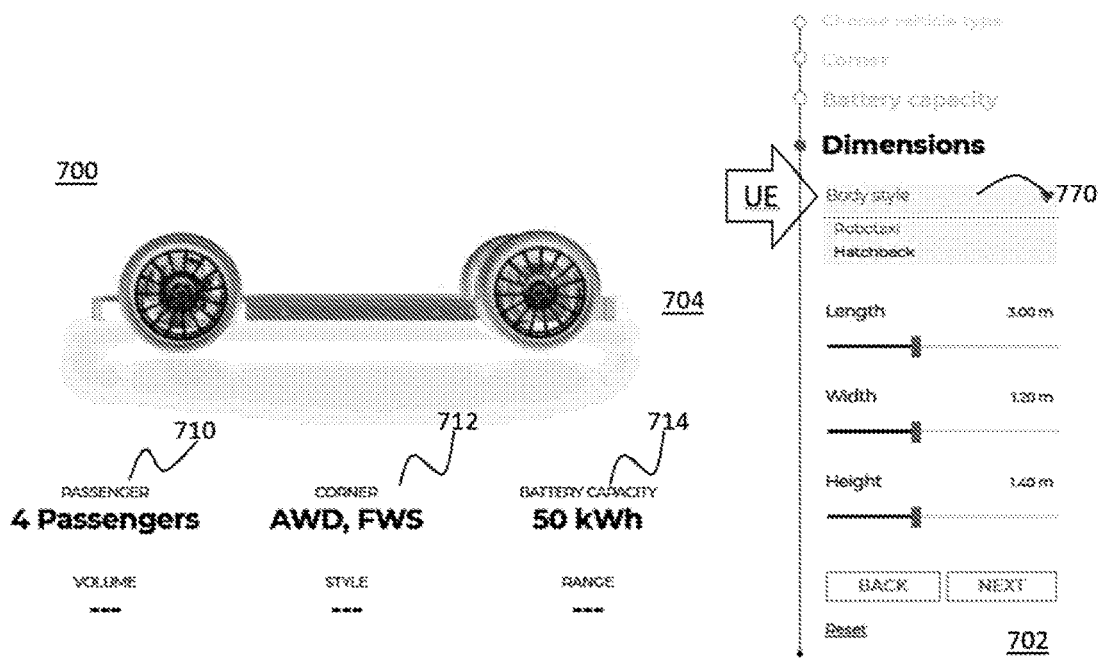
Figure 8P:
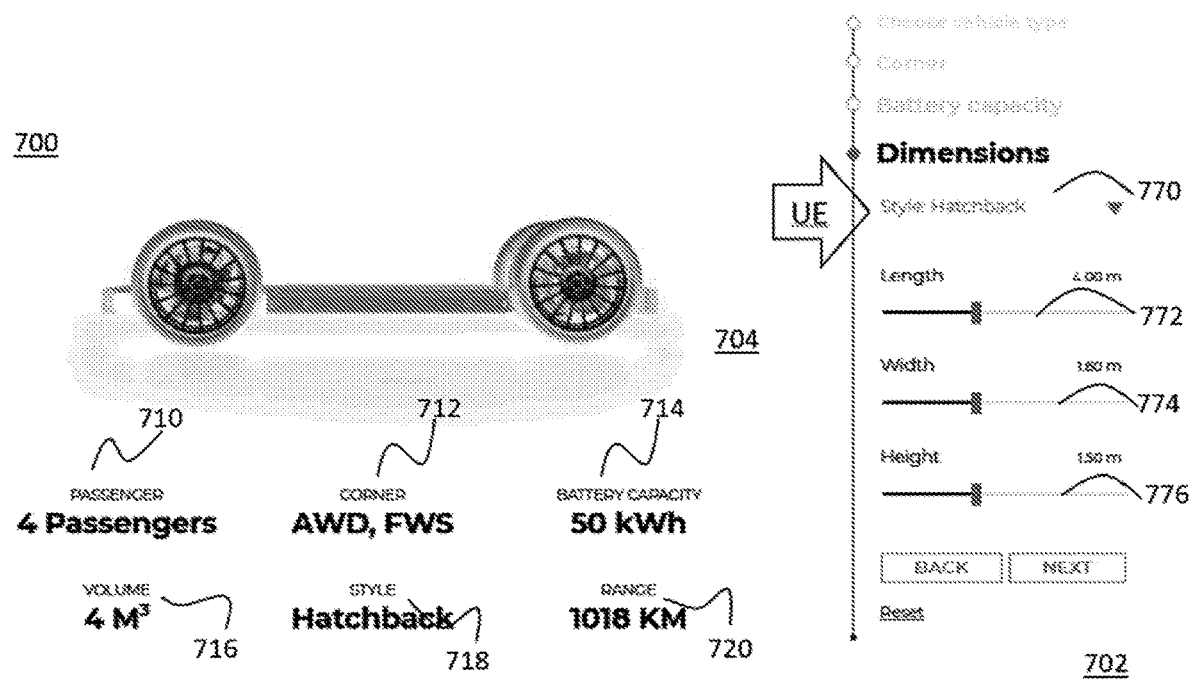
Figure 8Q:
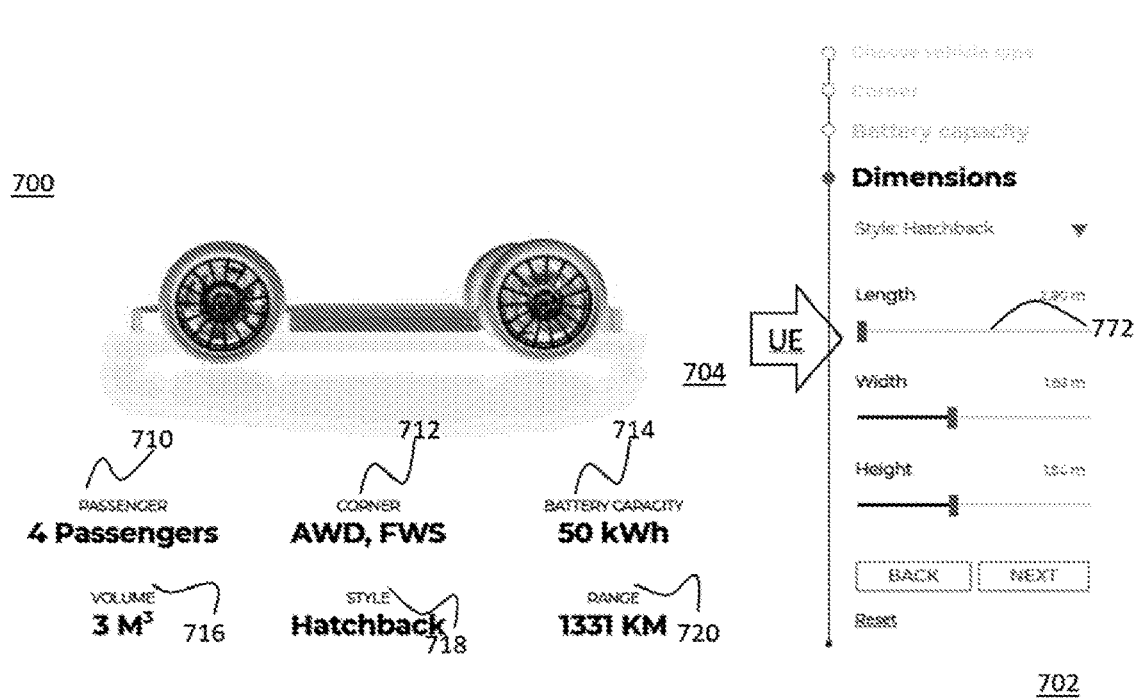
Figure 8R:
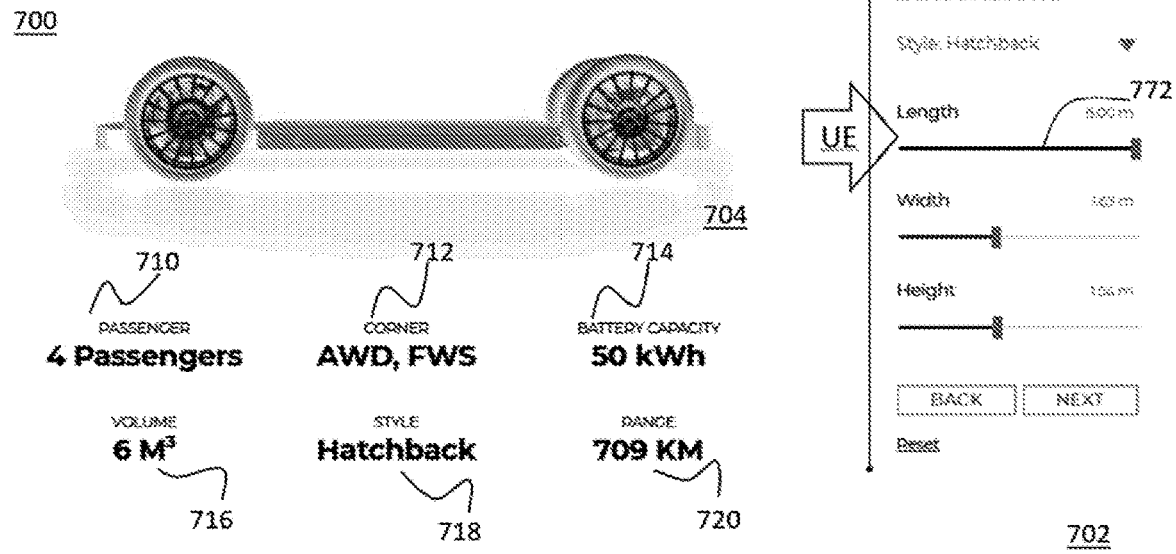
Figure 8S:
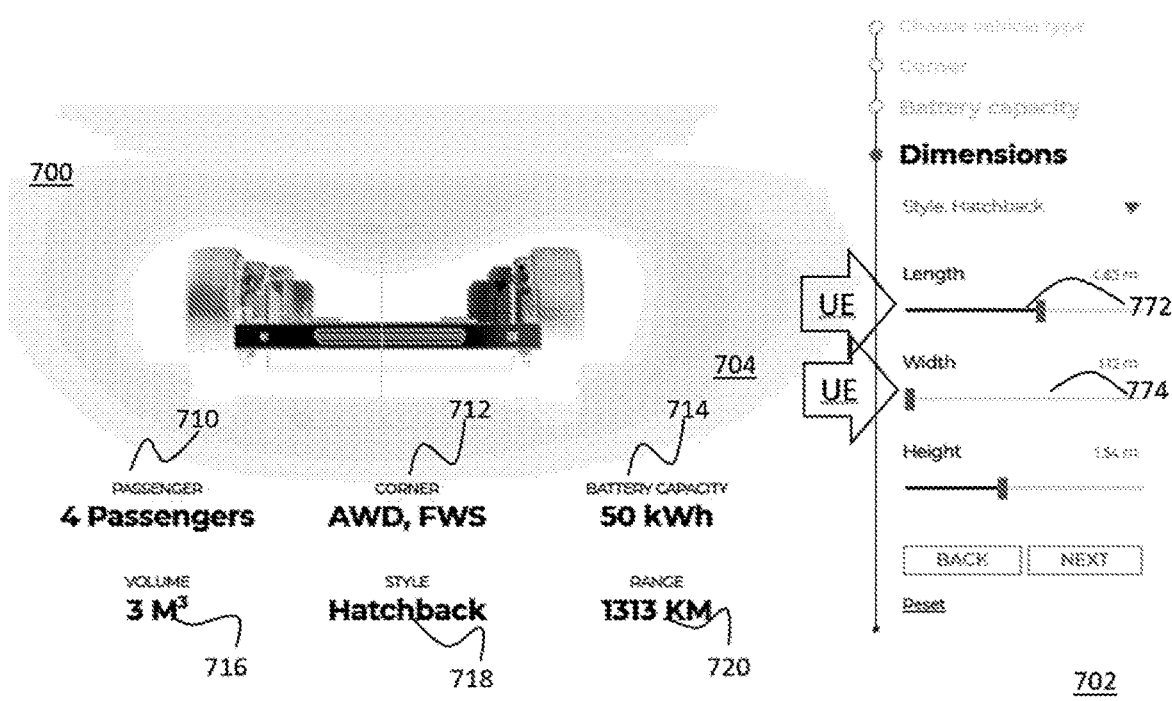
Figure 8T:
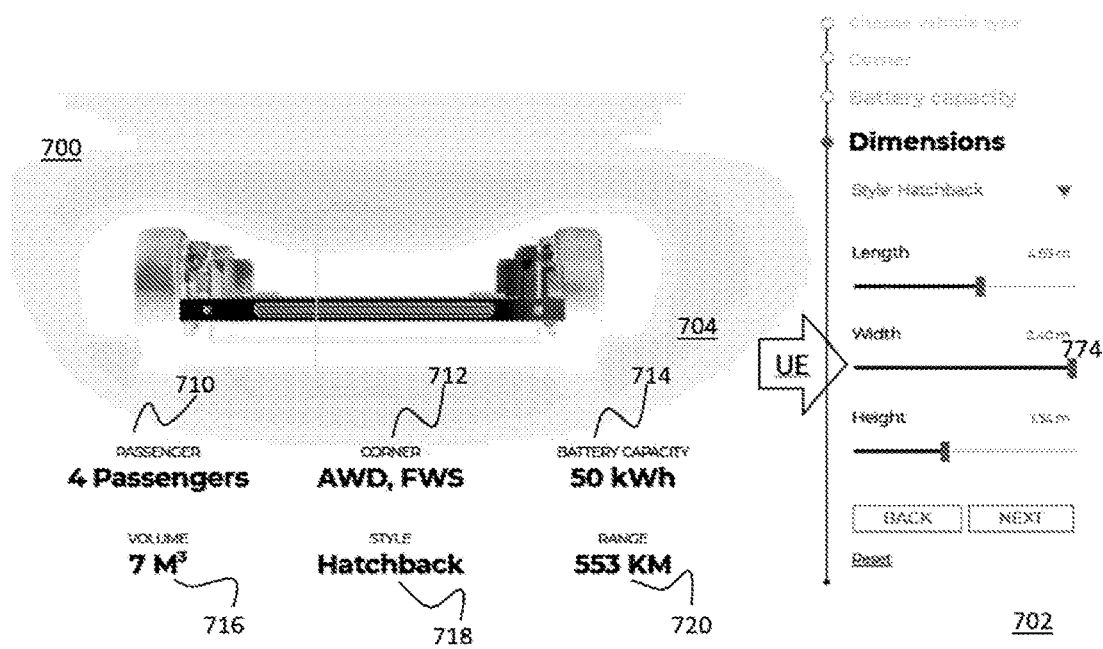
Figure 8U:
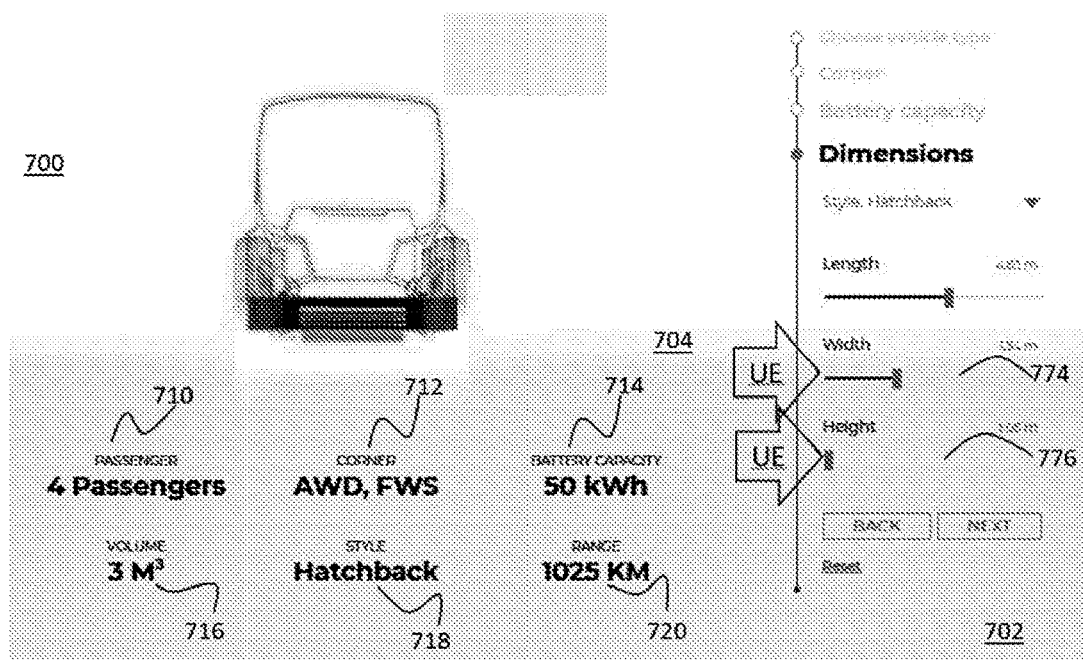
Figure 8V:
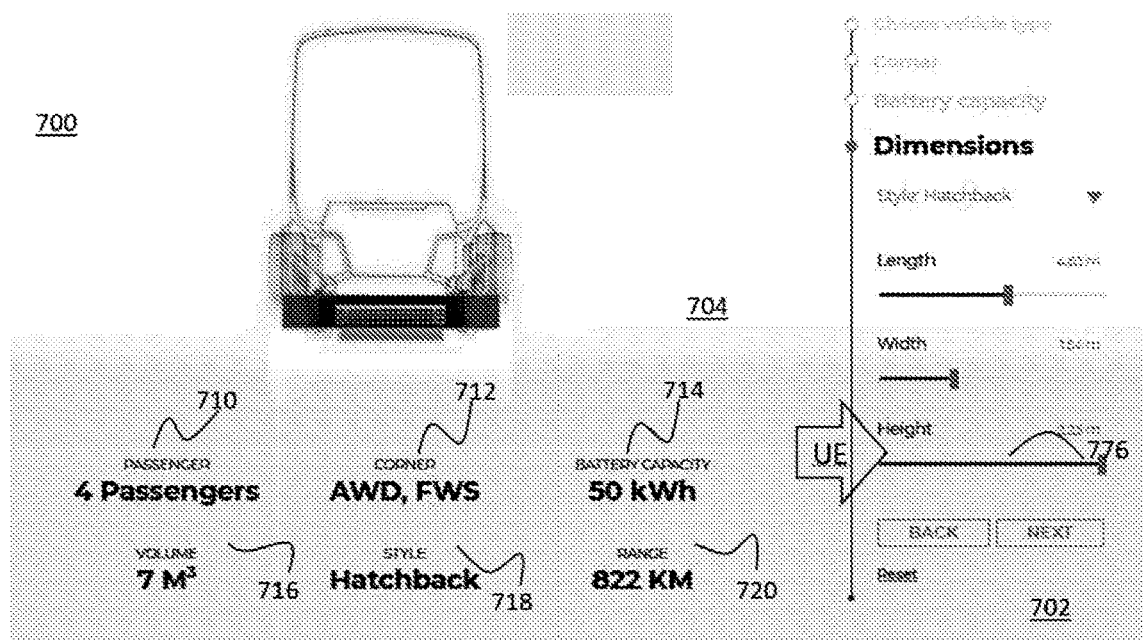
Figure 8Y:
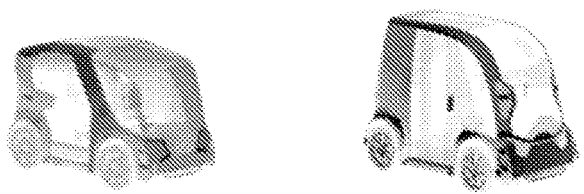

Reference is now made to FIGS. 8A-8Y, which illustrate a first example of user engagements with user interface components of GUI 700 of FIGS. 7A-7E.

In all of FIGS. 8A to 8Z, UE is an abbreviation for 'user engagement'—this relates to a user engagement of a UIC of GUI 700. For example, the user provides a mouse click (e.g. depressing a mouse button) when a mouse pointer is located in a specific location of the UIC. The skilled artisan will appreciate that a mouse click is just one example of a user engagement of a UIC or portion thereof. In another example, a mouse-pointer points to a UIC without any need for a mouse-click; in another example, a user touches with his or her finger (or with a stylus) a UIC for 'user engagement', or depresses a button on the keyboard when a UIC is selected, for 'user engagement'.

In FIG. 8A, no selection has yet been made by the user in GUI 700. Consequently, no value is shown in any of text fields 710, 712, 714, 716, 718, and 720, and the image portion of presentation region 704 shows a default image.

In FIG. 8B, the user selects that the vehicle should be a passenger vehicle, by user engagement of radio button 740*a* of the 'Type' UIC 740.

In FIG. 8C, user engagement of the 'Passengers' UIC 744 causes the dropdown menu of UIC 744 to open up, allowing the user to select whether the vehicle will be suitable for 2, 4, 8, 12, or 16 passengers. As seen in FIG. 8C, the previous selection made by user engagement with 'Type' UIC 740 remains visible. If necessary, the relative location of the UICs in selection region 702 may change in response to user engagement with one or more UICs, to ensure that all the UICs of the segment remain visible even when a long dropdown menu opens up, or there is other engagement of UICs.

In FIG. 8D, the user selects that the vehicle should be suitable for four passengers, by user engagement of the appropriate line of the dropdown menu of 'Passengers' UIC 744. As seen, passenger/payload field 710 of the text region of presentation portion 704 has changed to reflect the user's selection, and now indicates that the vehicle being designed is suitable for four passengers.

In FIG. 8E, user engagement of the 'Usage' UIC 746 causes the dropdown menu of UIC 746 to open up, allowing the user to select whether the vehicle will be used for urban driving or for a combination of urban/highway driving. As seen in FIG. 8E, the previous selections made by user engagement with other UICs in the segment remain visible.

In FIG. 8F, the user selects that the vehicle should be suitable for urban driving, by user engagement of the appropriate line of the dropdown menu of 'Usage' UIC 746. The user then engages the 'NEXT' UIC button 728, to confirm the selection made in the vehicle type segment, and move to the next segment of GUI 700, namely the corner segment.

Turning to FIG. 8G, it is seen that following the user engagement of 'NEXT' UIC button 728, selection region 702 has changed to display the corner segment. As seen, user engagement of 'Drive' UIC 750 causes the dropdown menu of UIC 750 to open up, allowing the user to select whether the vehicle will be have rear wheel drive, front wheel drive, or all wheel drive. As seen in FIG. 8G, the previous selections made by user engagement of UICs of the vehicle type segment are no longer visible, and can only be accessed by engaging the 'BACK' UIC button. However, the information in the text region of presentation portion 704 remains visible.

In FIG. 8H, the user selects that the vehicle should have all wheel drive, by user engagement of the appropriate line of the dropdown menu of 'Drive' UIC 750. As seen, corner field 712 of the text region of presentation portion 704 has changed to reflect the user's selection, and now indicates that the vehicle being designed is an AWD (all wheel drive) vehicle. Additionally, the image region of presentation portion 704 reflects that the vehicle is selected to be an all wheel drive vehicle, by addition of arrows 800 adjacent all four wheels.

In FIG. 8I, user engagement of the 'Steer' UIC 752 causes the dropdown menu of UIC 752 to open up, allowing the user to select whether the vehicle will have front wheel steering or all wheel steering. As seen in FIG. 8I, the previous selections made by user engagement with other UICs in the corner segment remain visible, as well as the indications added to the image region of presentation portion 704.

In FIG. 8J, the user selects that the vehicle should have front wheel steering, by user engagement of the appropriate line of the dropdown menu of 'Steer' UIC 752. As seen, corner field 712 of the text region of presentation portion 704 has changed to reflect the user's selection, and now indicates that the vehicle being designed is an AWD and FWS (front wheel steer) vehicle. Additionally, the image region of presentation portion 704 reflects that the vehicle is selected to be an all wheel drive vehicle, by addition of arrows 802 adjacent the two front wheels.

In FIG. 8K, user engagement of the 'Speed' UIC 754 causes the dropdown menu of UIC 754 to open up, allowing the user to select the maximal speed of the vehicle. In the current example, the available maximal speeds are 20 KPH or 50 KPH. As seen in FIG. 8K, the previous selections made by user engagement with other UICs in the corner segment remain visible, as well as the indications added to the image region of presentation portion 704.

In FIG. 8L, the user selects that the vehicle should have a maximal speed of 20 KPH, by user engagement of the appropriate line of the dropdown menu of 'Speed' UIC 754. The user then engages the 'NEXT' UIC button 728, to confirm the selection made in the corner segment, and move to the next segment of GUI 700, namely the battery capacity segment.

Turning to FIG. 8M, it is seen that following the user engagement of 'NEXT' UIC button 728, selection region 702 has changed to display the battery capacity segment. As seen, user engagement of 'Capacity' UIC 760 causes the dropdown menu of UIC 760 to open up, allowing the user to select whether the vehicle battery will be have a capacity of 30 kWh, 40 kWh, 50 kWh, or 60 kWh. As seen in FIG. 8M, the previous selections made by user engagement of UICs of the vehicle type and corner segments are no longer visible, and can only be accessed by engaging the 'BACK' UIC button. However, the information in the text and image regions of presentation portion 704 remains visible.

In FIG. 8N, the user selects that the vehicle should have a battery capacity of 50 kWh, by user engagement of the appropriate line of the dropdown menu of 'Capacity' UIC 760. As seen, battery capacity field 714 of the text region of presentation portion 704 has changed to reflect the user's selection, and now indicates that the battery capacity is 50 kWh. Additionally, the image region of presentation portion 704 reflects that the vehicle is selected to have a battery capacity of 50 kWh, by showing five 'batteries' 804 on a representation of the chassis of the vehicle. The user then engages the 'NEXT' UIC button 728, to confirm the selection made in the battery capacity segment, and move to the next segment of GUI 700, namely the dimensions segment.

Turning to FIG. 8O, it is seen that following the user engagement of 'NEXT' UIC button 728, selection region 702 has changed to display the dimensions segment. As seen, user engagement of 'Body Style' UIC 770 causes the dropdown menu of UIC 770 to open up, allowing the user to select whether the vehicle will be a robotaxi vehicle or a hatchback vehicle. As seen in FIG. 8O, the previous selections made by user engagement of UICs of the vehicle type, corner, and battery capacity segments are no longer visible, and can only be accessed by engaging the 'BACK' UIC button. However, the information in the text region of presentation portion 704 remains visible.

In FIG. 8P, the user selects that the vehicle should be a hatchback vehicle, by user engagement of the appropriate line of the dropdown menu of 'Body Style' UIC 770. As a result, length, width, and height UICs 772, 774, and 776 now reflect default values for a hatchback vehicle. Specifically, the default values include a length of 4.00 m, a width of 1.60 m, and a height of 1.50 m. As seen, style field 718 of the text region of presentation portion 704 has changed to reflect the user's selection, and now indicates that the vehicle being designed is an hatchback vehicle. Additionally, the volume field 716 and range field 720 have been updated to include suitable values, calculated based on the selected vehicle style, selected battery capacity, and the default dimensions for that vehicle style. The image region of presentation portion 704 has changed to show a side view of the chassis of the vehicle.

Turning to FIG. 8Q, it is seen that user engagement of 'Length' UIC 772 has moved the slider thereof to the rightmost position, indicating the smallest length of the vehicle, namely 2.80 m. Consequently, the volume field 716 has been updated to reflect a smaller volume than that shown in FIG. 8P, in which the length of the vehicle was greater. Conversely, the range field 720 has been updated to reflect a longer range than that shown in FIG. 8P. The image region of presentation portion 704 has changed, relative to that shown in FIG. 8P to reflect the shorter chassis of the vehicle.

In FIG. 8R, it is seen that user engagement of 'Length' UIC 772 has moved the slider thereof to the leftmost position, indicating the greatest length of the vehicle, namely 6.00 m. Consequently, the volume field 716 has been updated to reflect a larger volume than that shown in FIGS. 8P and 8Q, in which the length of the vehicle was smaller. Conversely, the range field 720 has been updated to reflect a shorter range than that shown in FIGS. 8P and 8Q. The image region of presentation portion 704 has changed, relative to that shown in FIGS. 8P and 8Q to reflect the longer chassis of the vehicle.

Turning to FIG. 8S, it is seen that user engagement of 'Length' UIC 772 has moved the slider thereof to an interim position, indicating a vehicle length of 4.63 m. Additionally, user engagement of 'Width' UIC 774 has moved the slider thereof to the rightmost position, indicating the smallest width of the vehicle, namely 1.12 m Consequently, the volume field 716 has been updated to reflect a smaller volume than that shown in FIG. 8R, in which the length of the vehicle was greater and the width of the vehicle was greater. Conversely, the range field 720 has been updated to reflect a longer range than that shown in FIG. 8R. The image region of presentation portion 704 has changed to reflect the width of the chassis of the vehicle.

In FIG. 8T, it is seen that user engagement of 'Width' UIC 774 has moved the slider thereof to the leftmost position, indicating the greatest width of the vehicle, namely 2.40 m. Consequently, the volume field 716 has been updated to reflect a larger volume than that shown in FIG. 8S, in which the width of the vehicle was smaller. Conversely, the range field 720 has been updated to reflect a shorter range than that shown in FIG. 8S. The image region of presentation portion 704 has changed, relative that shown in FIG. 8S to reflect the greater width of the chassis of the vehicle.

Turning to FIG. 8U, it is seen that user engagement of 'Width' UIC 774 has moved the slider thereof to an interim position, indicating a vehicle width of 1.54 m. Additionally, user engagement of 'Height' UIC 776 has moved the slider thereof to the rightmost position, indicating the smallest width of the vehicle, namely 1.05 m Consequently, the volume field 716 has been updated to reflect a smaller volume than that shown in FIG. 8T, in which the width of the vehicle was greater and the height of the vehicle was greater. Conversely, the range field 720 has been updated to reflect a longer range than that shown in FIG. 8T. The image region of presentation portion 704 has changed to reflect the height of the vehicle.

In FIG. 8V, it is seen that user engagement of 'Height' UIC 776 has moved the slider thereof to the leftmost position, indicating the greatest width of the vehicle, namely 2.25 m. Consequently, the volume field 716 has been updated to reflect a larger volume than that shown in FIG. 8U, in which the height of the vehicle was smaller. Conversely, the range field 720 has been updated to reflect a shorter range than that shown in FIG. 8U. The image region of presentation portion 704 has changed, relative that shown in FIG. 8U to reflect the greater height of the vehicle.

Turning to FIG. 8W, it is seen that user engagement of 'Height' UIC 776 has moved the slider thereof to an interim position, indicating a vehicle height of 1.00 m. Consequently, the volume field 716 has been updated to reflect a smaller volume than that shown in FIG. 8V, in which the height of the vehicle was greater. Conversely, the range field 720 has been updated to reflect a longer range than that shown in FIG. 8V. The image region of presentation portion 704 has changed to reflect the current selected height of the vehicle. The user then engages the 'NEXT' UIC button 728, to confirm the selection made in the dimensions segment, and to finalize the configuration of the vehicle.

Turning to FIG. 8X, it is seen that following the user engagement of 'NEXT' UIC button 728, the specification of the vehicle defined by user interaction with GUI 700 is displayed to the user. As seen, the specification has three sections—a first section relating to configuration of the corner and battery, a second region relating to configuration of the vehicle type and architecture, and a third section relating to the vehicle dimensions. All of the user's selections, made by interaction with GUI 700, are reflected in the specification, as well as additional characteristics of the vehicle which were not selected by the user and which are required for a vehicle, including the characteristics selected by the user, to be electrically and mechanically compliant.

FIG. 8Y shows two virtual models of vehicles that meet the specification of FIG. 8X. The virtual models may be displayed to the user, to allow the user to select a specific model for manufacture, and to envision the look of the vehicle, before proceeding to manufacture thereof.

Figure 9A:
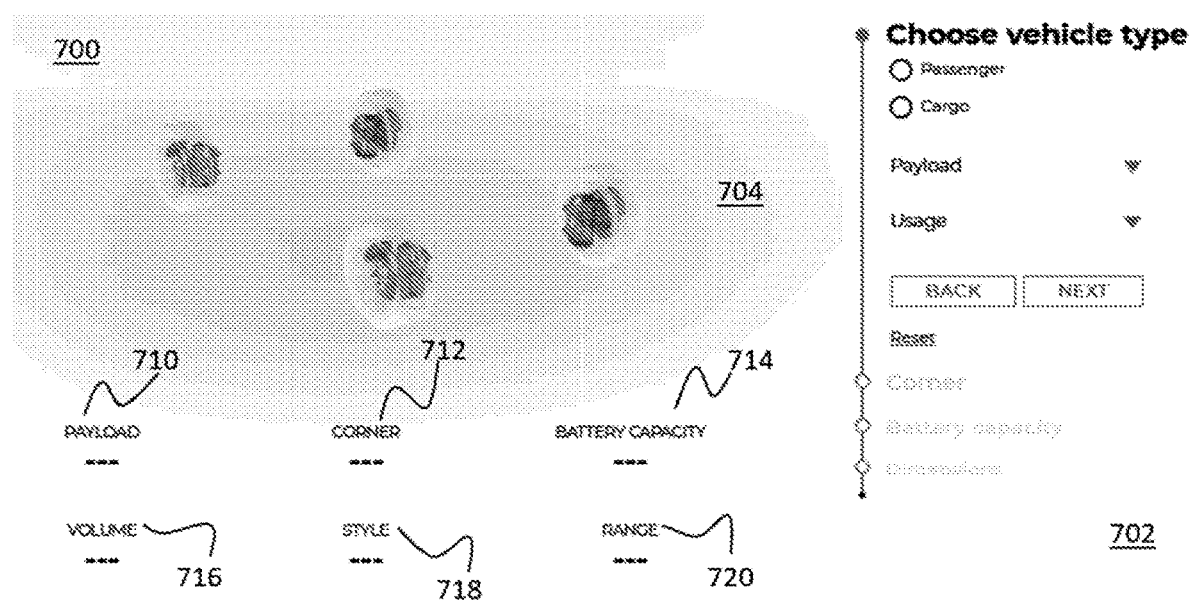
FIGS. 9A-9Y illustrate a second example of user engagements with the user interface components of FIGS. 7A-7E.
Figure 9B:
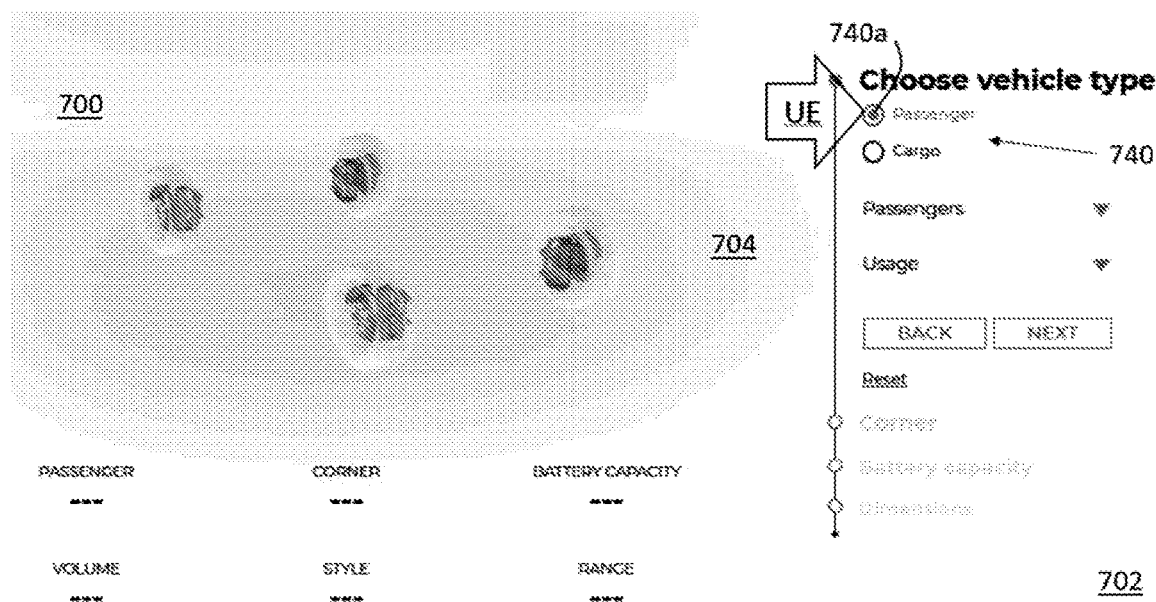
Figure 9C:
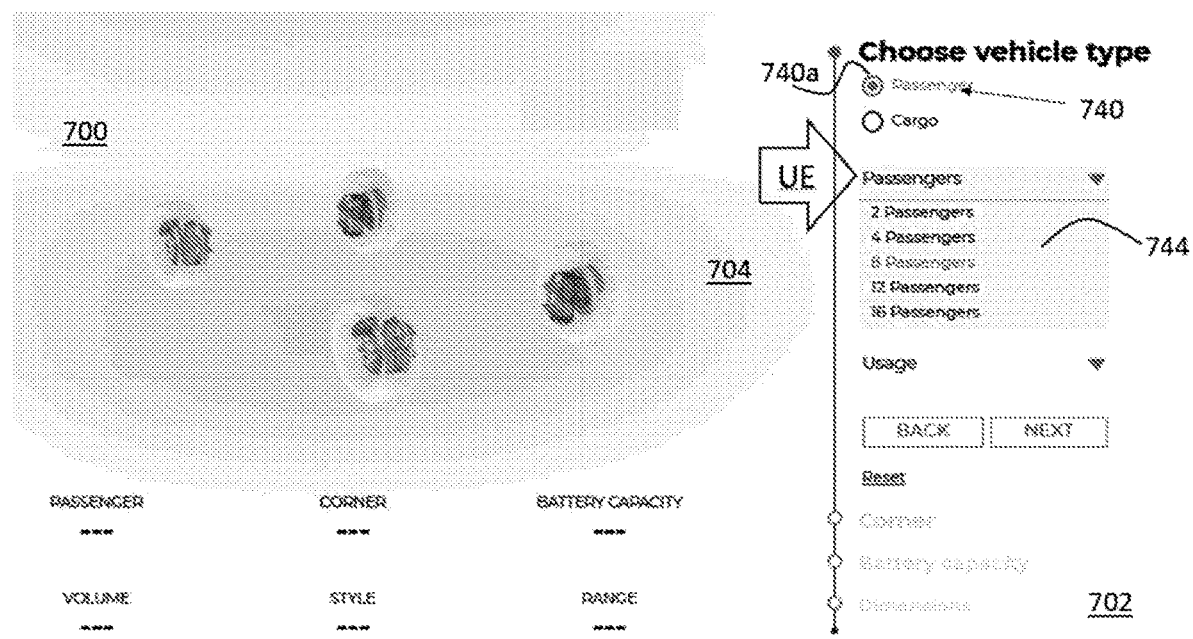
Figure 9D:
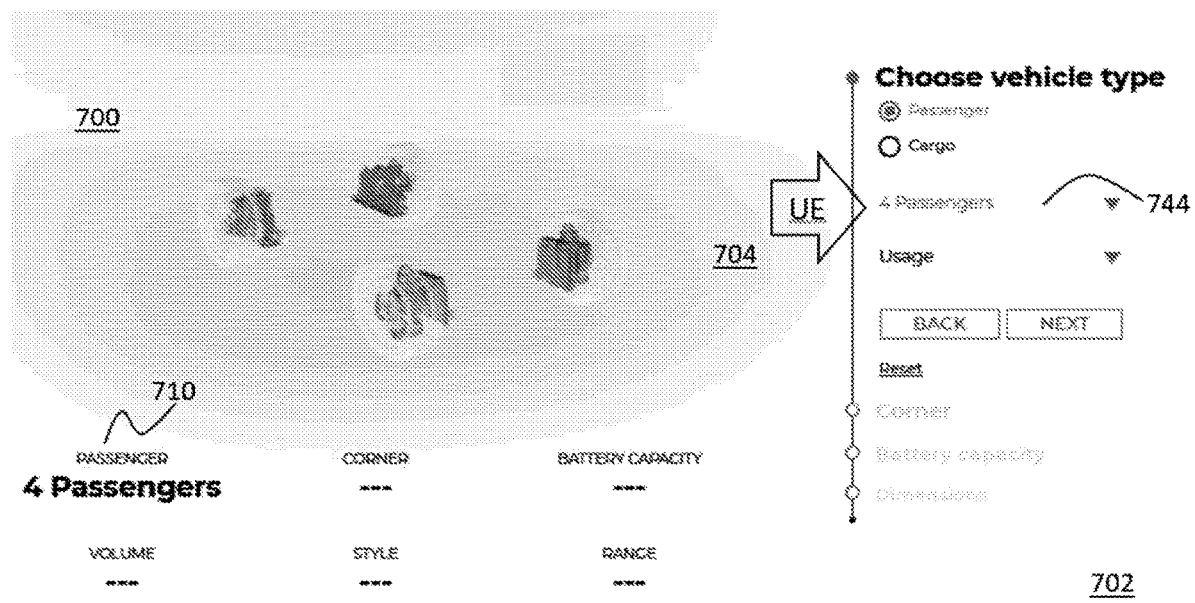
Figure 9E:
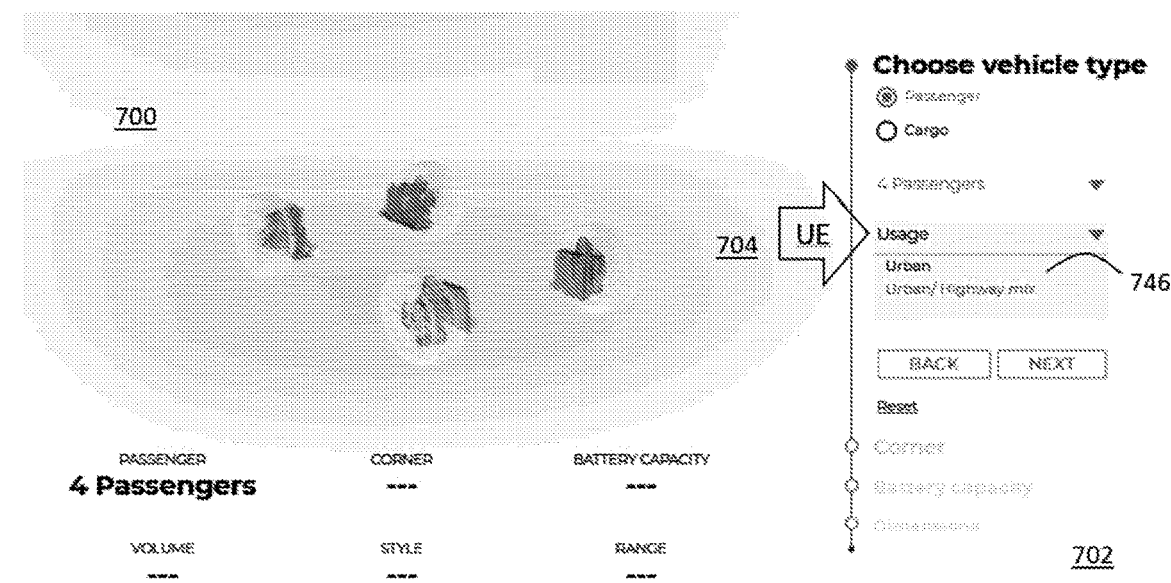

Reference is now made to FIGS. 9A-9Y, which illustrate a second example of user engagements with user interface components of GUI 700 of FIGS. 7A-7E.

In all of FIGS. 9A to 9Y, UE is an abbreviation for 'user engagement', as discussed hereinabove with respect to FIGS. 8A to 8Y.

The initial selections made by the user in the second example of FIGS. 9A to 9Y are identical to those shown in the first example. As such, FIGS. 9A to 9E are identical to FIGS. 8A to 8E, and follow the description thereof provided hereinabove.

Figure 9F:
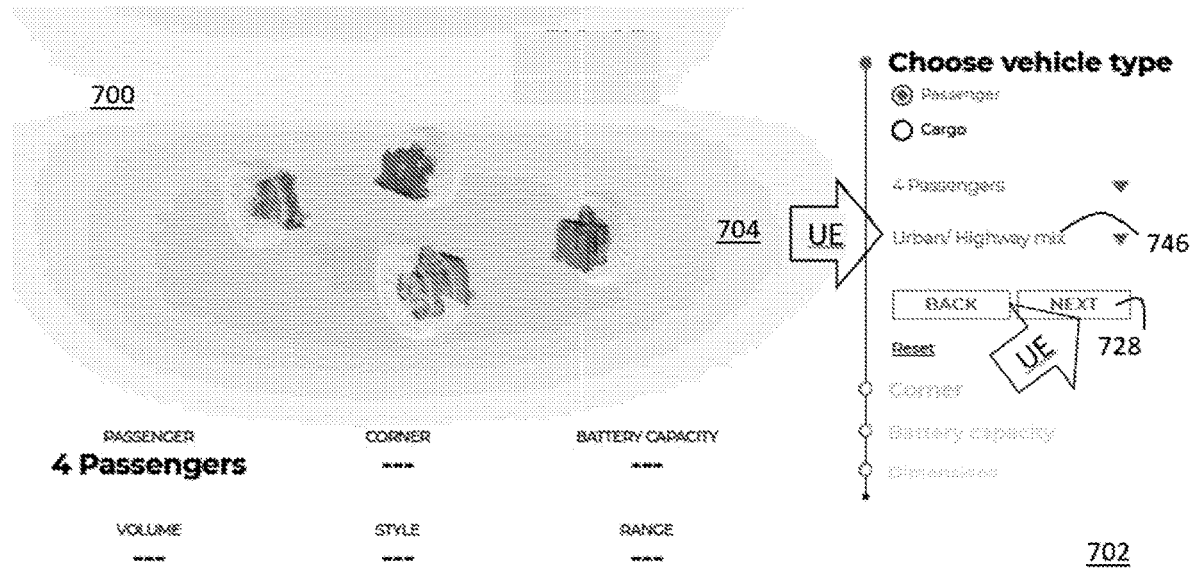

The first distinction between the first example and the second example appears in FIG. 9F. As seen in FIG. 9F, the user selects that the vehicle should be suitable for urban and highway driving, by user engagement of the appropriate line of the dropdown menu of 'Usage' UIC 746. The user then engages the 'NEXT' UIC button 728, to confirm the selection made in the vehicle type segment, and move to the next segment of GUI 700, namely the corner segment.

Figure 9G:
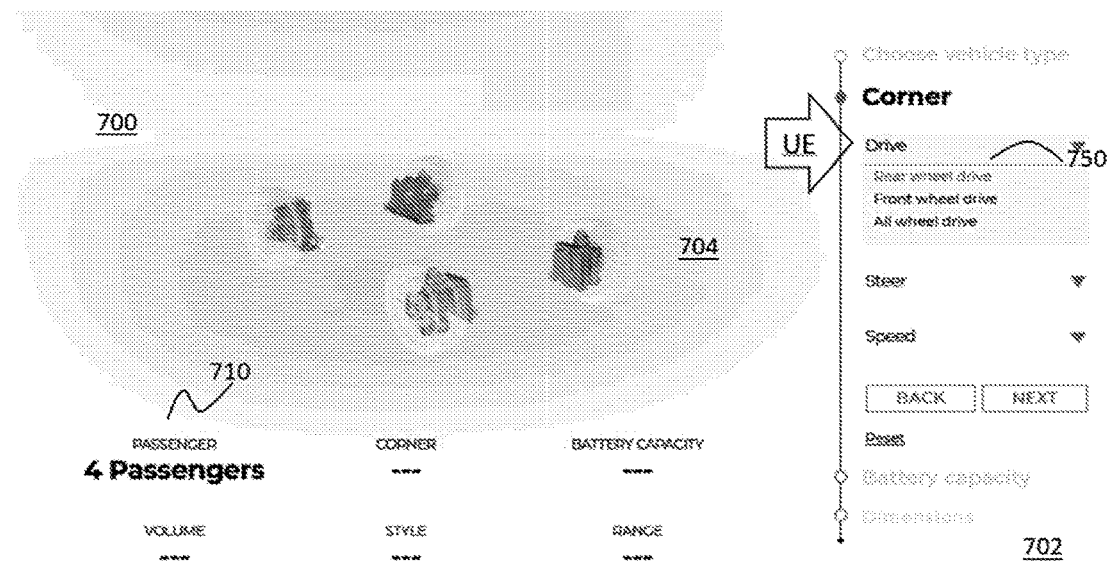

Turning to FIG. 9G, it is seen that following the user engagement of 'NEXT' UIC button 728, selection region 702 has changed to display the corner segment. As seen, user engagement of 'Drive' UIC 750 causes the dropdown menu of UIC 750 to open up, allowing the user to select whether the vehicle will be have rear wheel drive, front wheel drive, or all wheel drive.

Figure 9H:
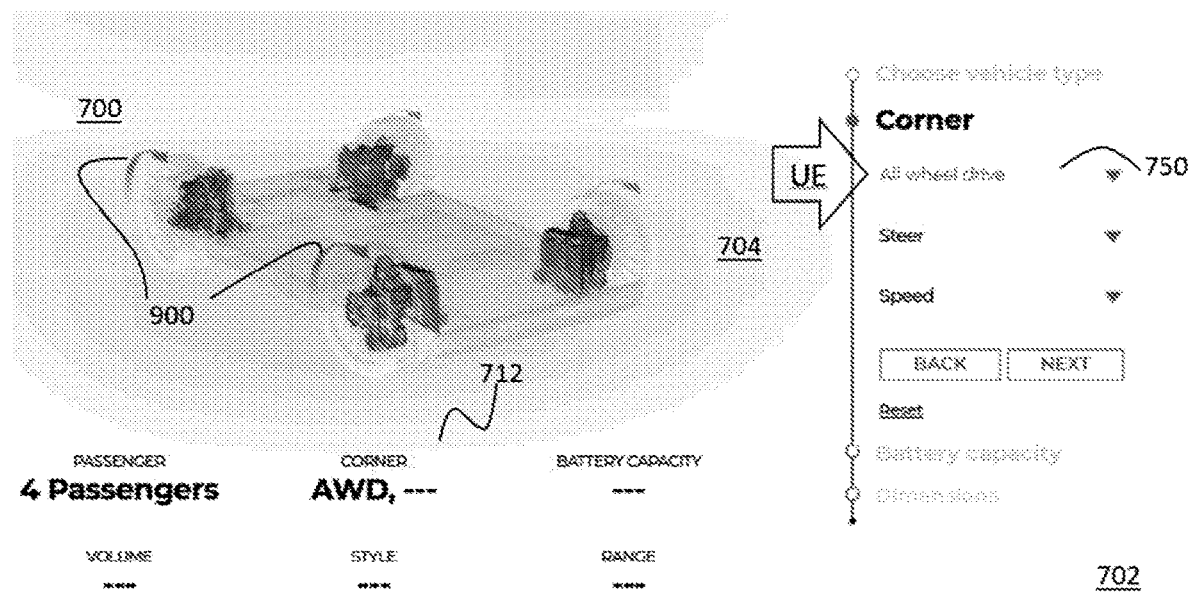

In FIG. 9H, the user selects that the vehicle should have all wheel drive, by user engagement of the appropriate line of the dropdown menu of 'Drive' UIC 750. As seen, corner field 712 of the text region of presentation portion 704 has changed to reflect the user's selection, and now indicates that the vehicle being designed is an AWD (all wheel drive) vehicle. Additionally, the image region of presentation portion 704 reflects that the vehicle is selected to be an all wheel drive vehicle, by addition of arrows 900 adjacent all four wheels.

Figure 9I:
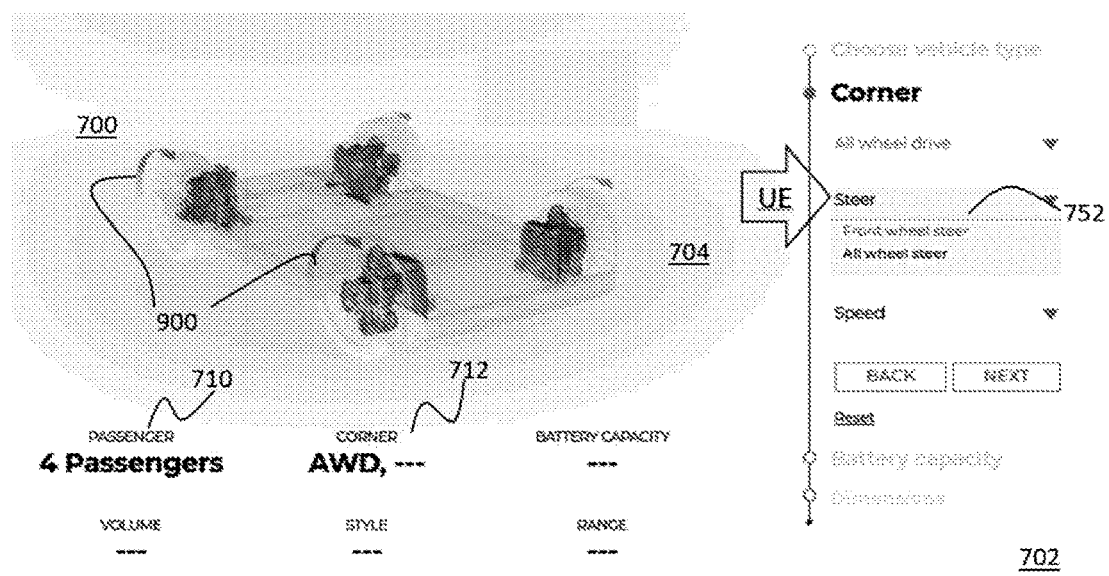

In FIG. 9I, user engagement of the 'Steer' UIC 752 causes the dropdown menu of UIC 752 to open up, allowing the user to select whether the vehicle will have front wheel steering or all wheel steering.

Figure 9J:
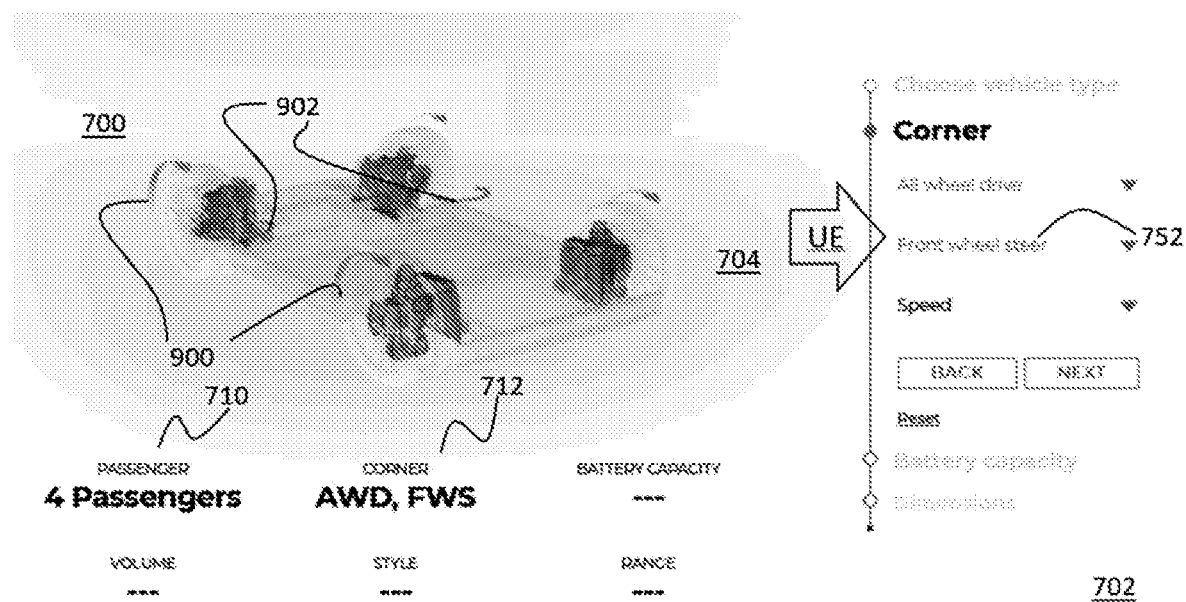

In FIG. 9J, the user selects that the vehicle should have front wheel steering, by user engagement of the appropriate line of the dropdown menu of 'Steer' UIC 752. As seen, corner field 712 of the text region of presentation portion 704 has changed to reflect the user's selection, and now indicates that the vehicle being designed is an AWD and FWS (front wheel steer) vehicle. Additionally, the image region of presentation portion 704 reflects that the vehicle is selected to be a front wheel steer, by addition of arrows 902 adjacent the two front wheels.

Figure 9K:
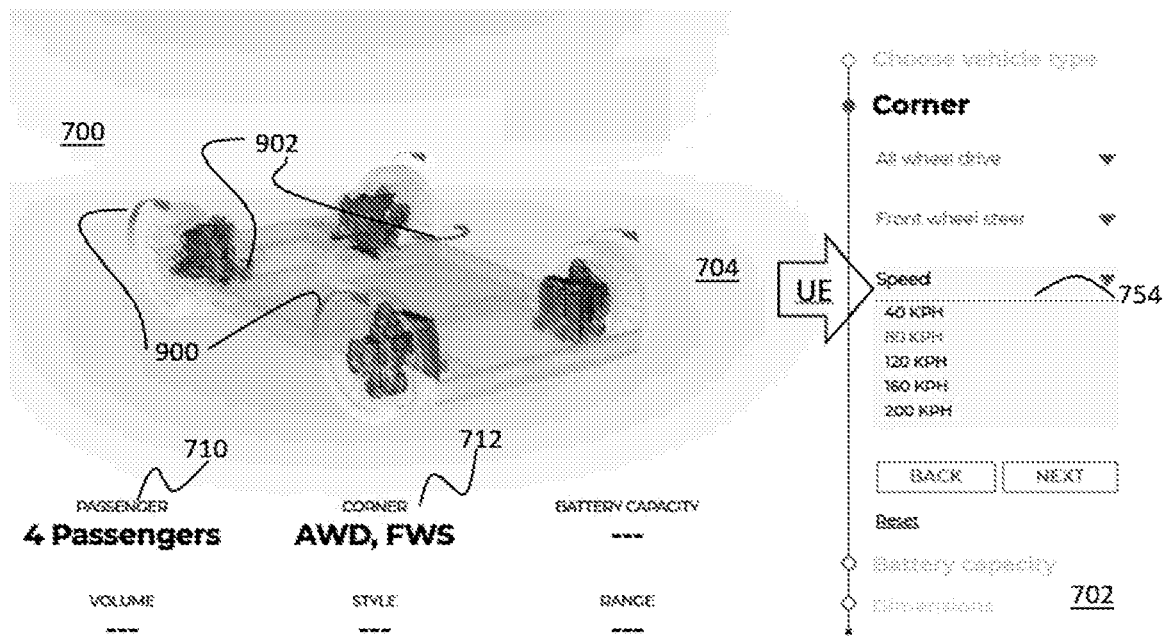

In FIG. 9K, user engagement of the 'Speed' UIC 754 causes the dropdown menu of UIC 754 to open up, allowing the user to select the maximal speed of the vehicle. In the current example, the available maximal speeds are 40 KPH, 80 KPH, 120 KPH, 160 KPH, or 200 KPH.

A comparison of FIGS. A8A-8K and FIGS. 9A-9K demonstrates that the user's selection of a different usage, as one of the initial vehicle characteristics selected by the user, leads to GUI 700 presenting different options for one of the corner characteristics, namely the maximal speed of the vehicle. As such, the maximal speed characteristic is selected to be compatible, and compliant, with the selected initial vehicle characteristics, e.g. the selected usage of the vehicle.

Figure 9L:
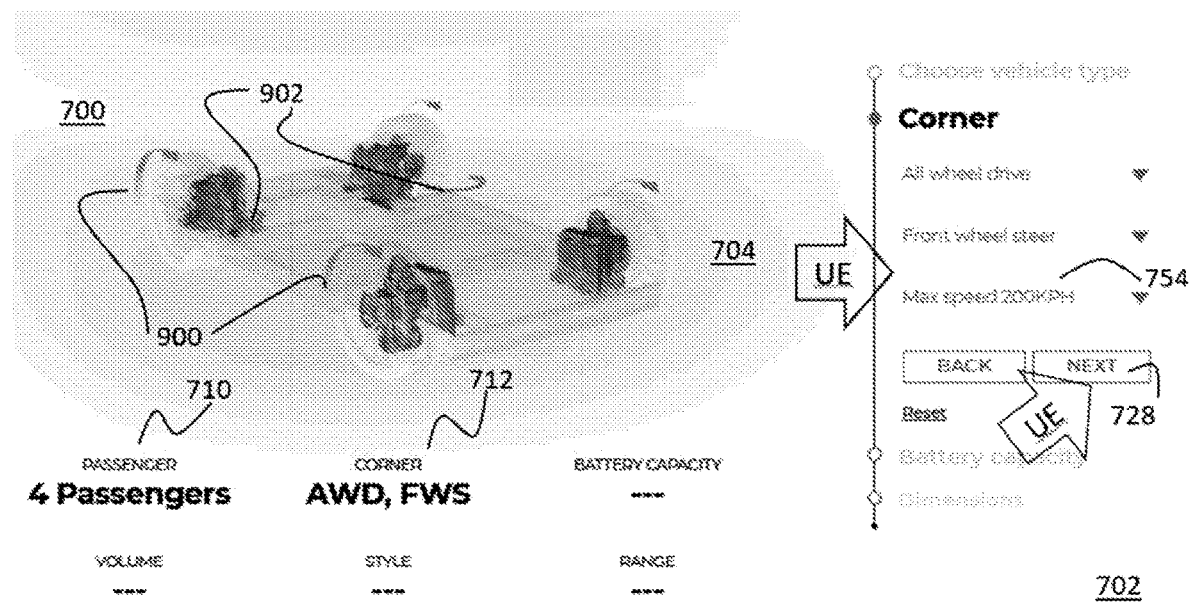

In FIG. 9L, the user selects that the vehicle should have a maximal speed of 200 KPH, by user engagement of the appropriate line of the dropdown menu of 'Speed' UIC 754. The user then engages the 'NEXT' UIC button 728, to confirm the selection made in the corner segment, and move to the next segment of GUI 700, namely the battery capacity segment.

Figure 9M:
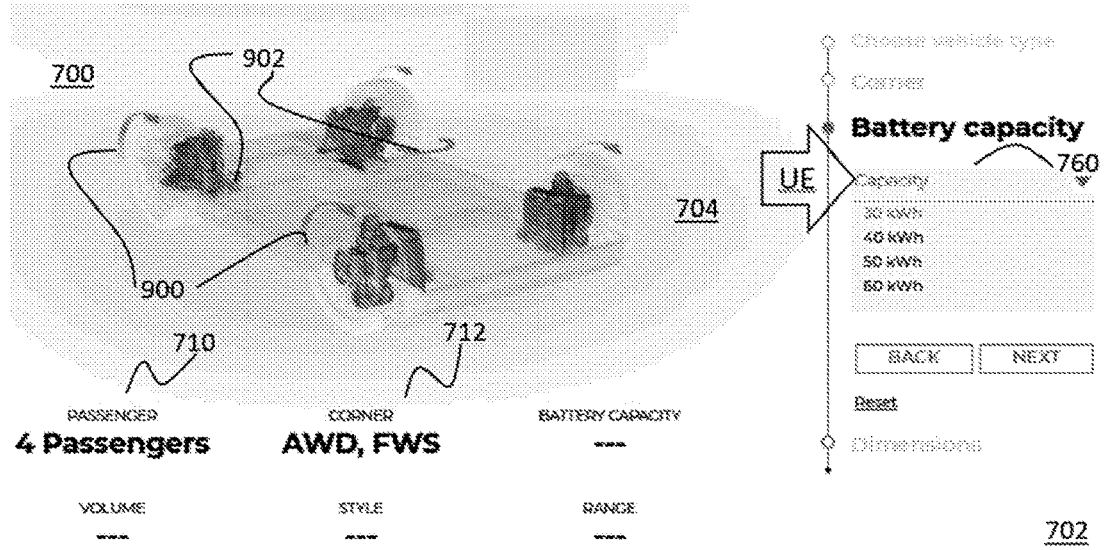

Turning to FIG. 9M, it is seen that following the user engagement of 'NEXT' UIC button 728, selection region 702 has changed to display the battery capacity segment. As seen, user engagement of 'Capacity' UIC 760 causes the dropdown menu of UIC 760 to open up, allowing the user to select whether the vehicle battery will be have a capacity of 30 kWh, 40 kWh, 50 kWh, or 60 kWh.

Figure 9N:
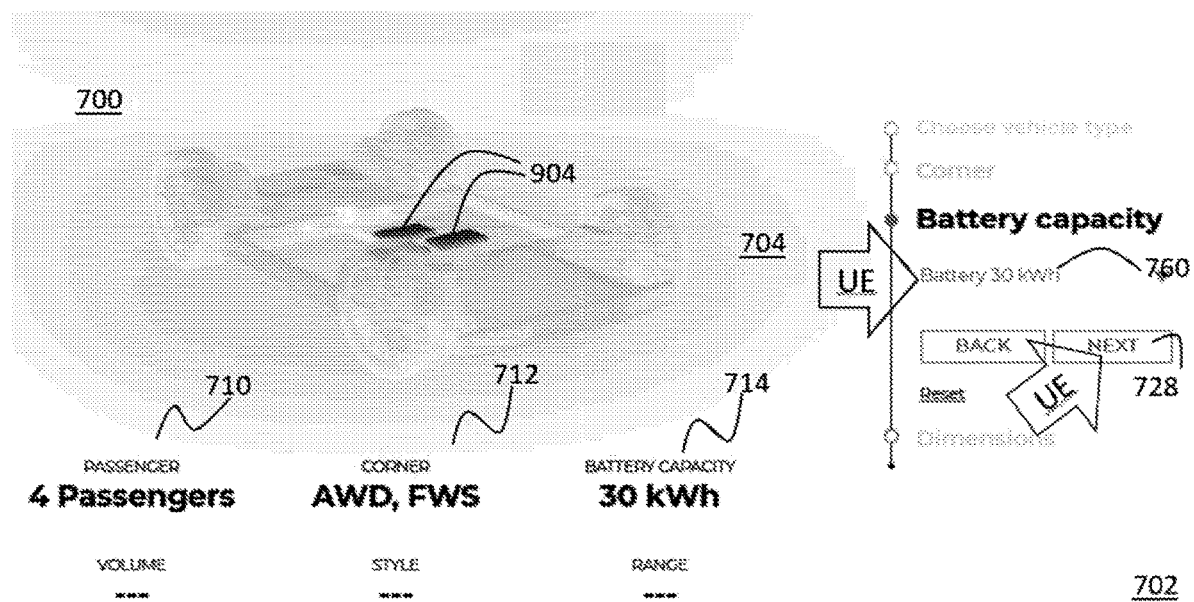

In FIG. 9N, the user selects that the vehicle should have a battery capacity of 30 kWh, by user engagement of the appropriate line of the dropdown menu of 'Capacity' UIC 760. As seen, battery capacity field 714 of the text region of presentation portion 704 has changed to reflect the user's selection, and now indicates that the battery capacity is 30 kWh. Additionally, the image region of presentation portion 704 reflects that the vehicle is selected to have a battery capacity of 30 kWh, by showing five 'batteries' 904 on a representation of the chassis of the vehicle. The user then engages the 'NEXT' UIC button 728, to confirm the selection made in the battery capacity segment, and move to the next segment of GUI 700, namely the dimensions segment.

Figure 9O:
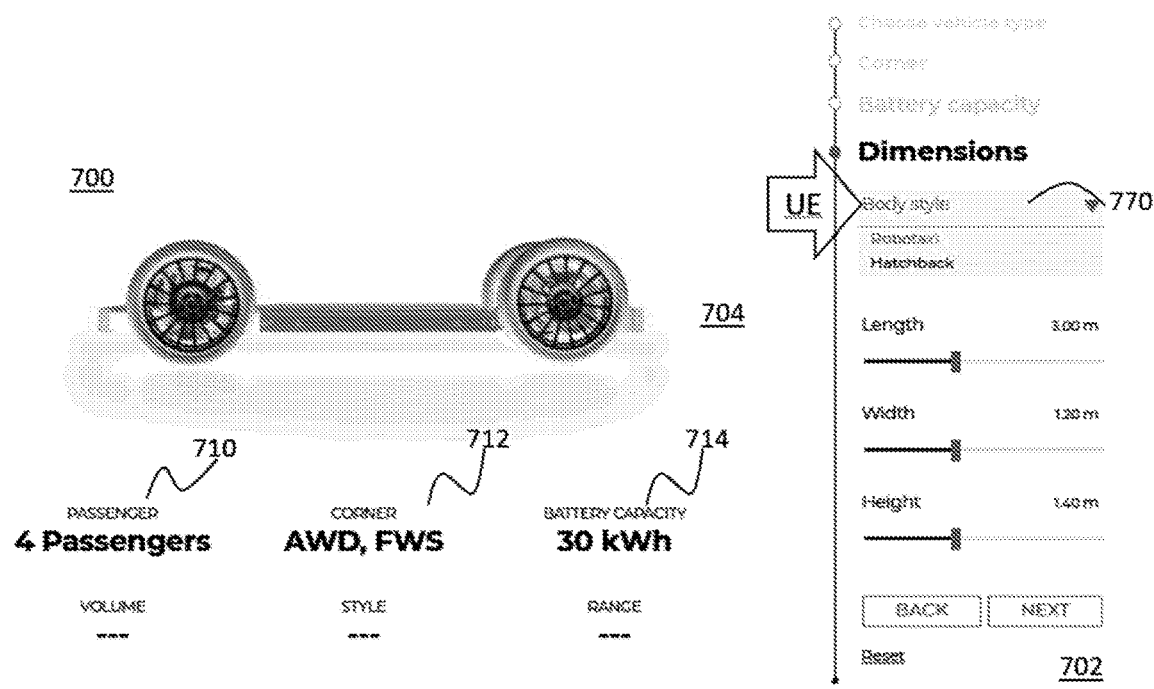

Turning to FIG. 9O, it is seen that following the user engagement of 'NEXT' UIC button 728, selection region 702 has changed to display the dimensions segment. As seen, user engagement of 'Body Style' UIC 770 causes the dropdown menu of UIC 770 to open up, allowing the user to select whether the vehicle will be a robotaxi vehicle or a hatchback vehicle.

Figure 9P:
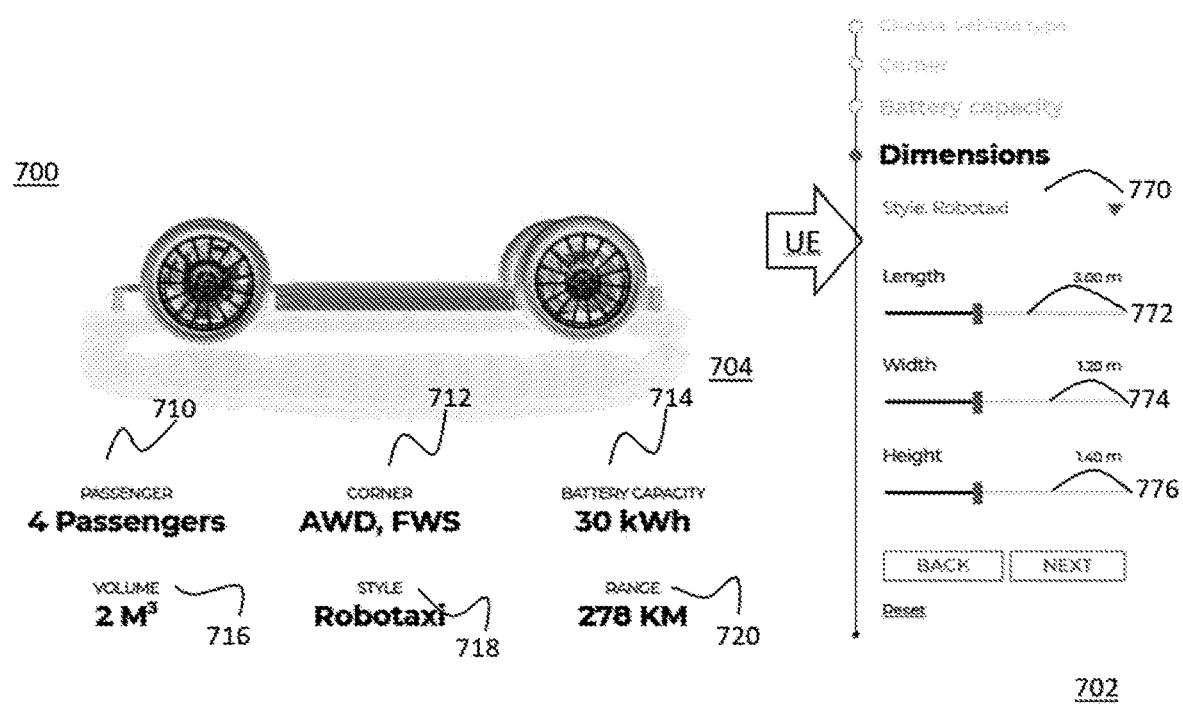

In FIG. 9P, the user selects that the vehicle should be a robotaxi vehicle, by user engagement of the appropriate line of the dropdown menu of 'Body Style' UIC 770. As a result, length, width, and height UICs 772, 774, and 776 now reflect default values for a robotaxi vehicle. Specifically, the default values include a length of 3.00 m, a width of 1.20 m, and a height of 1.40 m. As seen, style field 718 of the text region of presentation portion 704 has changed to reflect the user's selection, and now indicates that the vehicle being designed is a robotaxi vehicle. Additionally, the volume field 716 and range field 720 have been updated to include suitable values, calculated based on the selected vehicle style, selected battery capacity, and the default dimensions for that vehicle style. The image region of presentation portion 704 has changed to show a side view of the chassis of the vehicle.

Figure 9Q:
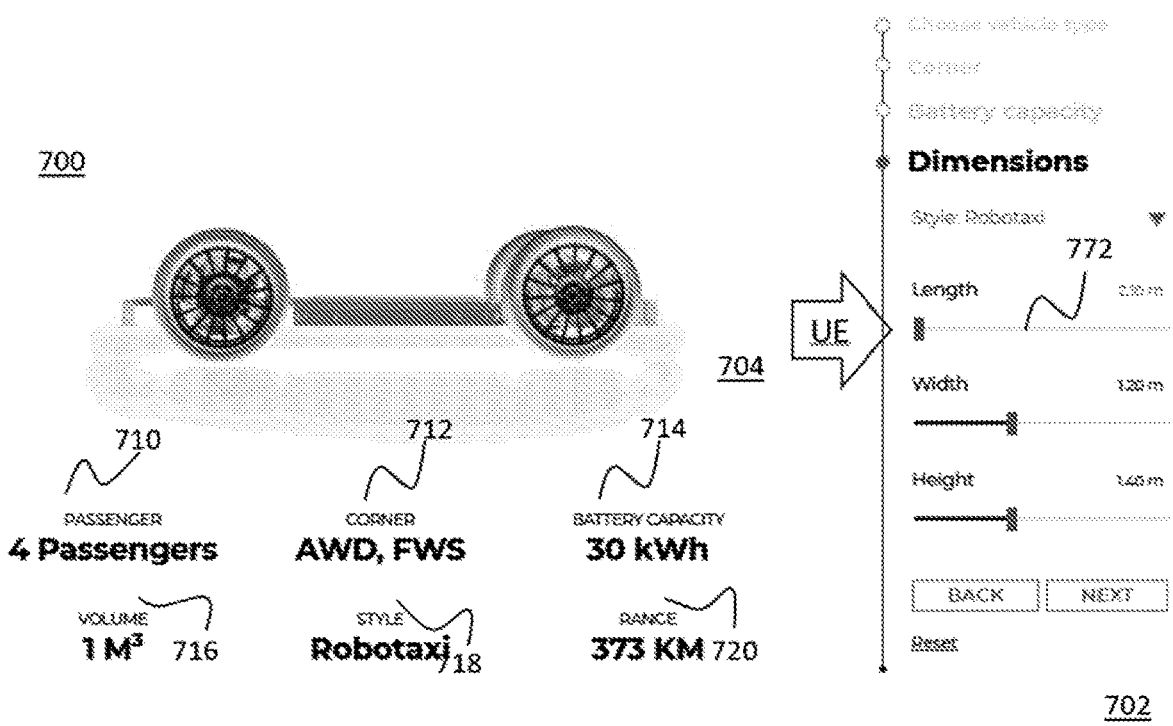

Turning to FIG. 9Q, it is seen that user engagement of 'Length' UIC 772 has moved the slider thereof to the rightmost position, indicating the smallest length of the vehicle, namely 2.10 m. Consequently, the volume field 716 has been updated to reflect a smaller volume than that shown in FIG. 9P, in which the length of the vehicle was greater. Conversely, the range field 720 has been updated to reflect a longer range than that shown in FIG. 9P. The image region of presentation portion 704 has changed, relative to that shown in FIG. 9P to reflect the shorter chassis of the vehicle.

Figure 9R:
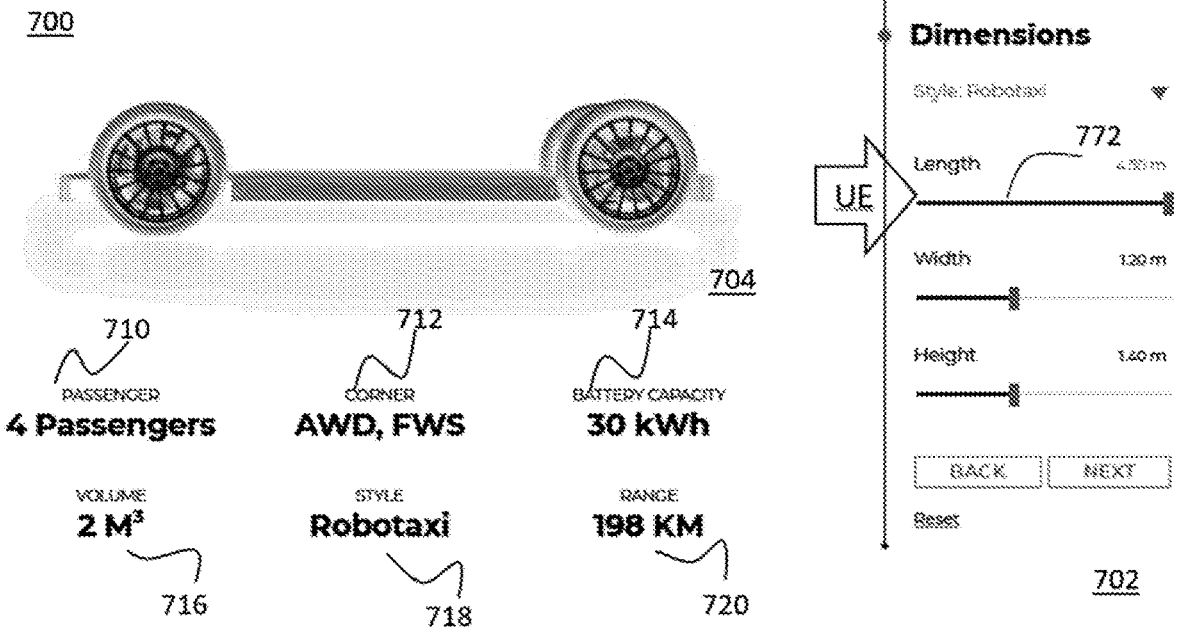

In FIG. 9R, it is seen that user engagement of 'Length' UIC 772 has moved the slider thereof to the leftmost position, indicating the greatest length of the vehicle, namely 4.50 m. Consequently, the volume field 716 has been updated to reflect a larger volume than that shown in FIGS. 9P and 9Q, in which the length of the vehicle was smaller. Conversely, the range field 720 has been updated to reflect a shorter range than that shown in FIGS. 9P and 9Q. The image region of presentation portion 704 has changed, relative to that shown in FIGS. 9P and 9Q to reflect the longer chassis of the vehicle.

Figure 9S:
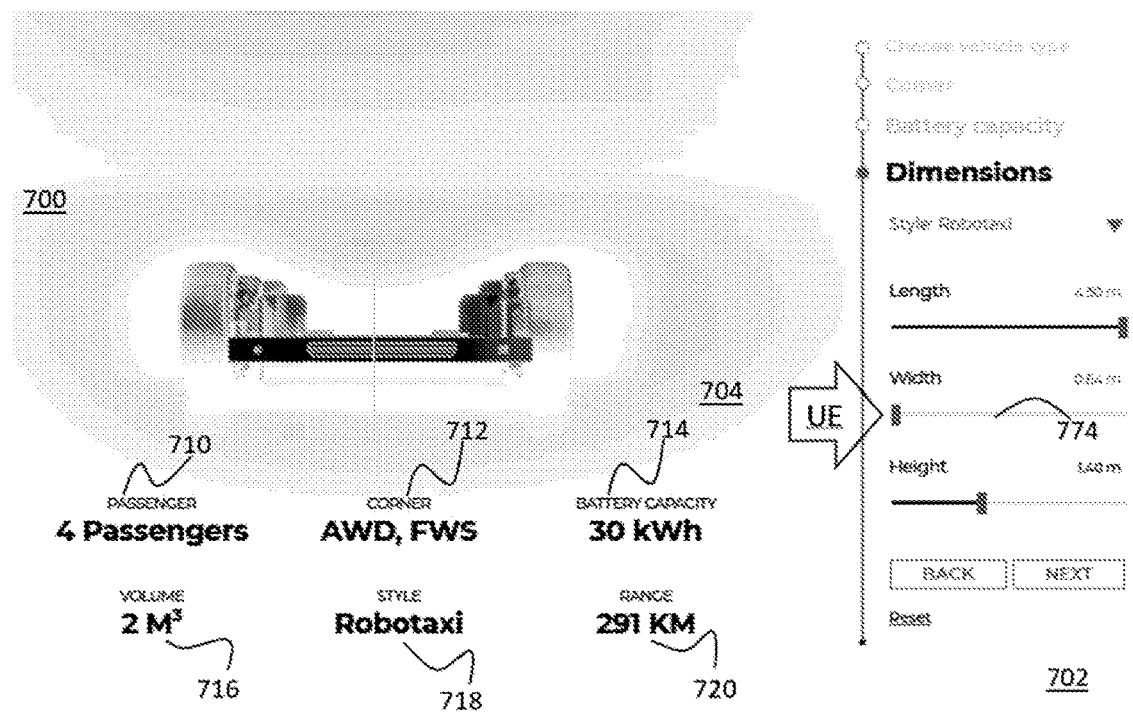

Turning to FIG. 9S, it is seen that user engagement of 'Width' UIC 774 has moved the slider thereof to the rightmost position, indicating the smallest width of the vehicle, namely 0.84 m Consequently, the volume field 716 has been updated to reflect a smaller volume than that shown in FIG. 9R, in which width of the vehicle was greater. Conversely, the range field 720 has been updated to reflect a longer range than that shown in FIG. 9R. The image region of presentation portion 704 has changed to reflect the width of the chassis of the vehicle.

Figure 9T:
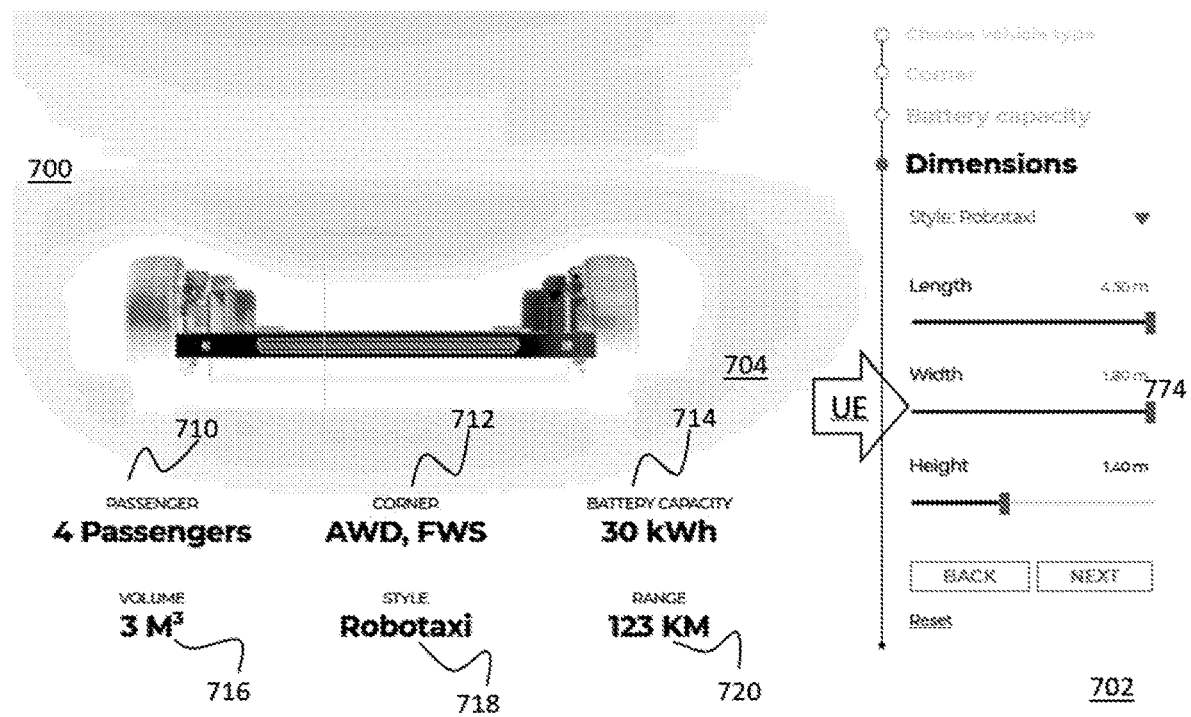

In FIG. 9T, it is seen that user engagement of 'Width' UIC 774 has moved the slider thereof to the leftmost position, indicating the greatest width of the vehicle, namely 1.80 m. Consequently, the volume field 716 has been updated to reflect a larger volume than that shown in FIG. 9S, in which the width of the vehicle was smaller. Conversely, the range field 720 has been updated to reflect a shorter range than that shown in FIG. 9S. The image region of presentation portion 704 has changed, relative that shown in FIG. 9S to reflect the greater width of the chassis of the vehicle.

Figure 9U:
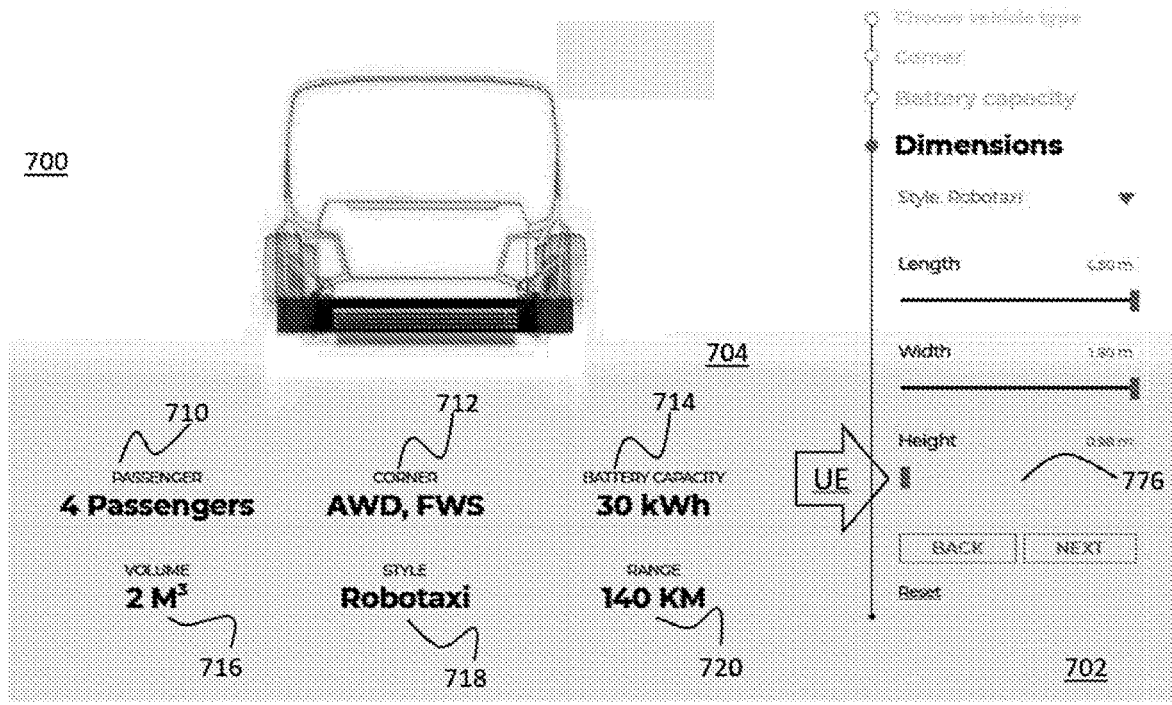

Turning to FIG. 9U, it is seen that user engagement of 'Height' UIC 776 has moved the slider thereof to the rightmost position, indicating the smallest width of the vehicle, namely 0.98 m Consequently, the volume field 716 has been updated to reflect a smaller volume than that shown in FIG. 9T, in which the width of the vehicle was greater and the height of the vehicle was greater. Conversely, the range field 720 has been updated to reflect a longer range than that shown in FIG. 9T. The image region of presentation portion 704 has changed to reflect the height of the vehicle.

Figure 9V:
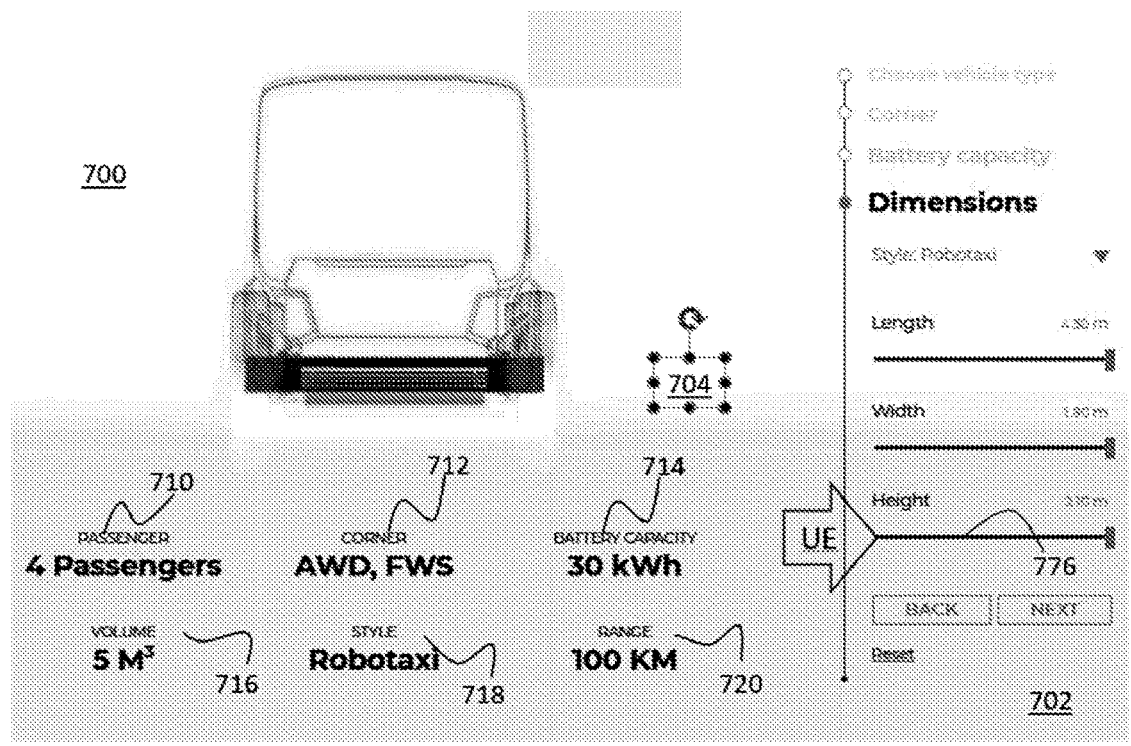

In FIG. 9V, it is seen that user engagement of 'Height' UIC 776 has moved the slider thereof to the leftmost position, indicating the greatest width of the vehicle, namely 2.10 m. Consequently, the volume field 716 has been updated to reflect a larger volume than that shown in FIG. 9U, in which the height of the vehicle was smaller. Conversely, the range field 720 has been updated to reflect a shorter range than that shown in FIG. 9U. The image region of presentation portion 704 has changed, relative that shown in FIG. 9U to reflect the greater height of the vehicle.

Figure 9W:
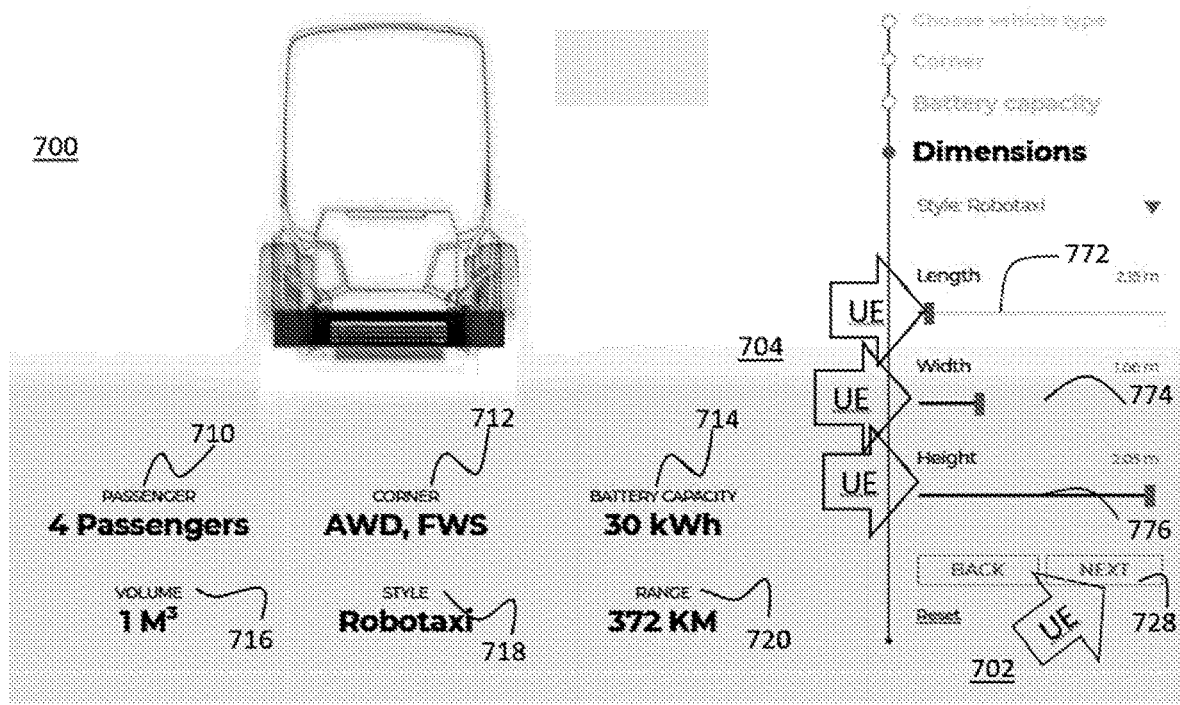

Turning to FIG. 9W, it is seen that user engagement of 'Length' UIC 772 has moved the slider thereof to a close-to-minimum position, indicating a vehicle length of 2.15 m, user engagement of 'Width' UIC 774 has moved the slider thereof to an interim position, indicating a vehicle width of 1.06 m, and user engagement of 'Height' UIC 776 has moved the slider thereof to a close-to-maximum position, indicating a vehicle height of 2.05 m. Consequently, the volume field 716 has been updated to reflect a smaller volume than that shown in FIG. 9V and the range field 720 has been updated to reflect a longer range than that shown in FIG. 9V. The image region of presentation portion 704 has changed to reflect the current selected height of the vehicle. The user then engages the 'NEXT' UIC button 728, to confirm the selection made in the dimensions segment, and to finalize the configuration of the vehicle.

Turning to FIG. 9X, it is seen that following the user engagement of 'NEXT' UIC button 728, the specification of the vehicle defined by user interaction with GUI 700 is displayed to the user. As seen, the specification has three sections—a first section relating to configuration of the corner and battery, a second region relating to configuration of the vehicle type and architecture, and a third section relating to the vehicle dimensions. All of the user's selections, made by interaction with GUI 700, are reflected in the specification, as well as additional characteristics of the vehicle which were not selected by the user and which are required for a vehicle, including the characteristics selected by the user, to be electrically and mechanically compliant.

FIG. 9Y shows two virtual models of vehicles that meet the specification of FIG. 9X, which may be displayed to the user as described hereinabove with respect to FIG. 8Y. It is appreciated that despite the specifications of FIGS. 8X and 9X being distinct from one another, the virtual models for the two vehicles may be very similar.

Figure 10A:
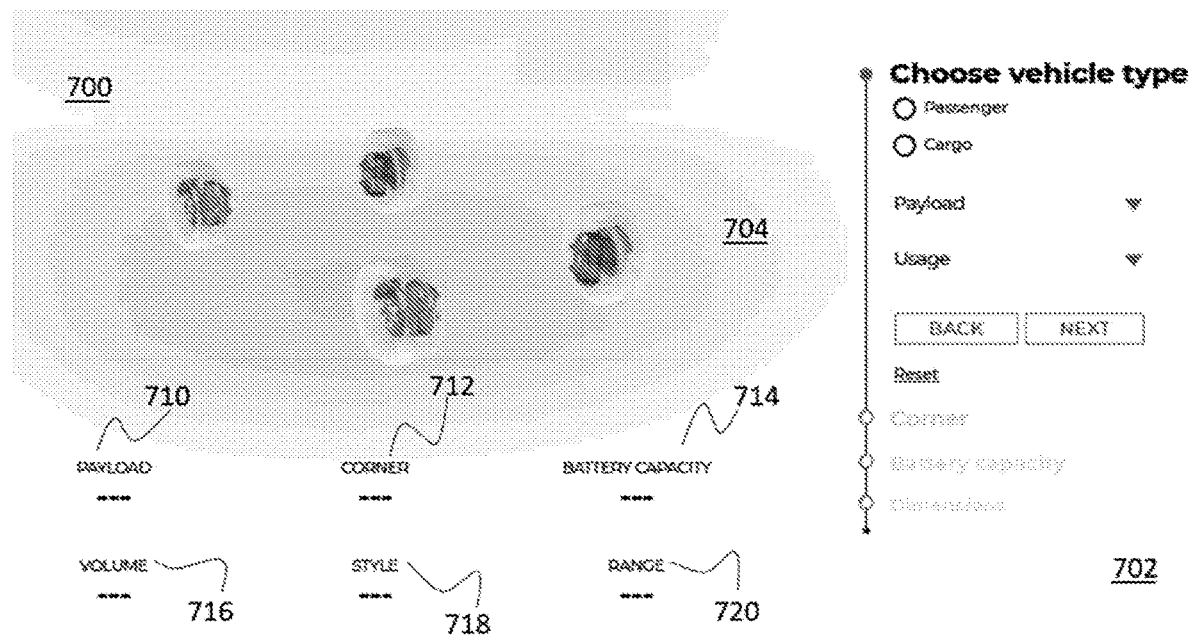
FIGS. 10A-10Y illustrate a third example of user engagements with the user interface components of FIGS. 7A-7E.
Figure 10B:
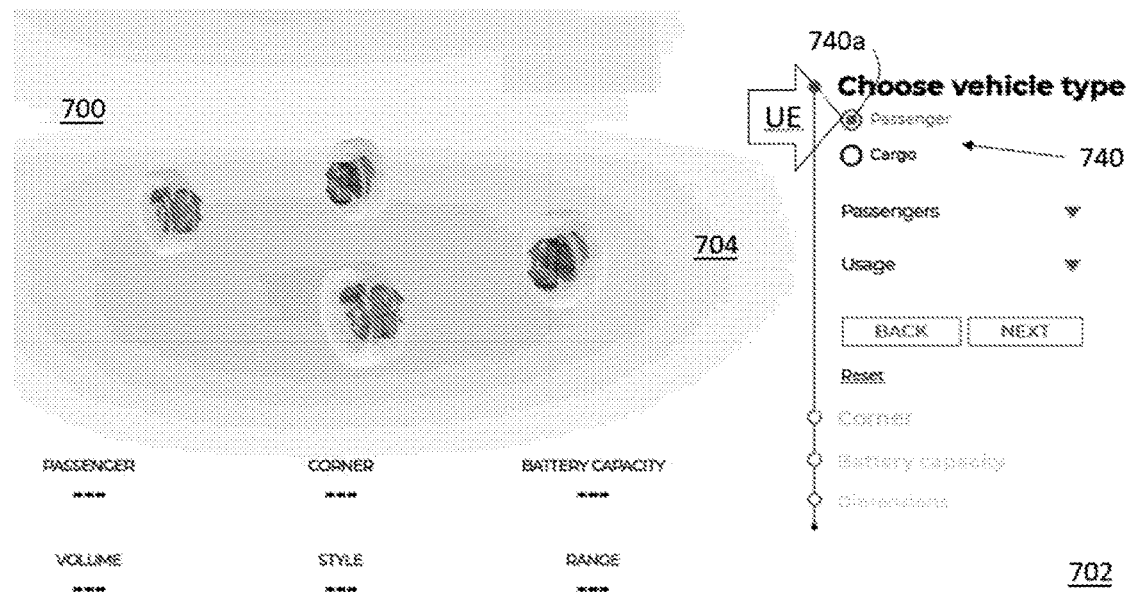
Figure 10C:
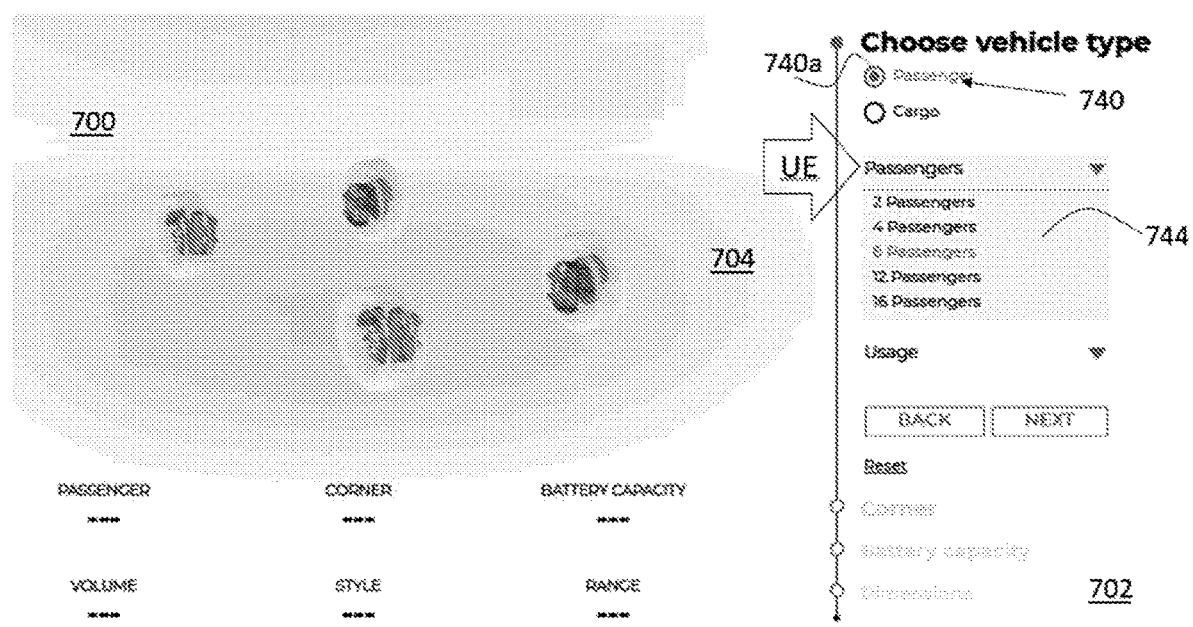
Figure 10D:
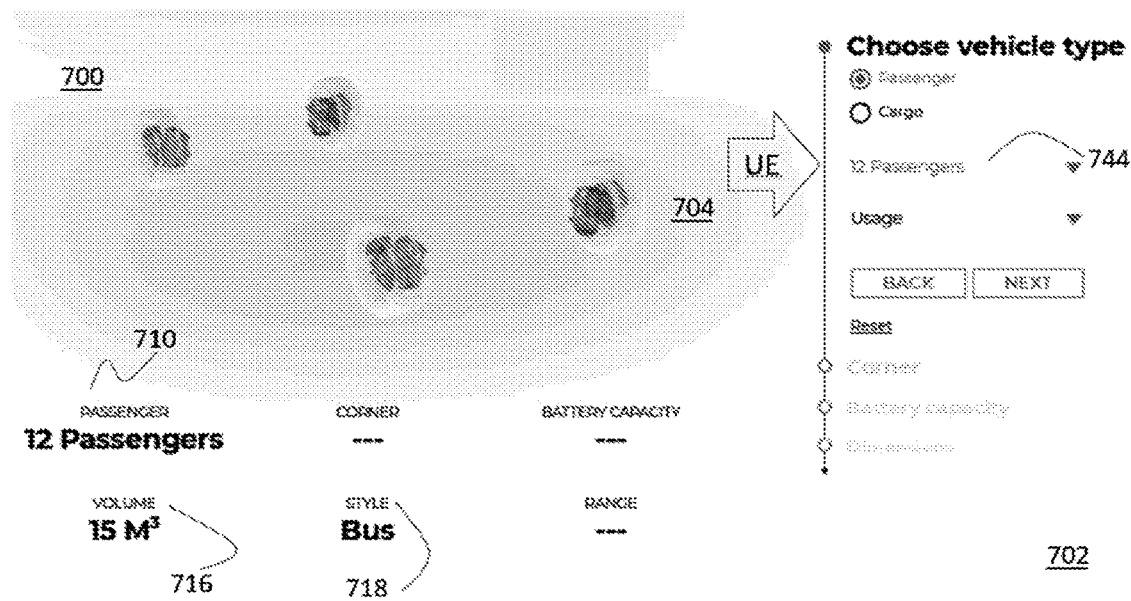
Figure 10E:
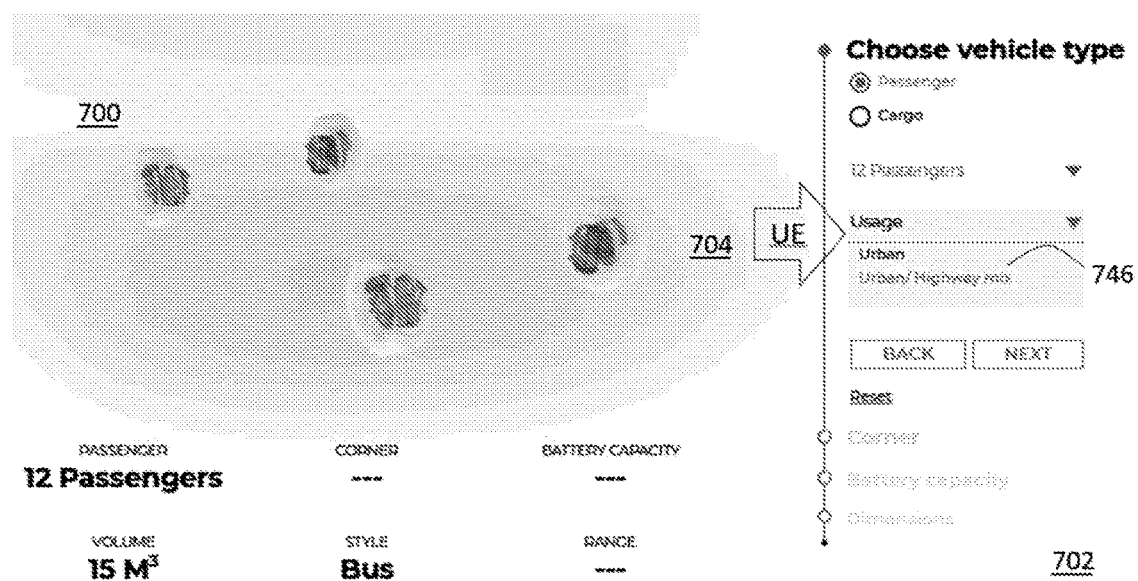
Figure 10F:
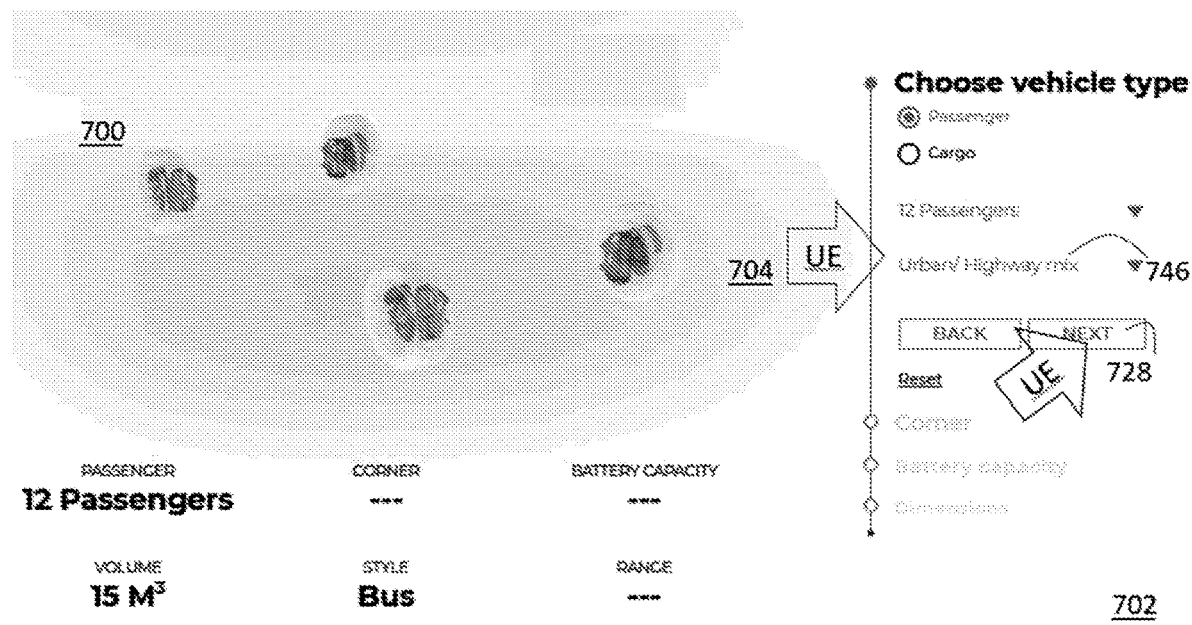
Figure 10G:
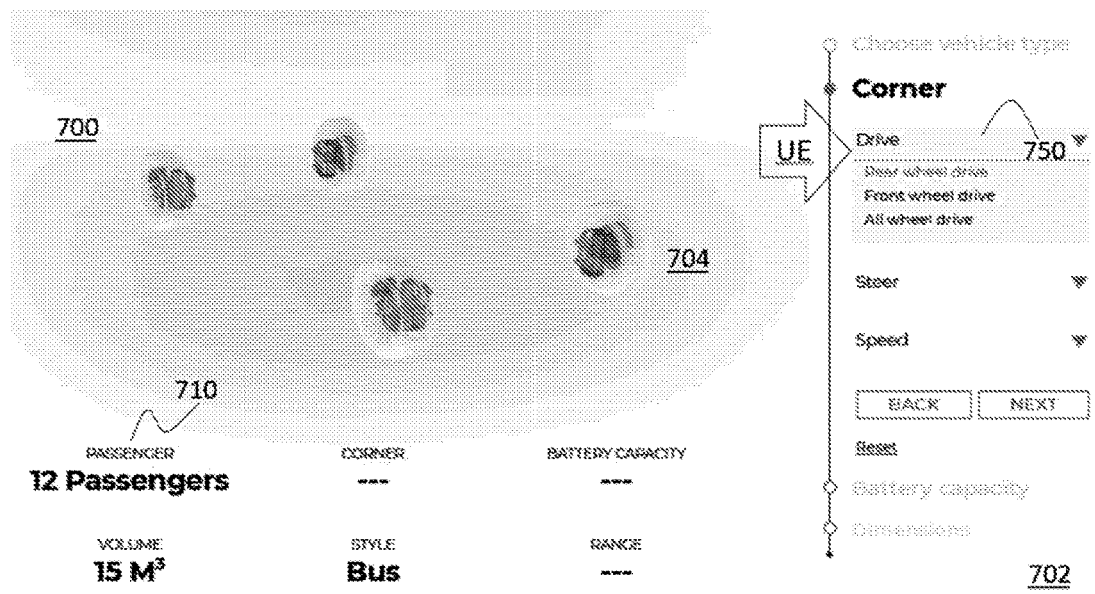
Figure 10H:
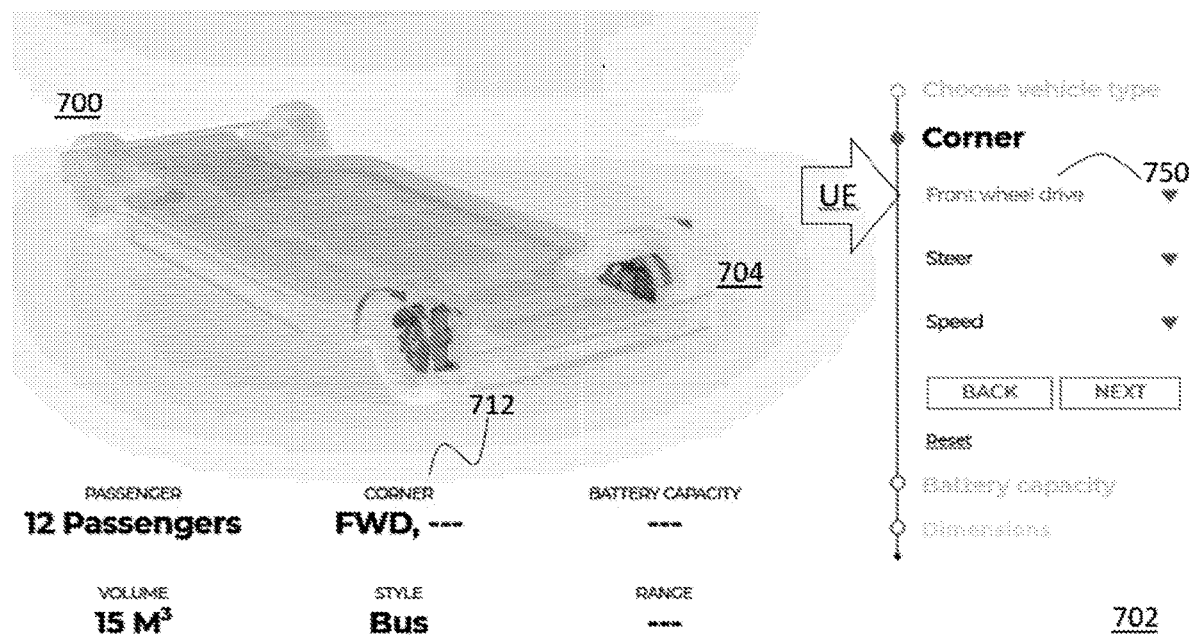
Figure 10I:
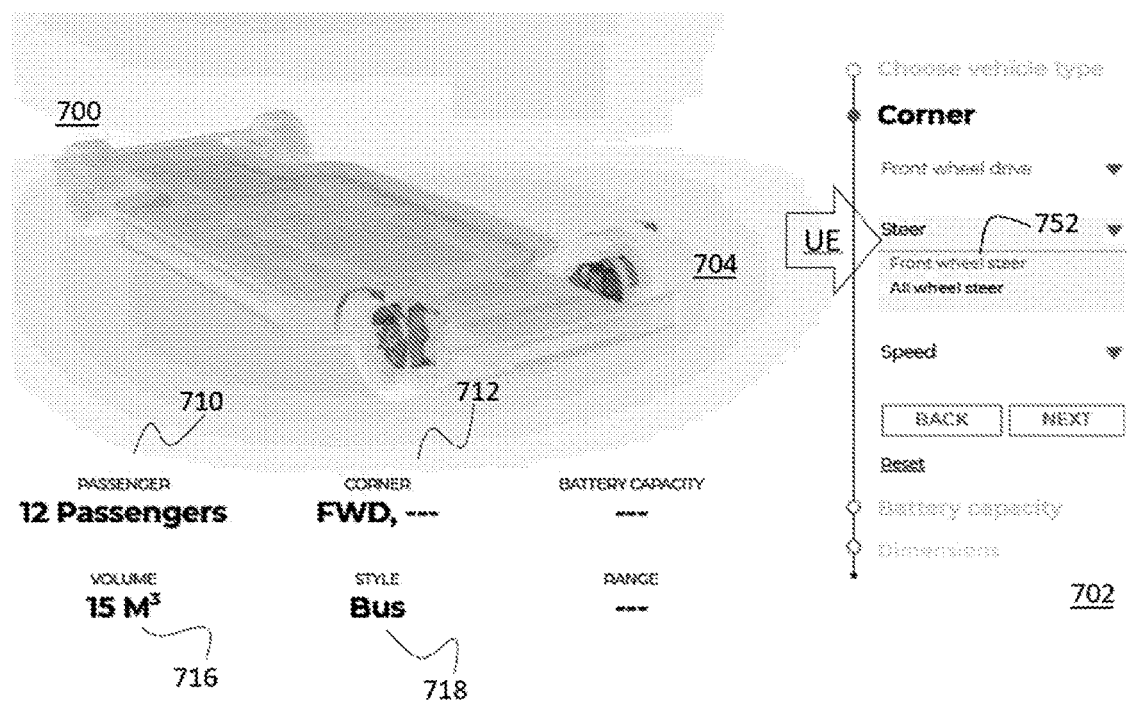
Figure 10J:
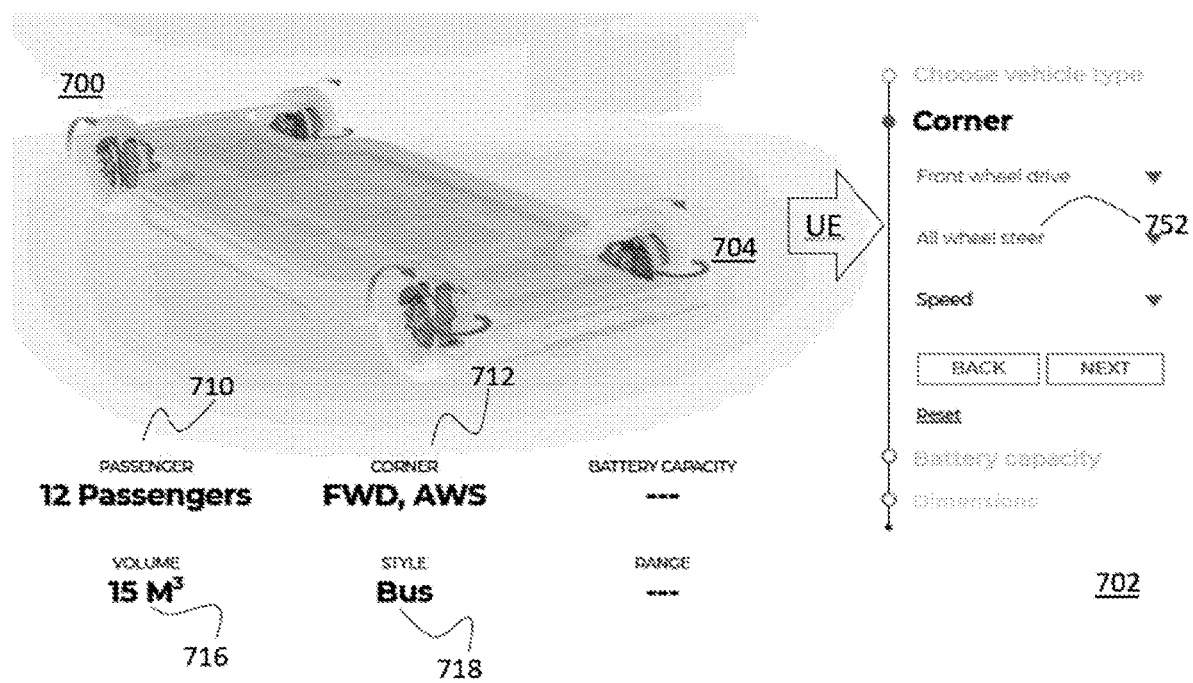
Figure 10K:
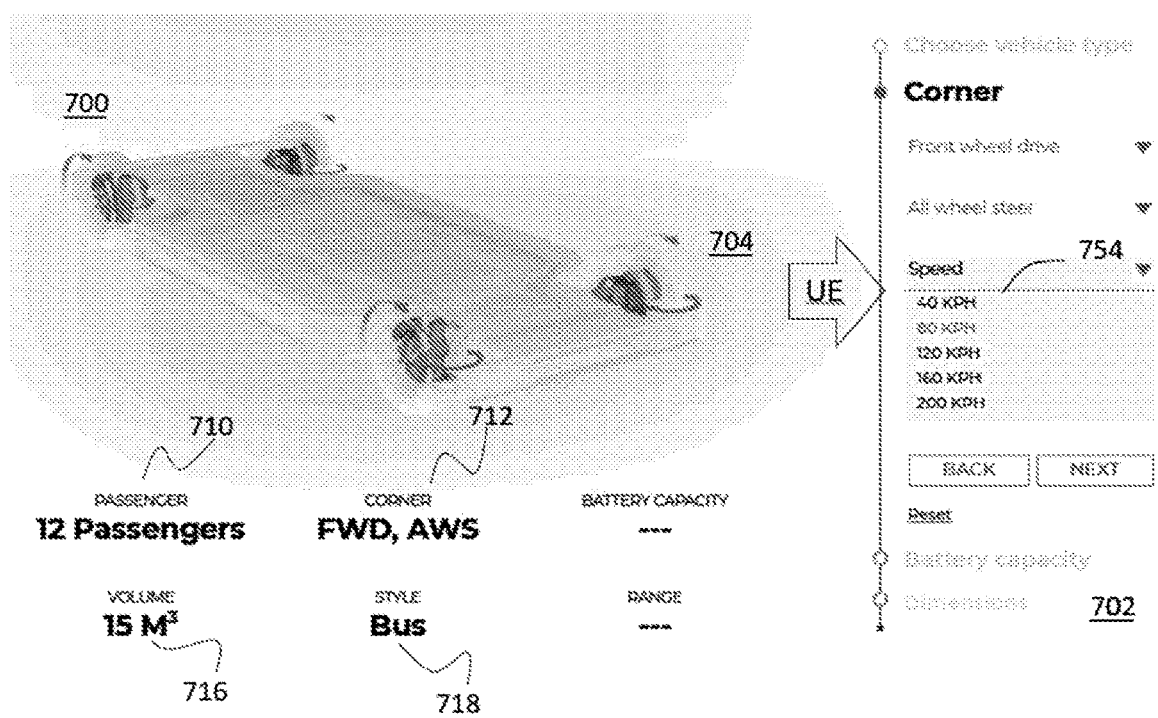
Figure 10L:
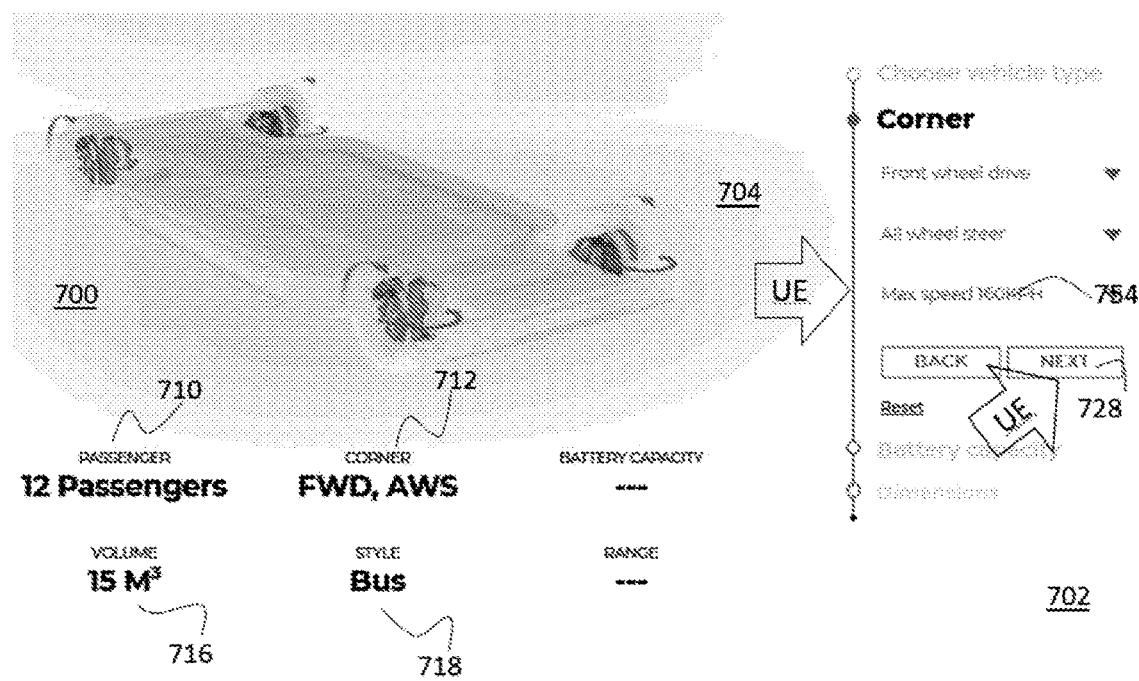
Figure 10M:
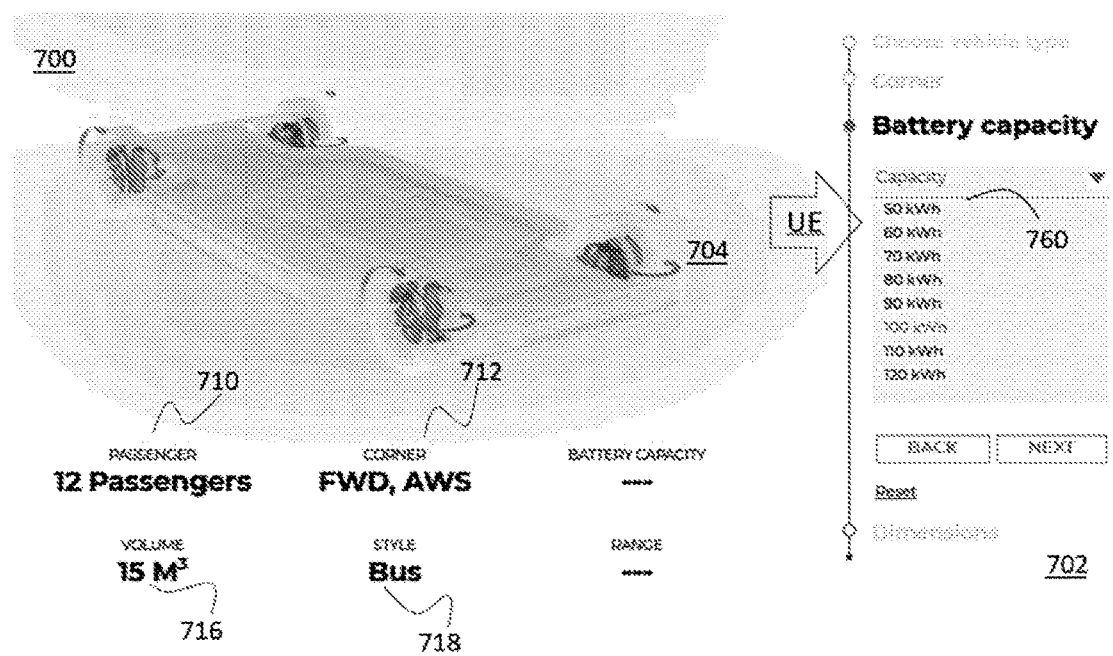
Figure 10N:
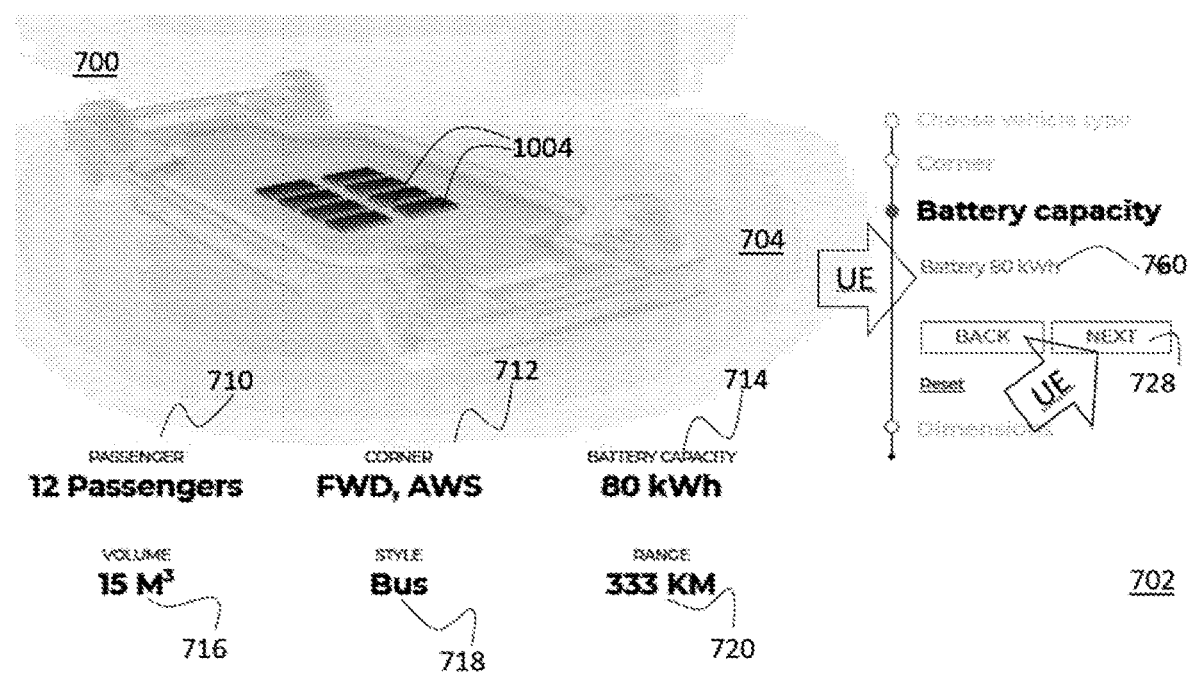
Figure 10O:
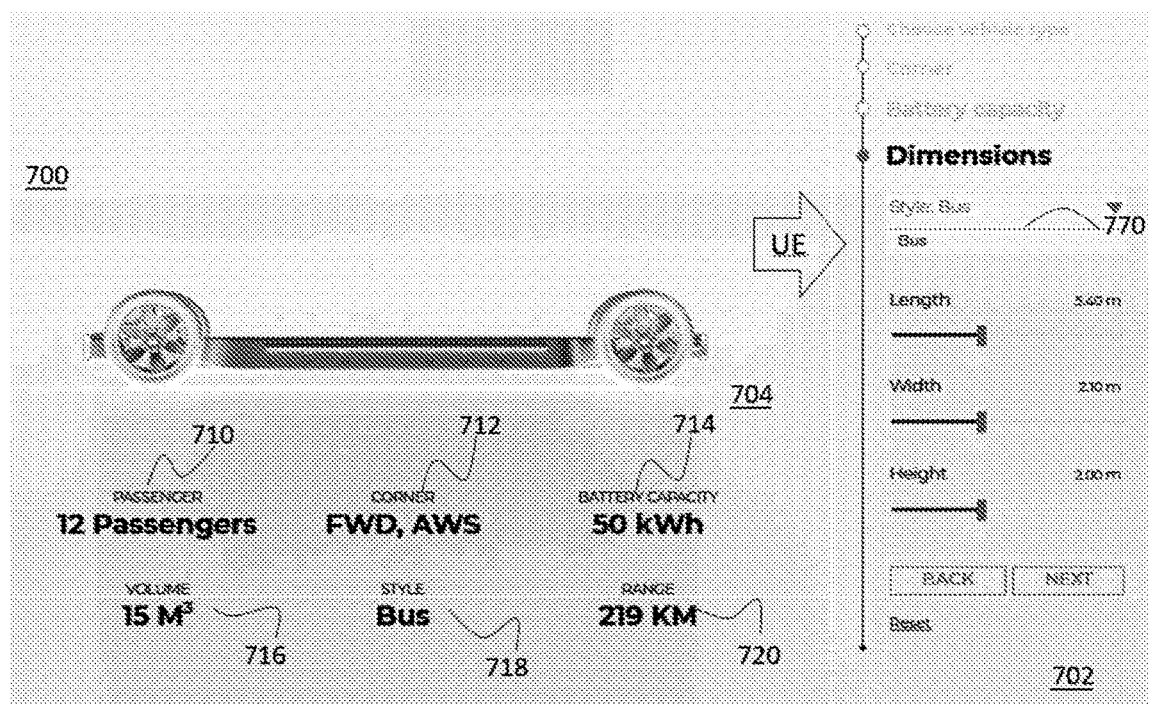
Figure 10P:
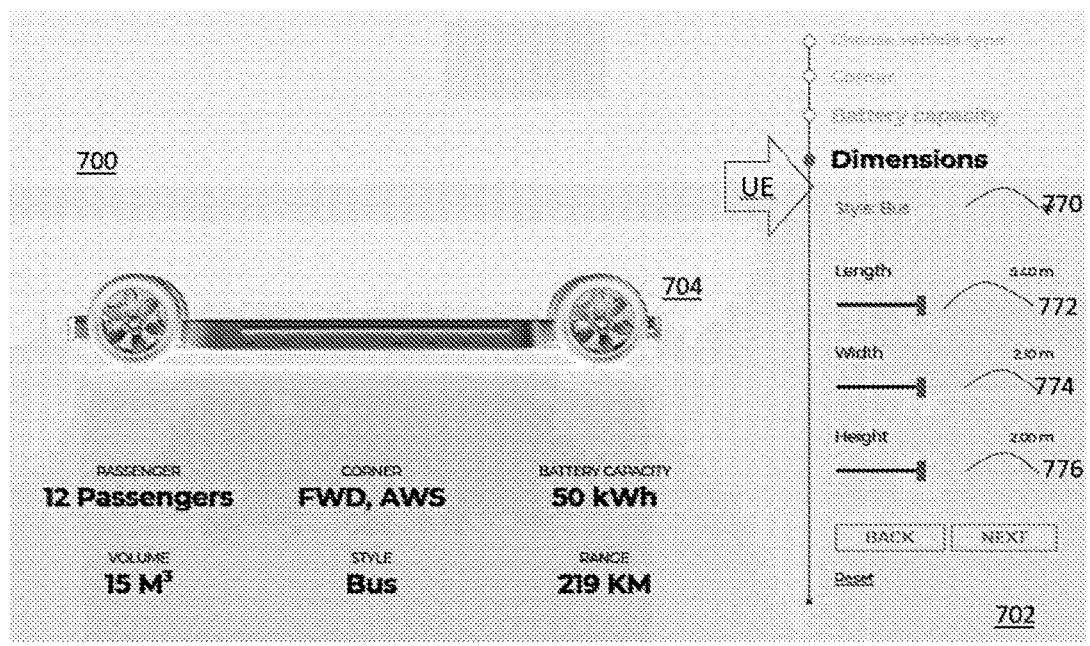
Figure 10Q:
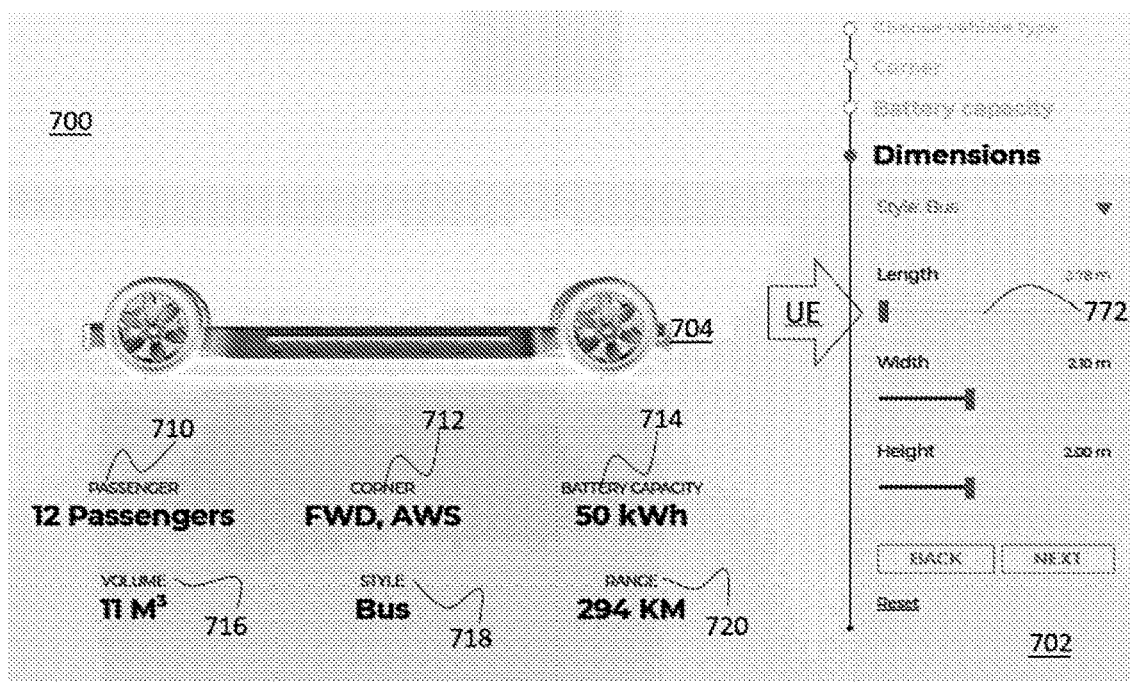
Figure 10R:
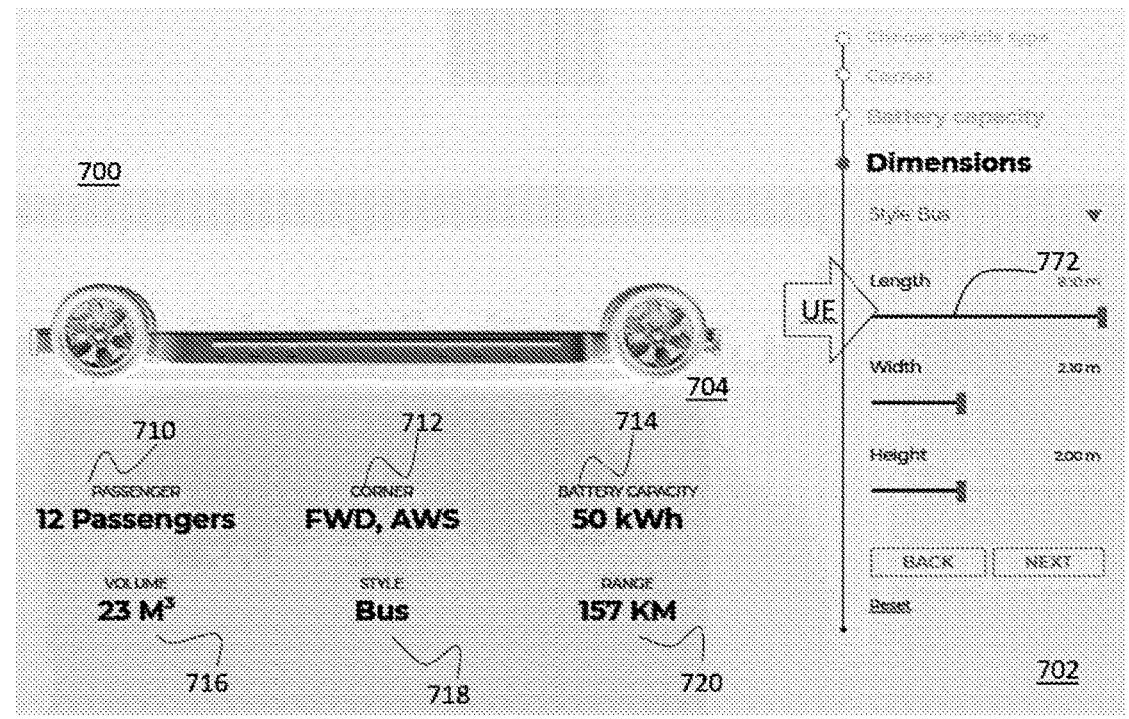
Figure 10S:
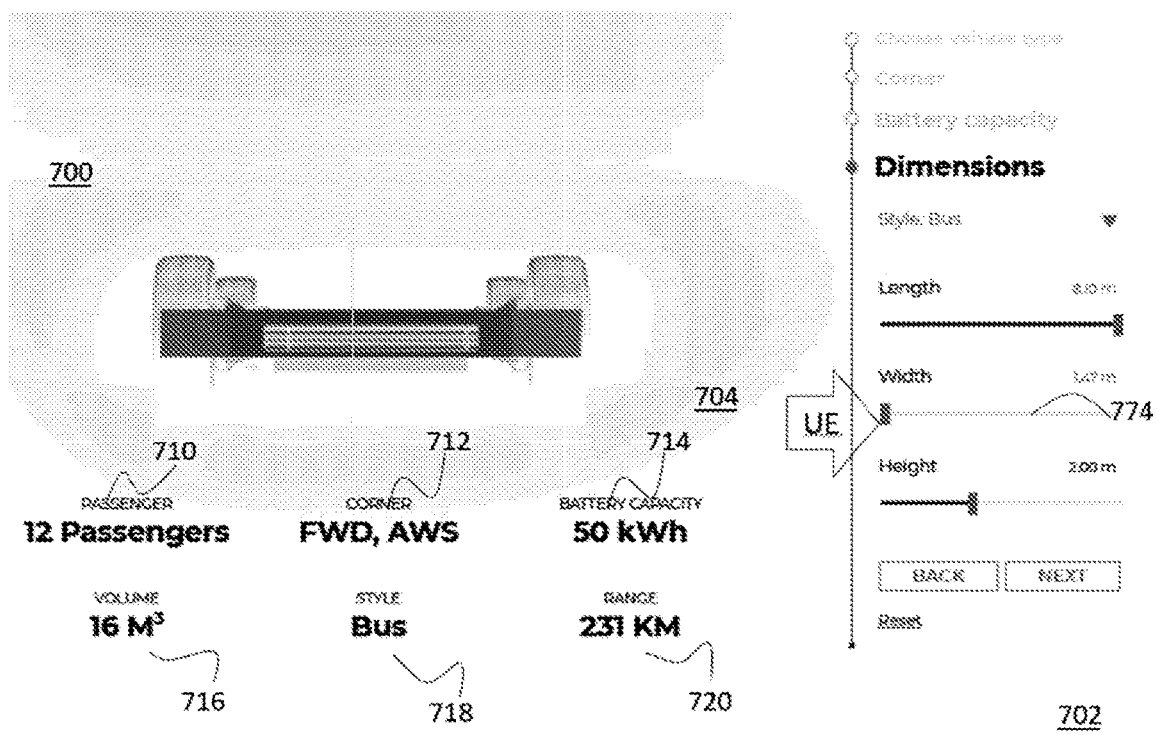
Figure 10T:
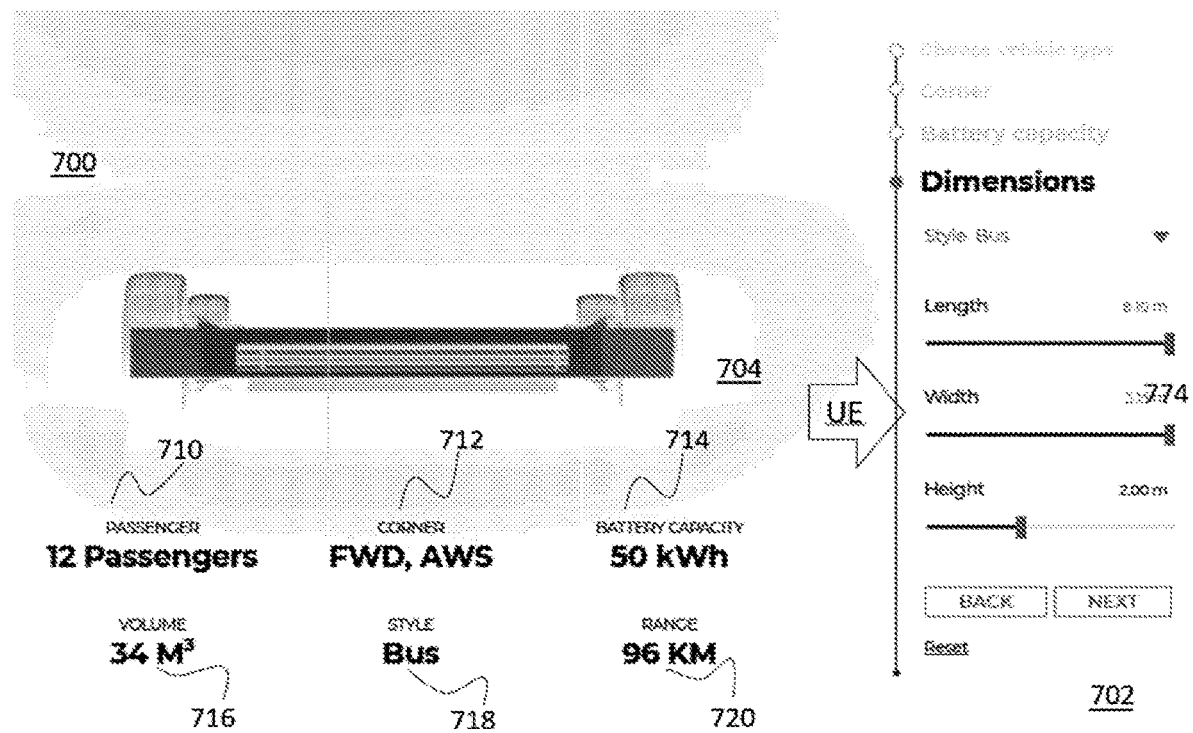
Figure 10U:
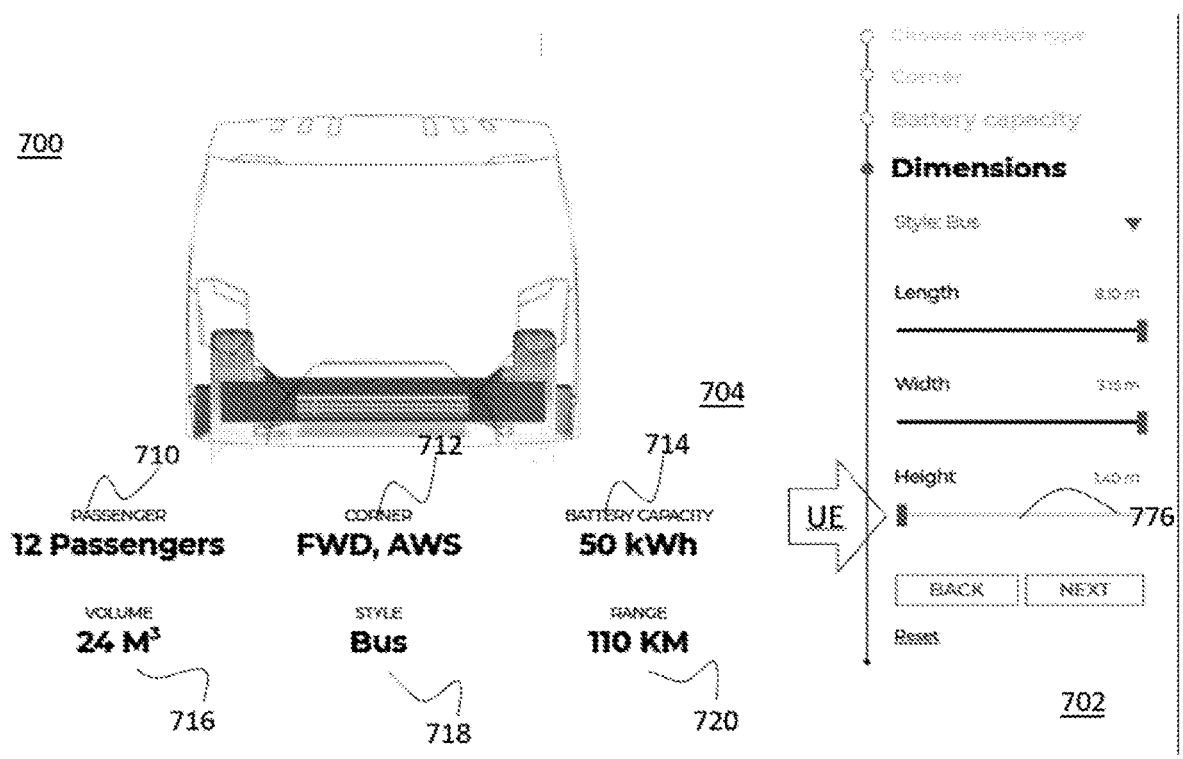
Figure 10V:
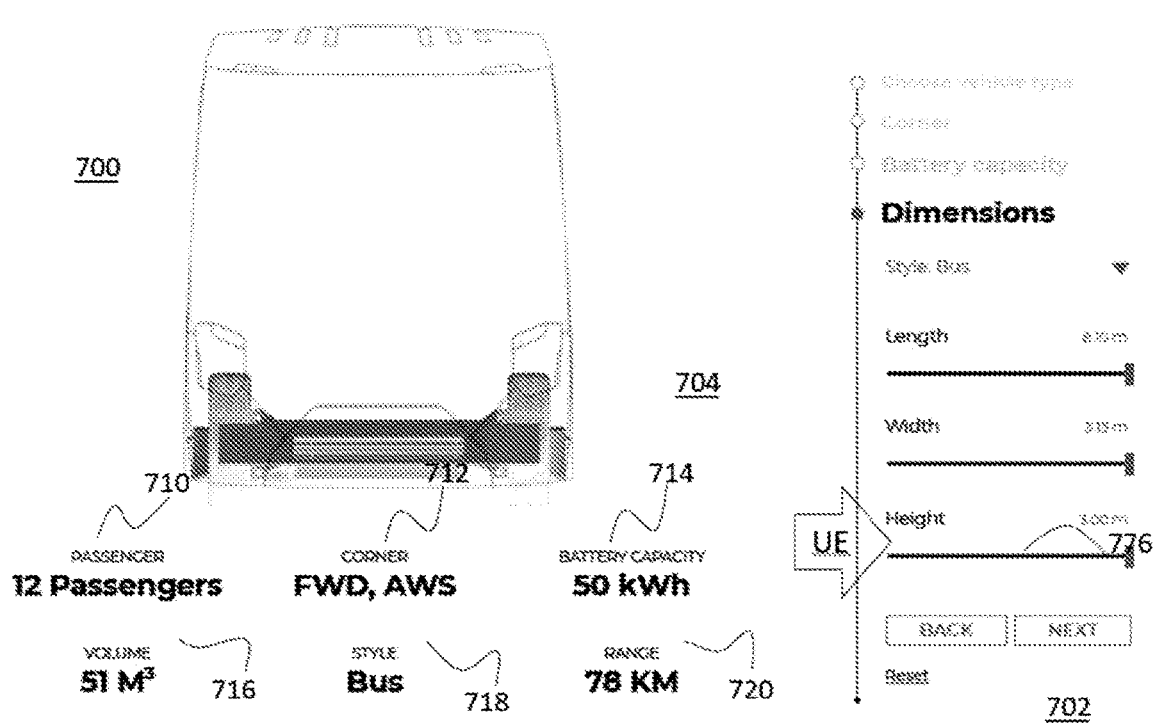
Figure 10Y:
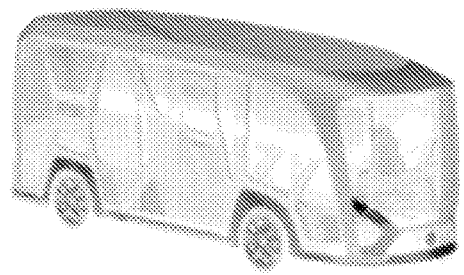

Reference is now made to FIGS. 10A-10Y, which illustrate a third example of user engagements with user interface components of GUI 700 of FIGS. 7A-7E.

In all of FIGS. 10A to 10Y, UE is an abbreviation for 'user engagement', as discussed hereinabove with respect to FIGS. 8A to 8Y.

The initial selections made by the user in the third example of FIGS. 10A to 10Y are identical to those shown in the first example. As such, FIGS. 10A to 10C are identical to FIGS. 8A to 8C, and follow the description thereof provided hereinabove.

The first distinction between the first example and the second example appears in FIG. 10D. As seen in FIG. 10D, the user selects that the vehicle should be suitable for twelve passengers, by user engagement of the appropriate line of the dropdown menu of 'Passengers' UIC 744. As seen, passenger/payload field 710 of the text region of presentation portion 704 has changed to reflect the user's selection, and now indicates that the vehicle being designed is suitable for twelve passengers. Additionally, the volume field 716 of the text region has changed to reflect a volume of 15M3, and the style field 718 has changed to reflect the style being a bus. This is because the only style which could be used for a 12 passenger vehicle, and which would be compliant, is that of a bus having the specified default volume. As such, since the user's selection already forces the style, GUI 700 already indicates the selections which are forced by the user's selections.

As seen, the image region of presentation portion 704 has also changed to reflect larger wheels, and greater distances between the wheels.

In FIG. 10E, user engagement of the 'Usage' UIC 746 causes the dropdown menu of UIC 746 to open up, allowing the user to select whether the vehicle will be used for urban driving or for a combination of urban/highway driving.

In FIG. 10F, the user selects that the vehicle should be suitable for urban and highway driving, by user engagement of the appropriate line of the dropdown menu of 'Usage' UIC 746. The user then engages the 'NEXT' UIC button 728, to confirm the selection made in the vehicle type segment, and move to the next segment of GUI 700, namely the corner segment.

Turning to FIG. 10G, it is seen that following the user engagement of 'NEXT' UIC button 728, selection region 702 has changed to display the corner segment. As seen, user engagement of 'Drive' UIC 750 causes the dropdown menu of UIC 750 to open up, allowing the user to select whether the vehicle will be have rear wheel drive, front wheel drive, or all wheel drive.

In FIG. 10H, the user selects that the vehicle should have front wheel drive, by user engagement of the appropriate line of the dropdown menu of 'Drive' UIC 750. As seen, corner field 712 of the text region of presentation portion 704 has changed to reflect the user's selection, and now indicates that the vehicle being designed is an FWD (front wheel drive) vehicle. Additionally, the image region of presentation portion 704 reflects that the vehicle is selected to be a front wheel drive vehicle, by addition of arrows adjacent the front wheels.

In FIG. 10I, user engagement of the 'Steer' UIC 752 causes the dropdown menu of UIC 752 to open up, allowing the user to select whether the vehicle will have front wheel steering or all wheel steering.

In FIG. 10J, the user selects that the vehicle should have all wheel steering, by user engagement of the appropriate line of the dropdown menu of 'Steer' UIC 752. As seen, corner field 712 of the text region of presentation portion 704 has changed to reflect the user's selection, and now indicates that the vehicle being designed is an FWD and AWS (all wheel steer) vehicle. Additionally, the image region of presentation portion 704 reflects that the vehicle is selected to be an all wheel steer vehicle, by addition of arrows adjacent the all four wheels.

In FIG. 10K, user engagement of the 'Speed' UIC 754 causes the dropdown menu of UIC 754 to open up, allowing the user to select the maximal speed of the vehicle. In the current example, the available maximal speeds are 40 KPH, 80 KPH, 120 KPH, 160 KPH, or 200 KPH.

In FIG. 10L, the user selects that the vehicle should have a maximal speed of 160 KPH, by user engagement of the appropriate line of the dropdown menu of 'Speed' UIC 754. The user then engages the 'NEXT' UIC button 728, to confirm the selection made in the corner segment, and move to the next segment of GUI 700, namely the battery capacity segment.

Turning to FIG. 10M, it is seen that following the user engagement of 'NEXT' UIC button 728, selection region 702 has changed to display the battery capacity segment. As seen, user engagement of 'Capacity' UIC 760 causes the dropdown menu of UIC 760 to open up, allowing the user to select whether the vehicle battery will be have a capacity of 50 kWh, 60 kWh, 70 kWh, 80 kWh, 90 kWh, 100 kWh, 1100 kWh, or 120 kWh.

In FIG. 10N, the user selects that the vehicle should have a battery capacity of 80 kWh, by user engagement of the appropriate line of the dropdown menu of 'Capacity' UIC 760. As seen, battery capacity field 714 of the text region of presentation portion 704 has changed to reflect the user's selection, and now indicates that the battery capacity is 80 kWh. Additionally, the range field 720 has been updated to reflect a default range for a bus having the selected battery capacity. Additionally, the image region of presentation portion 704 reflects that the vehicle is selected to have a battery capacity of 80 kWh, by showing eight 'batteries' 1004 on a representation of the chassis of the vehicle. The user then engages the 'NEXT' UIC button 728, to confirm the selection made in the battery capacity segment, and move to the next segment of GUI 700, namely the dimensions segment.

Turning to FIG. 10O, it is seen that the user changed their mind, and changed the battery capacity to be 50 kWh. As seen, range field 720 has changed to show a shorter range, since the battery capacity is now smaller. Following the user engagement of 'NEXT' UIC button 728, selection region 702 has changed to display the dimensions segment. As seen, user engagement of 'Body Style' UIC 770 causes the dropdown menu of UIC 770 to open up. However, as mentioned above, the only style compatible with the user's previous selections is a bus, so the dropdown menu only shows a single option—that of a bus.

In FIG. 10P, the user selects that the vehicle should be a bus, by user engagement of the appropriate line of the dropdown menu of 'Body Style' UIC 770. As a result, length, width, and height UICs 772, 774, and 776 now reflect default values for a bus. Specifically, the default values include a length of 5.40 m, a width of 2.10 m, and a height of 2.00 m. The image region of presentation portion 704 has changed to show a side view of the chassis of the bus.

Turning to FIG. 10Q, it is seen that user engagement of 'Length' UIC 772 has moved the slider thereof to the rightmost position, indicating the smallest length of the vehicle, namely 3.78 m. Consequently, the volume field 716 has been updated to reflect a smaller volume than that shown in FIG. 10P, in which the length of the vehicle was greater. Conversely, the range field 720 has been updated to reflect a longer range than that shown in FIG. 10P. The image region of presentation portion 704 has changed, relative to that shown in FIG. 10P to reflect the shorter chassis of the bus.

In FIG. 10R, it is seen that user engagement of 'Length' UIC 772 has moved the slider thereof to the leftmost position, indicating the greatest length of the vehicle, namely 8.10 m. Consequently, the volume field 716 has been updated to reflect a larger volume than that shown in FIGS. 10P and 10Q, in which the length of the vehicle was smaller. Conversely, the range field 720 has been updated to reflect a shorter range than that shown in FIGS. 10P and 10Q. The image region of presentation portion 704 has changed, relative to that shown in FIGS. 10P and 10Q to reflect the longer chassis of the bus.

Turning to FIG. 10S, it is seen that user engagement of 'Width' UIC 774 has moved the slider thereof to the rightmost position, indicating the smallest width of the vehicle, namely 1.47 m Consequently, the volume field 716 has been updated to reflect a smaller volume than that shown in FIG. 10R, in which width of the vehicle was greater. Conversely, the range field 720 has been updated to reflect a longer range than that shown in FIG. 10R. The image region of presentation portion 704 has changed to reflect the width of the chassis of the bus.

In FIG. 10T, it is seen that user engagement of 'Width' UIC 774 has moved the slider thereof to the leftmost position, indicating the greatest width of the vehicle, namely 3.15 m. Consequently, the volume field 716 has been updated to reflect a larger volume than that shown in FIG. 10S, in which the width of the vehicle was smaller. Conversely, the range field 720 has been updated to reflect a shorter range than that shown in FIG. 10S. The image region of presentation portion 704 has changed, relative that shown in FIG. 10S to reflect the greater width of the chassis of the bus.

Turning to FIG. 10U, it is seen that user engagement of 'Height' UIC 776 has moved the slider thereof to the rightmost position, indicating the smallest width of the vehicle, namely 1.40 m Consequently, the volume field 716 has been updated to reflect a smaller volume than that shown in FIG. 10T, in which the width of the vehicle was greater and the height of the vehicle was greater. Conversely, the range field 720 has been updated to reflect a longer range than that shown in FIG. 10T. The image region of presentation portion 704 has changed to reflect the height of the bus.

In FIG. 10V, it is seen that user engagement of 'Height' UIC 776 has moved the slider thereof to the leftmost position, indicating the greatest width of the vehicle, namely 3.00 m. Consequently, the volume field 716 has been updated to reflect a larger volume than that shown in FIG. 10U, in which the height of the vehicle was smaller. Conversely, the range field 720 has been updated to reflect a shorter range than that shown in FIG. 10U. The image region of presentation portion 704 has changed, relative that shown in FIG. 10U to reflect the greater height of the bus.

Turning to FIG. 10W, it is seen that user engagement of 'Width' UIC 774 has moved the slider thereof to an interim position, indicating a vehicle width of 2.41 m, and user engagement of 'Height' UIC 776 has moved the slider thereof to an interim position, indicating a vehicle height of 1.98 m. Consequently, the volume field 716 has been updated to reflect a smaller volume than that shown in FIG. 10V and the range field 720 has been updated to reflect a longer range than that shown in FIG. 10V. The image region of presentation portion 704 has changed to reflect the current selected height of the vehicle. The user then engages the 'NEXT' UIC button 728, to confirm the selection made in the dimensions segment, and to finalize the configuration of the vehicle.

Turning to FIG. 10X, it is seen that following the user engagement of 'NEXT' UIC button 728, the specification of the vehicle defined by user interaction with GUI 700 is displayed to the user. As seen, the specification has three sections—a first section relating to configuration of the corner and battery, a second region relating to configuration of the vehicle type and architecture, and a third section relating to the vehicle dimensions. All of the user's selections, made by interaction with GUI 700, are reflected in the specification, as well as additional characteristics of the vehicle which were not selected by the user and which are required for a vehicle, including the characteristics selected by the user, to be electrically and mechanically compliant.

FIG. 10Y shows a virtual model of a bus that meet the specification of FIG. 10X, which may be displayed to the user as described hereinabove with respect to FIG. 8Y.

Figure 11A:
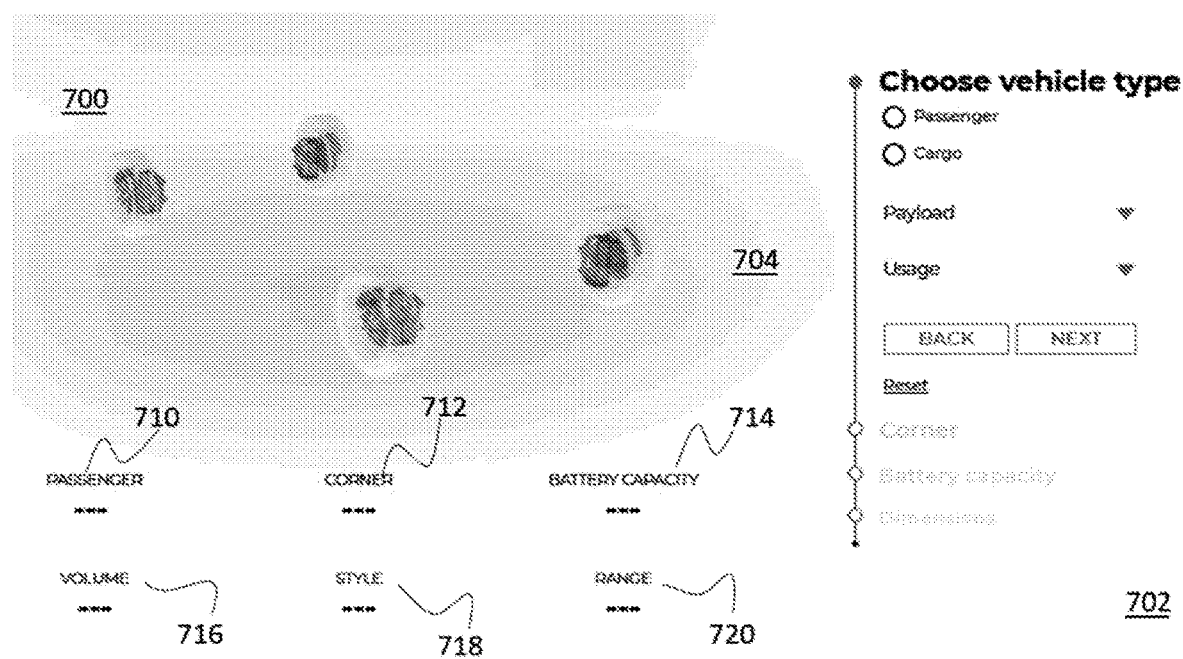
FIGS. 11A-11Y illustrate a fourth example of user engagements with the user interface components of FIGS. 11A-11E.

Reference is now made to FIGS. 11A-11Y, which illustrate a fourth example of user engagements with user interface components of GUI 700 of FIGS. 7A-7E.

In all of FIGS. 11A to 11Y, UE is an abbreviation for 'user engagement', as discussed hereinabove with respect to FIGS. 8A to 8Y.

In FIG. 11A, no selection has yet been made by the user in GUI 700. Consequently, no value is shown in any of text fields 710, 712, 714, 716, 718, and 720, and the image portion of presentation region 704 shows a default image.

Figure 11B:
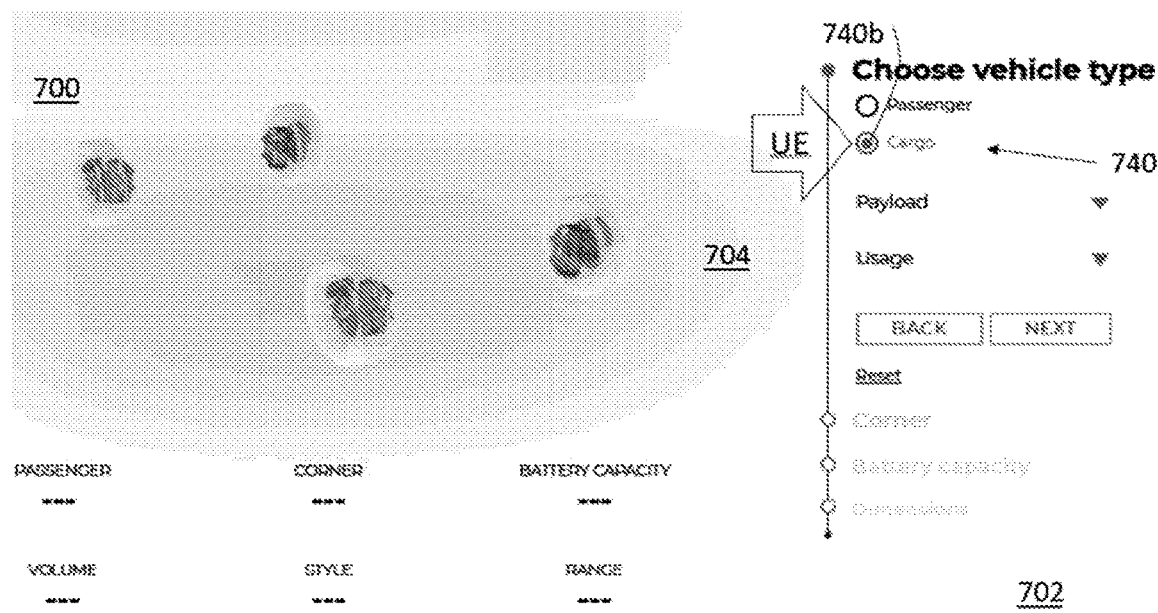

In FIG. 11B, the user selects that the vehicle should be a cargo vehicle, by user engagement of radio button 740*b* of the 'Type' UIC 740.

Figure 11C:
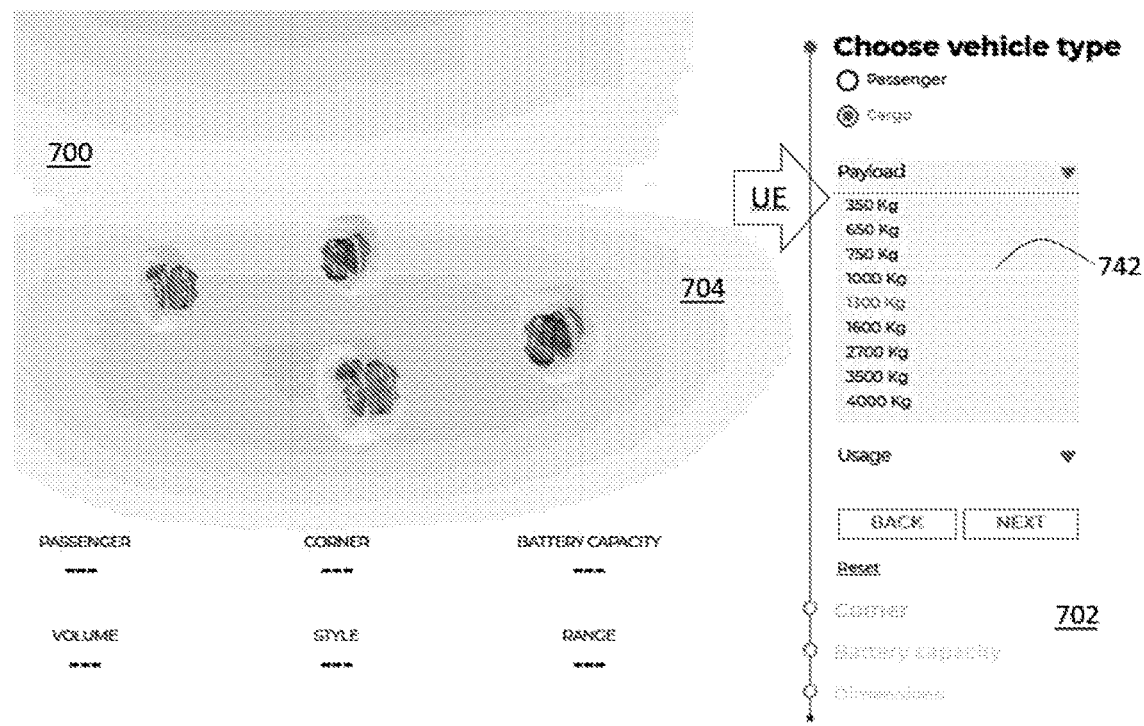

In FIG. 11C, user engagement of the 'Payload' UIC 742 causes the dropdown menu of UIC 742 to open up, allowing the user to select whether the vehicle will be suitable for a payload of 350 kg, 650 kg, 750 kg, 1000 kg, 1300 kg, 1600 kg, 2700 kg, 3500 kg, or 4000 kg.

Figure 11D:
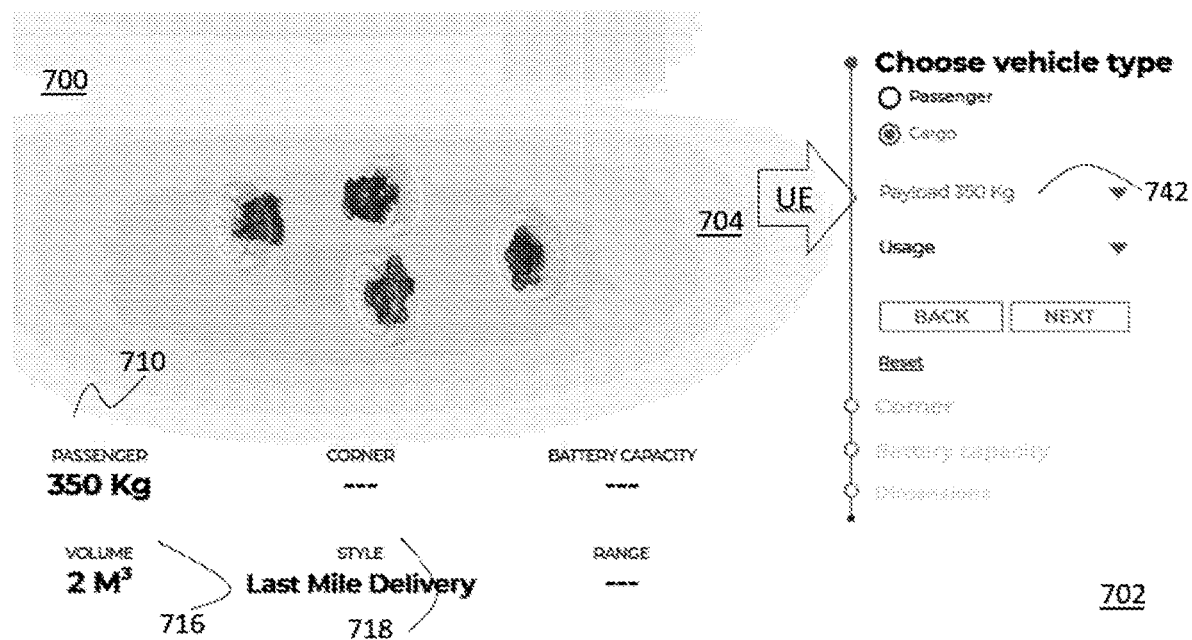

As seen in FIG. 11D, the user selects that the vehicle should be suitable for a payload of 350 kg, by user engagement of the appropriate line of the dropdown menu of 'Payload' UIC 742. As seen, passenger/payload field 710 of the text region of presentation portion 704 has changed to reflect the user's selection, and now indicates that the vehicle being designed is suitable for a payload of 350 kg. Additionally, the volume field 716 of the text region has changed to reflect a volume of $2M^3$, and the style field 718 has changed to reflect the style being last mile delivery. This is because the only style which could be used for a 12 passenger vehicle, and which would be compliant, is that of a last mile delivery vehicle having the specified default volume. As such, since the user's selection already forces the style, GUI 700 already indicates the selections which are forced by the user's selections.

As seen, the image region of presentation portion 704 has also changed to reflect smaller wheels, and smaller distances between the wheels.

Figure 11E:
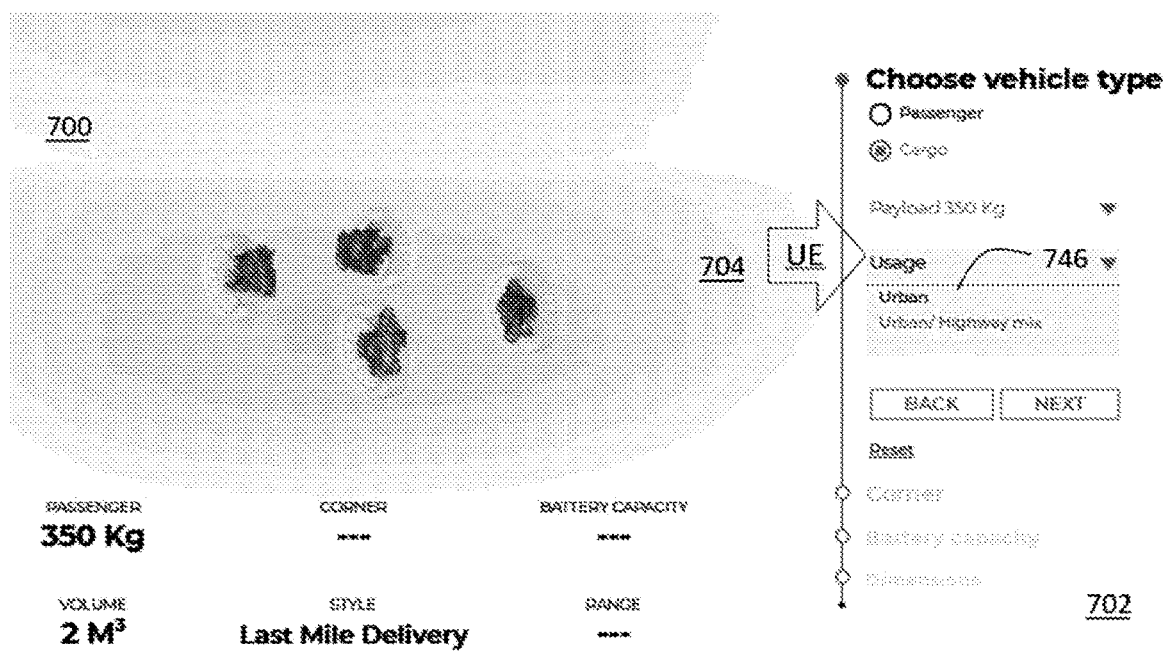

In FIG. 11E, user engagement of the 'Usage' UIC 746 causes the dropdown menu of UIC 746 to open up, allowing the user to select whether the vehicle will be used for urban driving or for a combination of urban/highway driving.

Figure 11F:
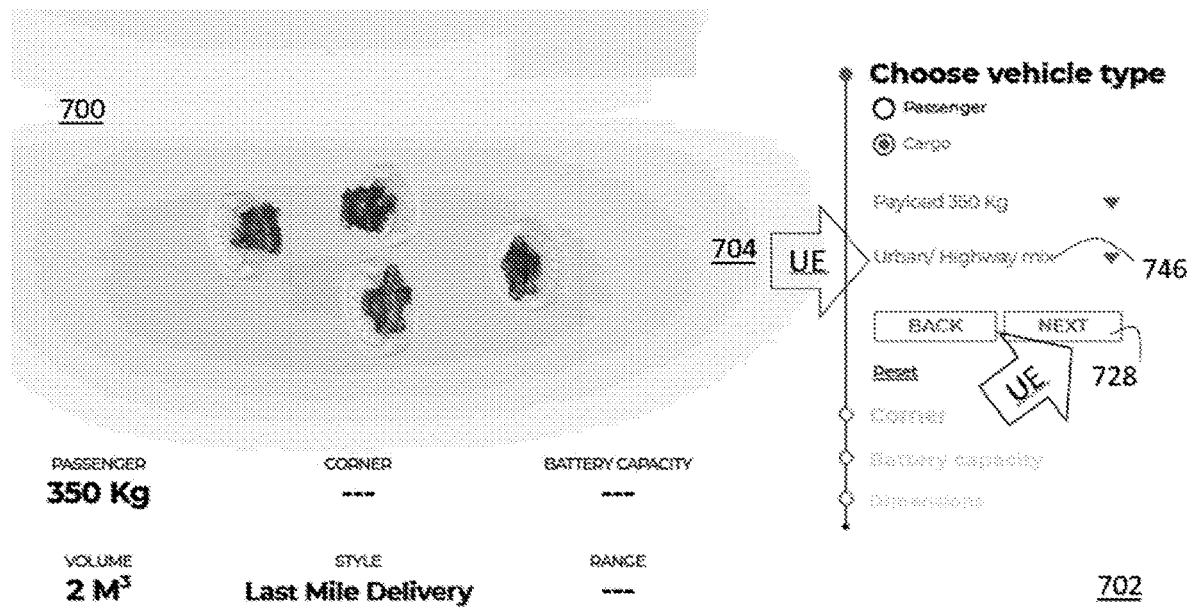

In FIG. 11F, the user selects that the vehicle should be suitable for urban and highway driving, by user engagement of the appropriate line of the dropdown menu of 'Usage' UIC 746. The user then engages the 'NEXT' UIC button 728, to confirm the selection made in the vehicle type segment, and move to the next segment of GUI 700, namely the corner segment.

Figure 11G:
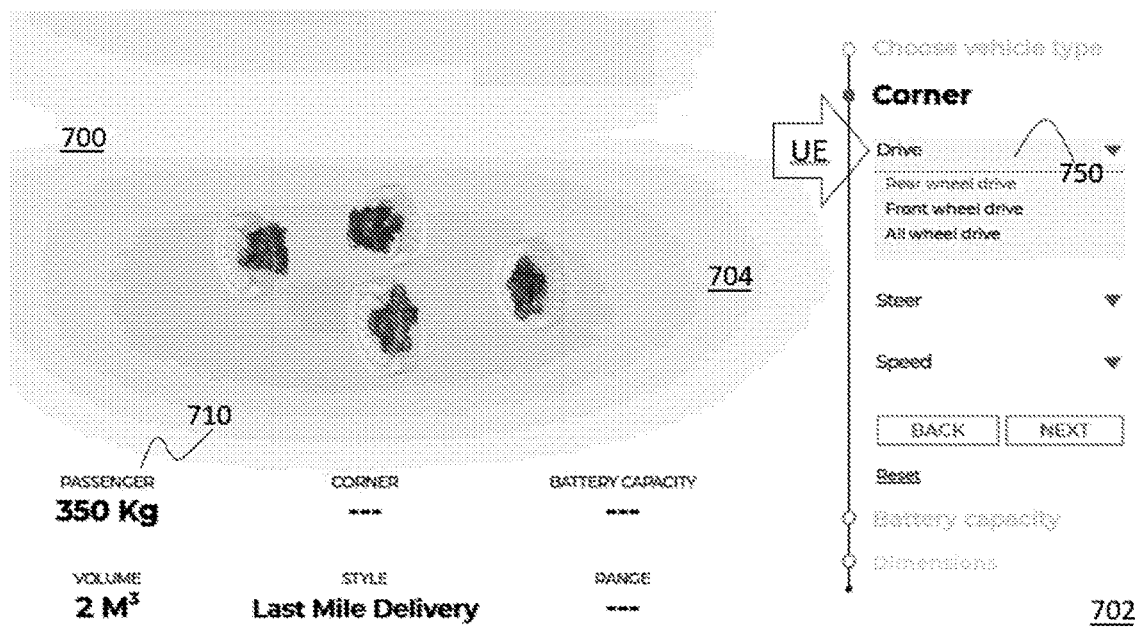

Turning to FIG. 11G, it is seen that following the user engagement of 'NEXT' UIC button 728, selection region 702 has changed to display the corner segment. As seen, user engagement of 'Drive' UIC 750 causes the dropdown menu of UIC 750 to open up, allowing the user to select whether the vehicle will be have rear wheel drive, front wheel drive, or all wheel drive.

Figure 11H:
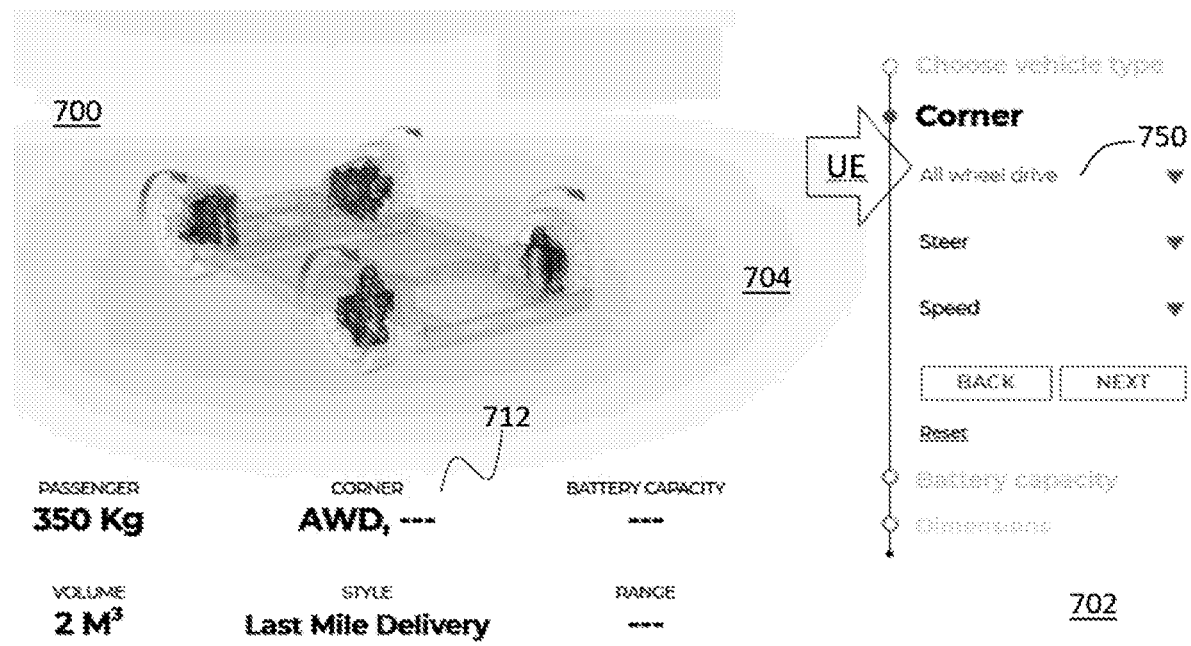

In FIG. 11H, the user selects that the vehicle should have all wheel drive, by user engagement of the appropriate line of the dropdown menu of 'Drive' UIC 750. As seen, corner field 712 of the text region of presentation portion 704 has changed to reflect the user's selection, and now indicates that the vehicle being designed is an AWD (all wheel drive) vehicle. Additionally, the image region of presentation portion 704 reflects that the vehicle is selected to be an all wheel drive vehicle, by addition of arrows adjacent all four wheels.

Figure 11I:
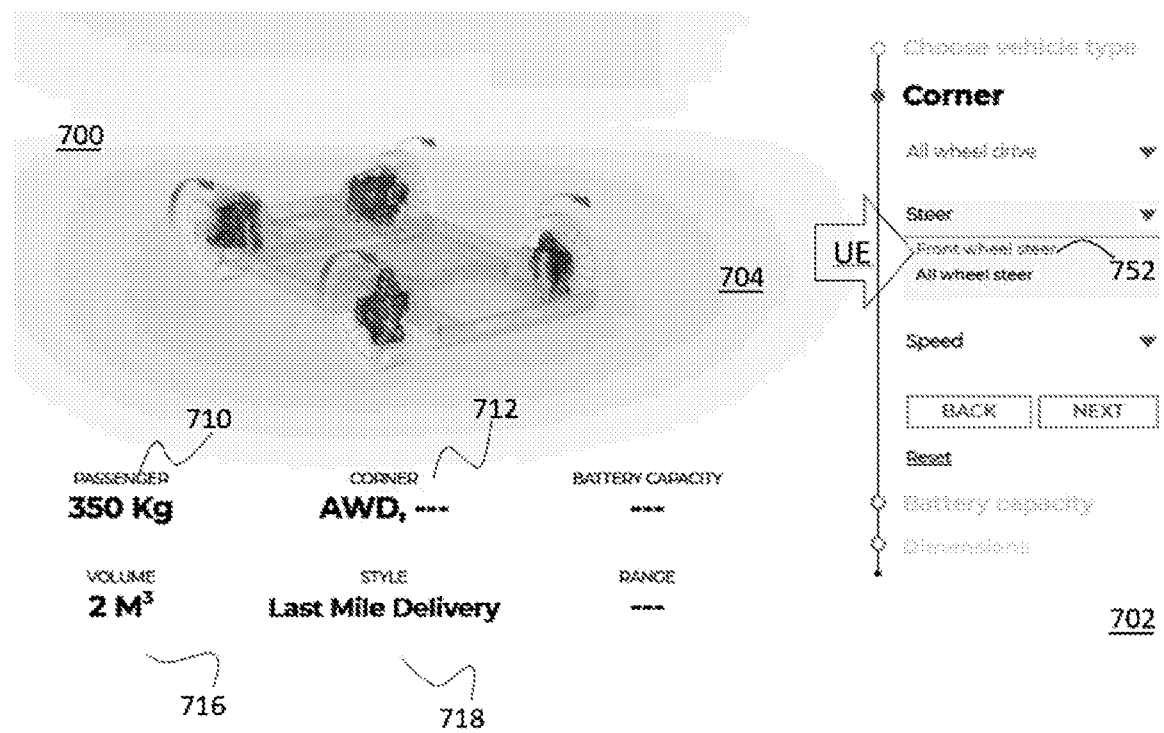

In FIG. 11I, user engagement of the 'Steer' UIC 752 causes the dropdown menu of UIC 752 to open up, allowing the user to select whether the vehicle will have front wheel steering or all wheel steering.

Figure 11J:
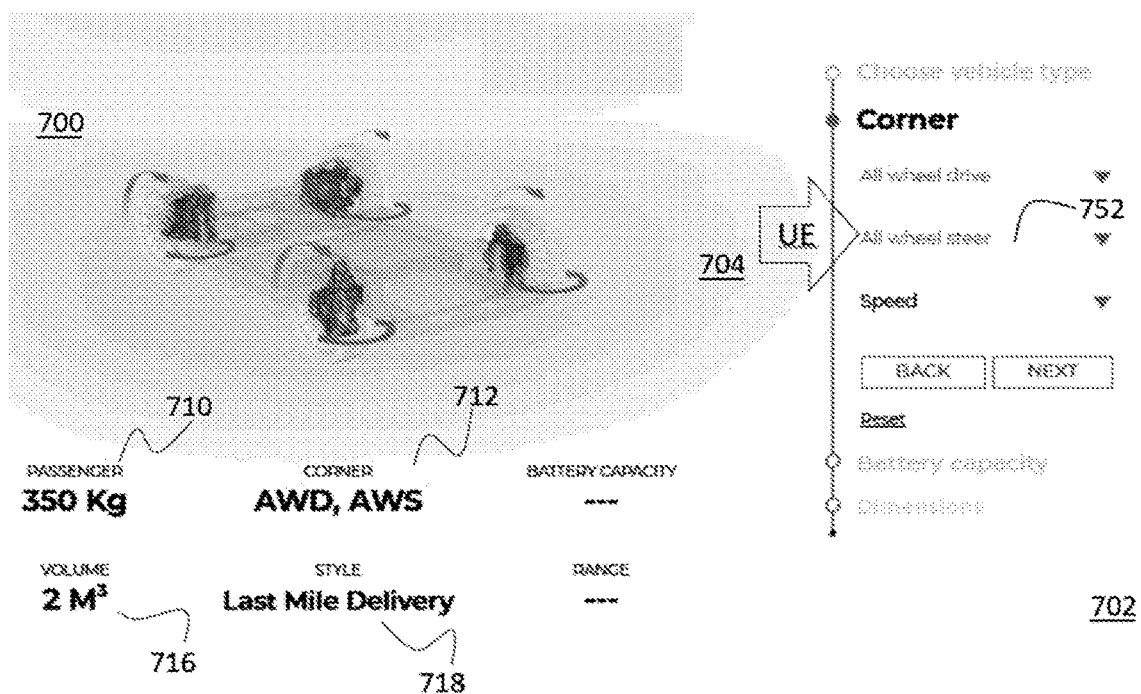

In FIG. 11J, the user selects that the vehicle should have all wheel steering, by user engagement of the appropriate line of the dropdown menu of 'Steer' UIC 752. As seen, corner field 712 of the text region of presentation portion 704 has changed to reflect the user's selection, and now indicates that the vehicle being designed is an AWD and AWS (all wheel steer) vehicle. Additionally, the image region of presentation portion 704 reflects that the vehicle is selected to be an all wheel steer vehicle, by addition of arrows adjacent the all four wheels.

Figure 11K:
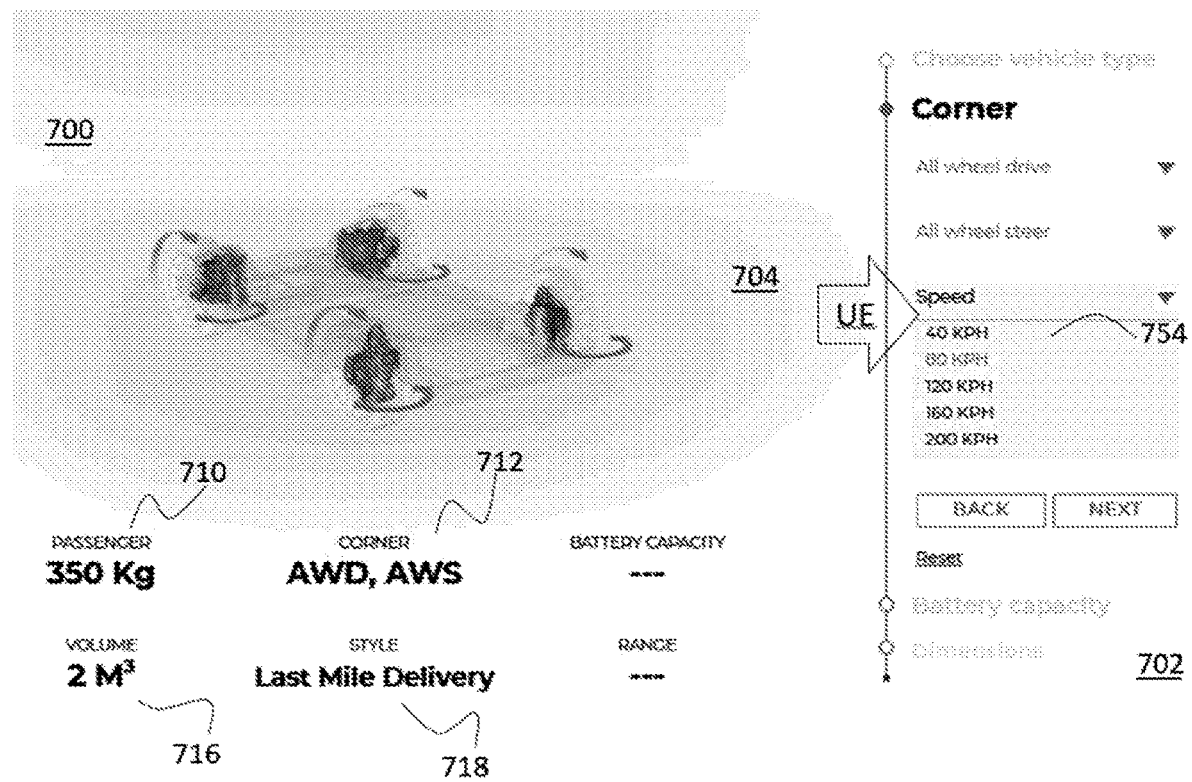

In FIG. 11K, user engagement of the 'Speed' UIC 754 causes the dropdown menu of UIC 754 to open up, allowing the user to select the maximal speed of the vehicle. In the current example, the available maximal speeds are 40 KPH, 80 KPH, 120 KPH, 160 KPH, or 200 KPH.

Figure 11L:
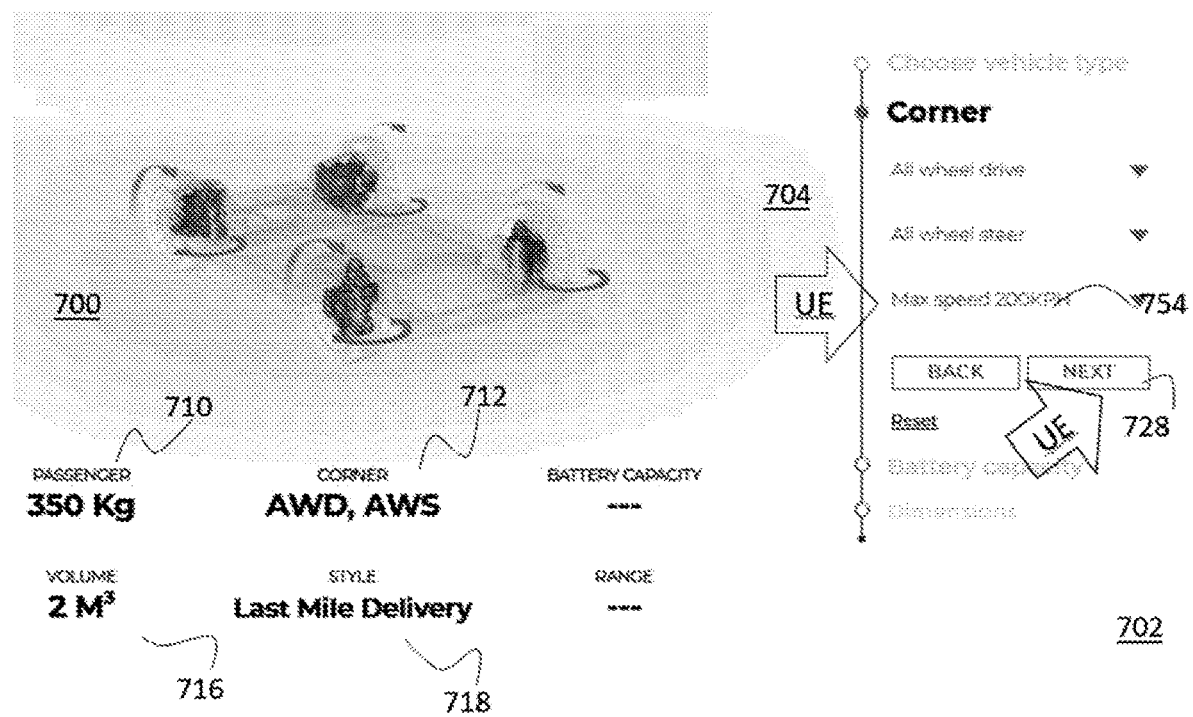

In FIG. 11L, the user selects that the vehicle should have a maximal speed of 200 KPH, by user engagement of the appropriate line of the dropdown menu of 'Speed' UIC 754. The user then engages the 'NEXT' UIC button 728, to confirm the selection made in the corner segment, and move to the next segment of GUI 700, namely the battery capacity segment.

Figure 11M:
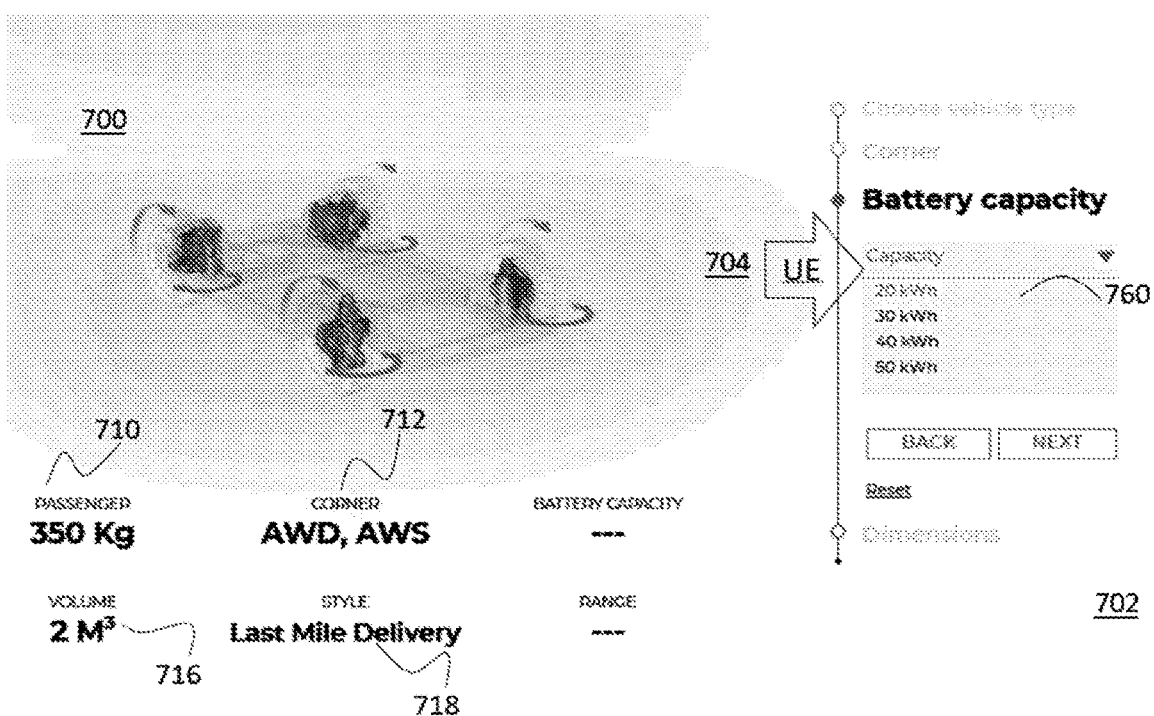

Turning to FIG. 11M, it is seen that following the user engagement of 'NEXT' UIC button 728, selection region 702 has changed to display the battery capacity segment. As seen, user engagement of 'Capacity' UIC 760 causes the dropdown menu of UIC 760 to open up, allowing the user to select whether the vehicle battery will be have a capacity of 20 kWh, 30 kWh, 40 kWh, or 50 kWh.

Figure 11N:
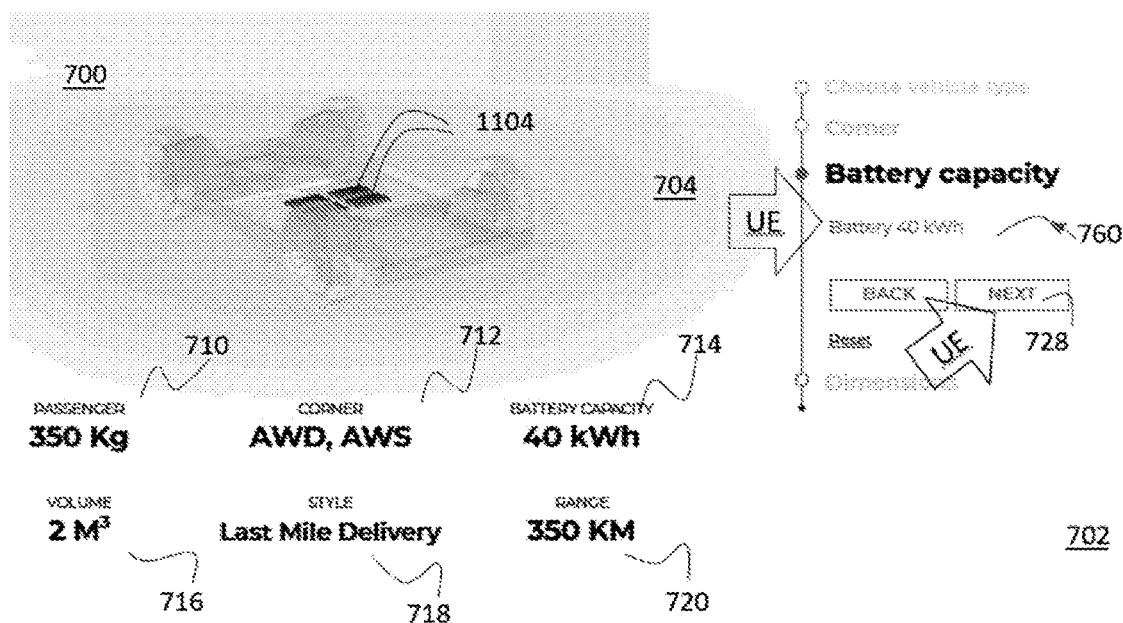

In FIG. 11N, the user selects that the vehicle should have a battery capacity of 40 kWh, by user engagement of the appropriate line of the dropdown menu of 'Capacity' UIC 760. As seen, battery capacity field 714 of the text region of presentation portion 704 has changed to reflect the user's selection, and now indicates that the battery capacity is 40 kWh. Additionally, the range field 720 has been updated to reflect a default range for a bus having the selected battery capacity. Additionally, the image region of presentation portion 704 reflects that the vehicle is selected to have a battery capacity of 40 kWh, by showing four 'batteries' 1104 on a representation of the chassis of the vehicle. The user then engages the 'NEXT' UIC button 728, to confirm the selection made in the battery capacity segment, and move to the next segment of GUI 700, namely the dimensions segment.

Figure 11O:
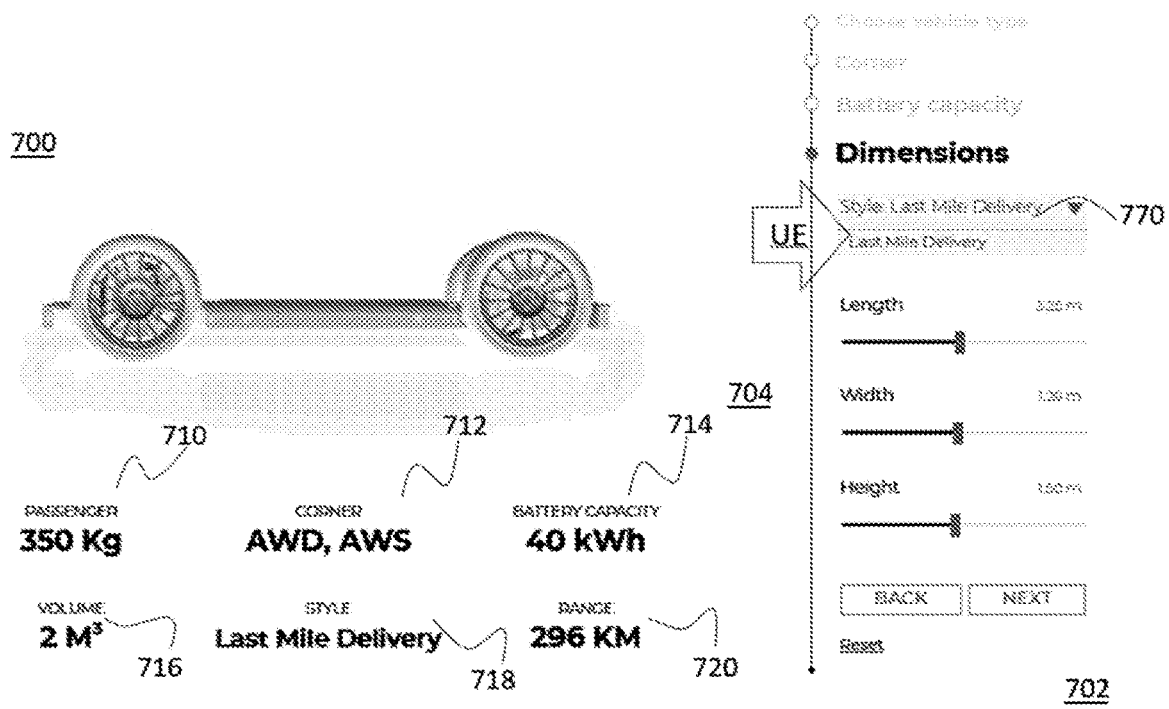

Turning to FIG. 11O, it is seen that following the user engagement of 'NEXT' UIC button 728, selection region 702 has changed to display the dimensions segment. As seen, user engagement of 'Body Style' UIC 770 causes the dropdown menu of UIC 770 to open up. However, as mentioned above, the only style compatible with the user's previous selections is a last mile delivery vehicle, so the dropdown menu only shows a single option—that of a last mile delivery vehicle.

Figure 11P:
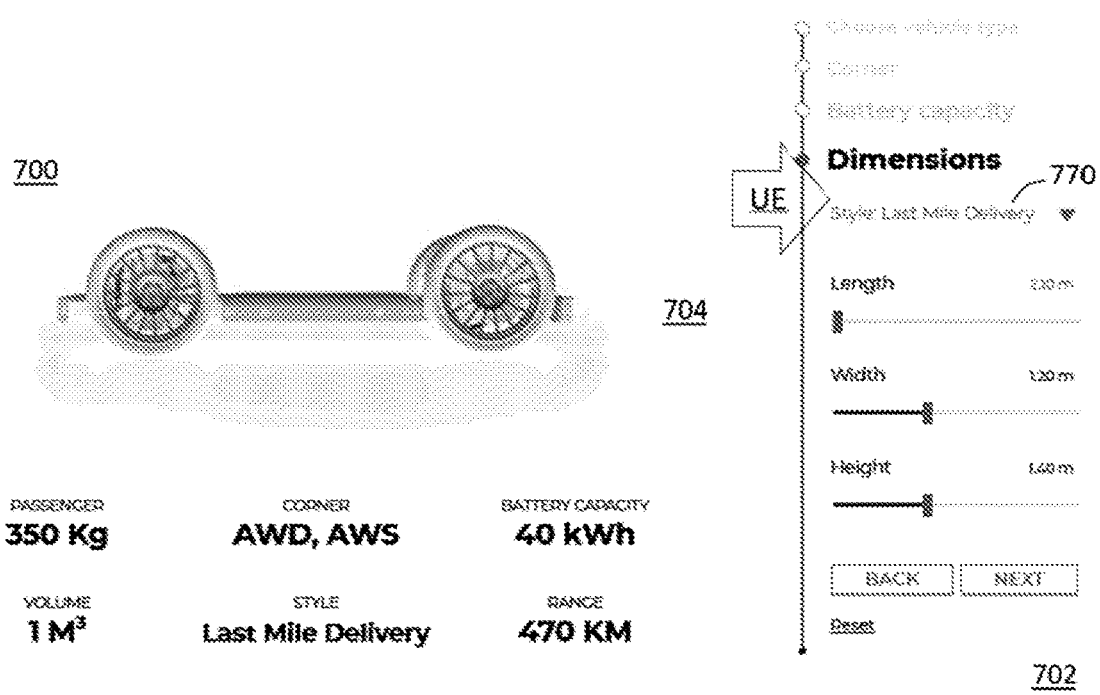

In FIG. 11P, the user selects that the vehicle should be a bus, by user engagement of the appropriate line of the dropdown menu of 'Body Style' UIC 770.

Figure 11Q:
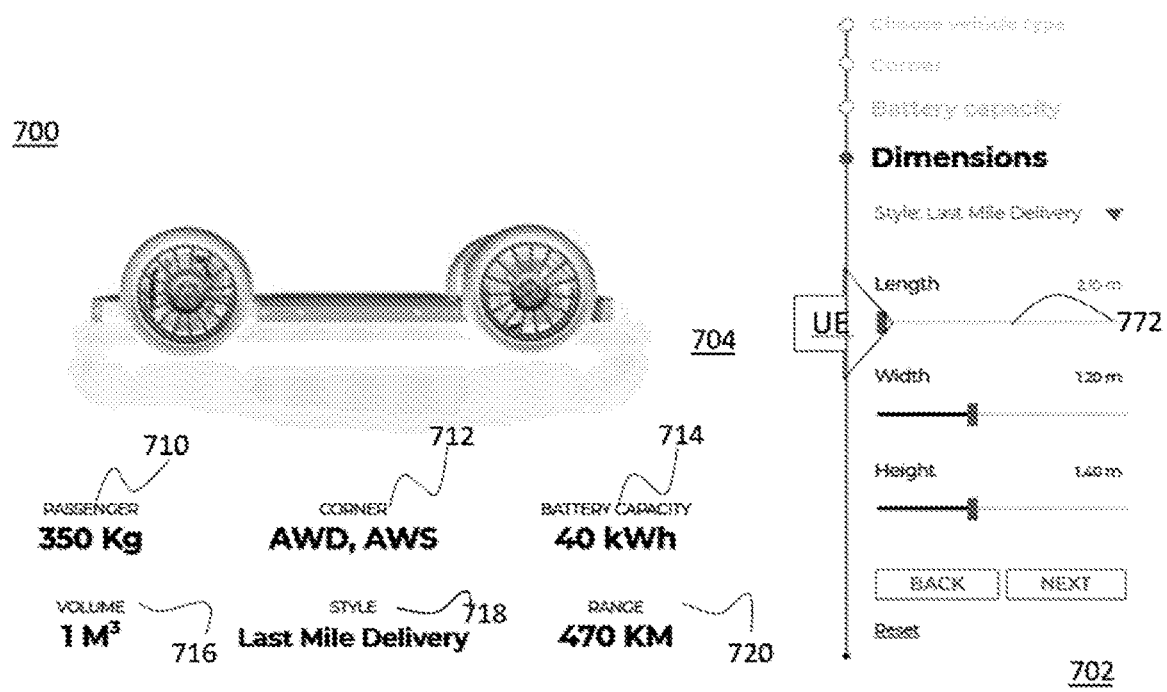

Turning to FIG. 11Q, it is seen that user engagement of 'Length' UIC 772 has moved the slider thereof to the rightmost position, indicating the smallest length of the vehicle, namely 2.10 m. Consequently, the volume field 716 has been updated to reflect a smaller volume than that shown in FIG. 11P, in which the length of the vehicle was greater. Conversely, the range field 720 has been updated to reflect a longer range than that shown in FIG. 11P. The image region of presentation portion 704 has changed, relative to that shown in FIG. 11P to reflect the shorter chassis of the vehicle.

Figure 11R:
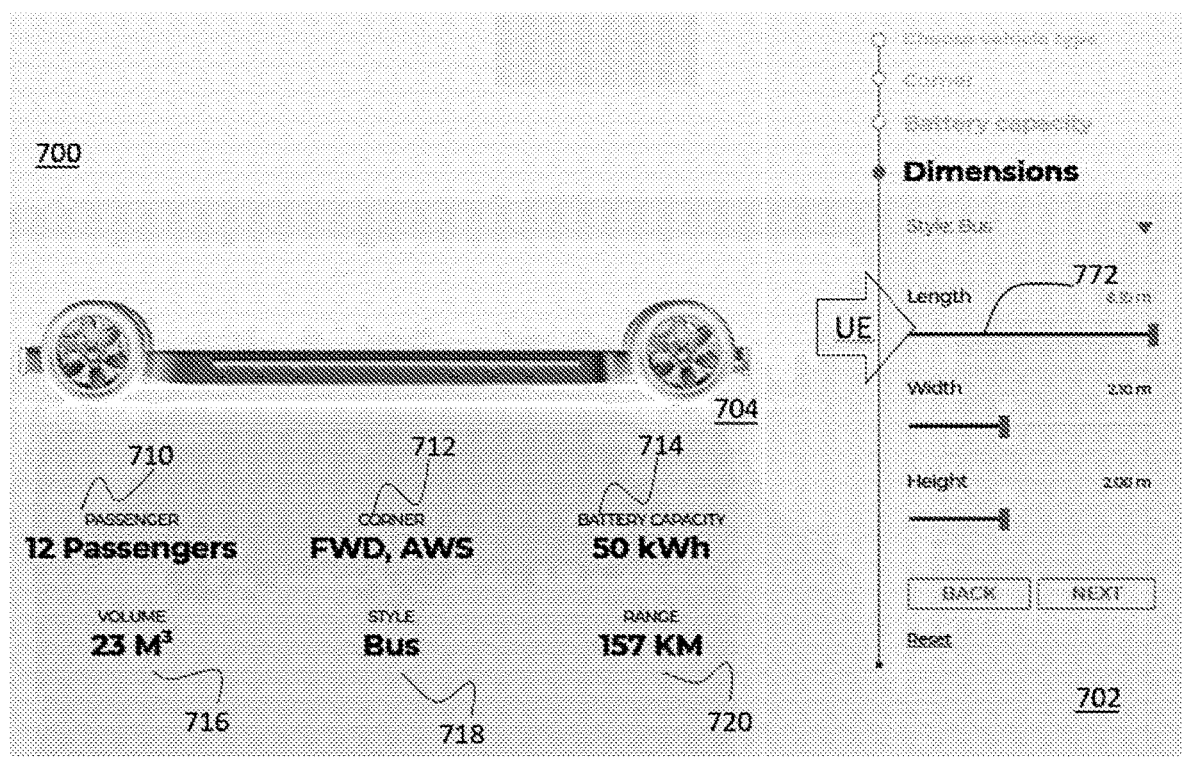

In FIG. 11R, it is seen that user engagement of 'Length' UIC 772 has moved the slider thereof to the leftmost position, indicating the greatest length of the vehicle, namely 4.50 m. Consequently, the volume field 716 has been updated to reflect a larger volume than that shown in FIG. 11Q, in which the length of the vehicle was smaller. Conversely, the range field 720 has been updated to reflect a shorter range than that shown in FIG. 11Q. The image region of presentation portion 704 has changed, relative to that shown in FIG. 11Q to reflect the longer chassis of the vehicle.

Figure 11S:
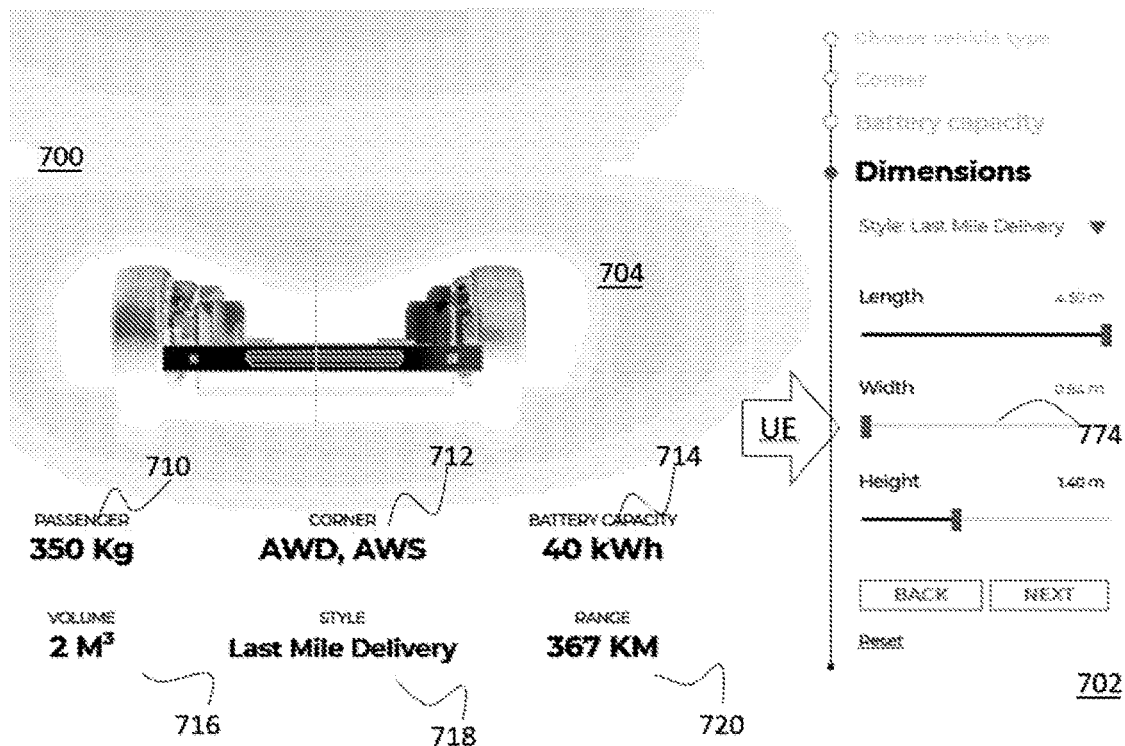

Turning to FIG. 11S, it is seen that user engagement of 'Width' UIC 774 has moved the slider thereof to the rightmost position, indicating the smallest width of the vehicle, namely 0.84 m Consequently, the volume field 716 has been updated to reflect a smaller volume than that shown in FIG. 11R, in which width of the vehicle was greater. Conversely, the range field 720 has been updated to reflect a longer range than that shown in FIG. 11R. The image region of presentation portion 704 has changed to reflect the width of the chassis of the vehicle.

Figure 11T:
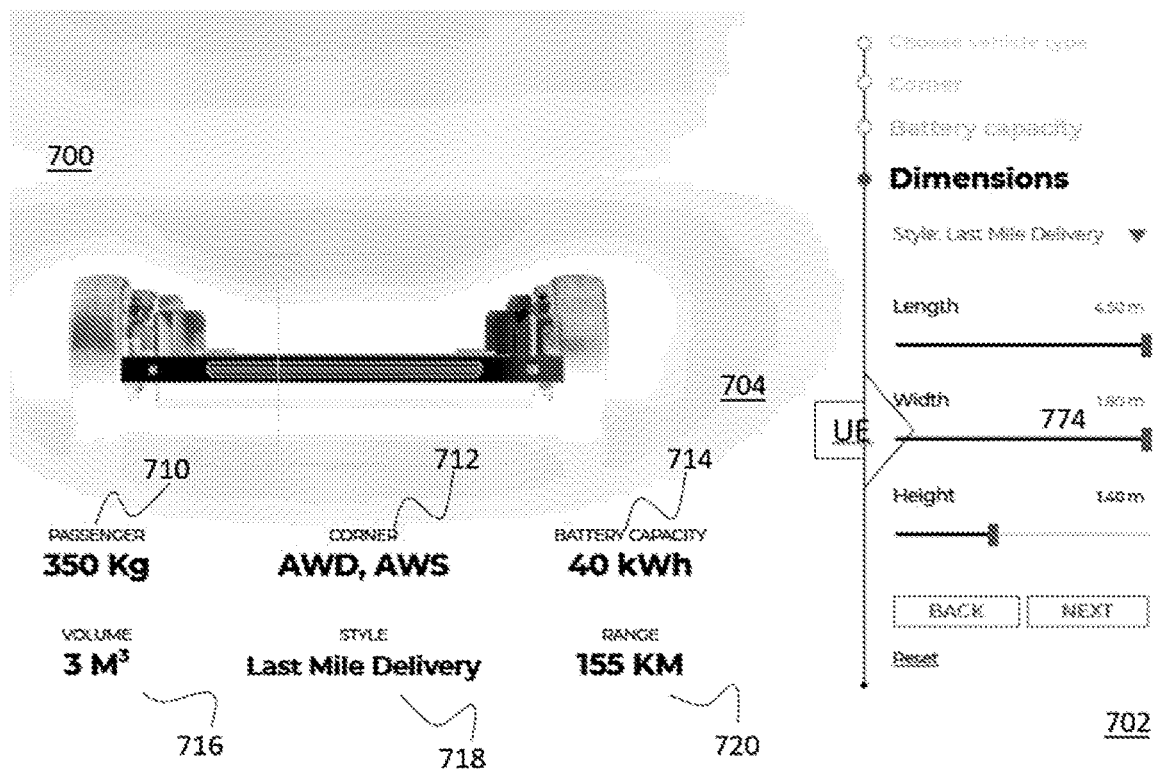

In FIG. 11T, it is seen that user engagement of 'Width' UIC 774 has moved the slider thereof to the leftmost position, indicating the greatest width of the vehicle, namely 1.80 m. Consequently, the volume field 716 has been updated to reflect a larger volume than that shown in FIG. 11S, in which the width of the vehicle was smaller. Conversely, the range field 720 has been updated to reflect a shorter range than that shown in FIG. 11S. The image region of presentation portion 704 has changed, relative that shown in FIG. 11S to reflect the greater width of the chassis of the vehicle.

Figure 11U:
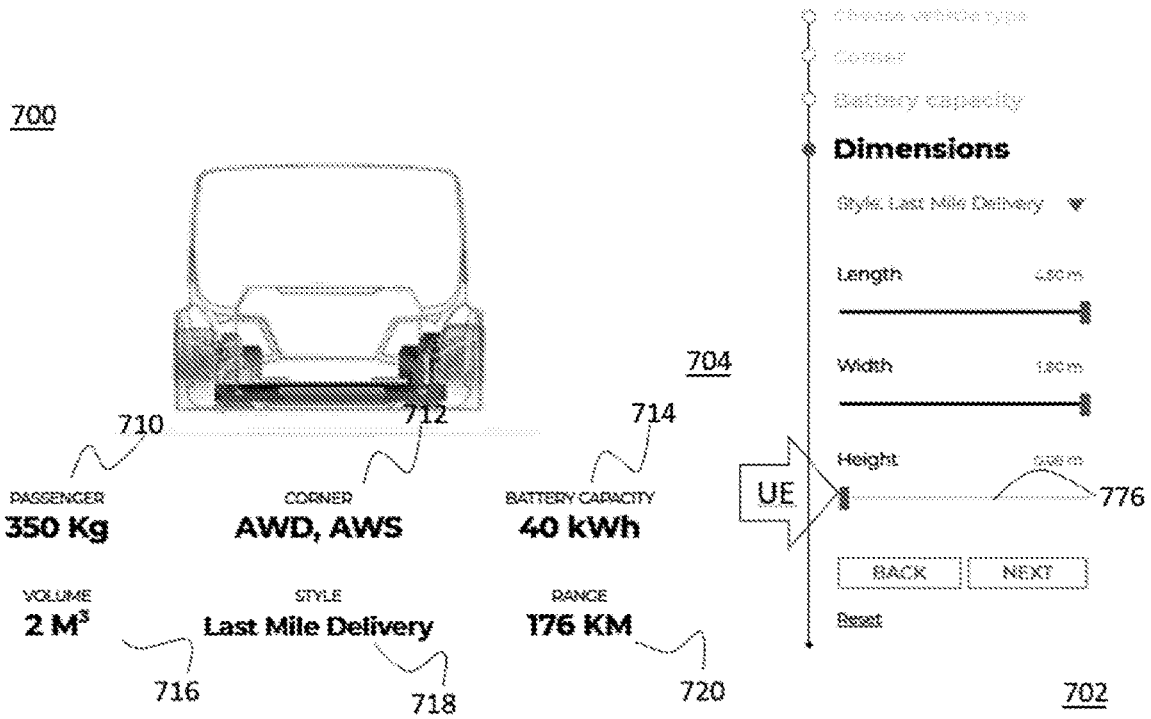

Turning to FIG. 11U, it is seen that user engagement of 'Height' UIC 776 has moved the slider thereof to the rightmost position, indicating the smallest width of the vehicle, namely 0.98 m Consequently, the volume field 716 has been updated to reflect a smaller volume than that shown in FIG. 11T, in which the width of the vehicle was greater and the height of the vehicle was greater. Conversely, the range field 720 has been updated to reflect a longer range than that shown in FIG. 11T. The image region of presentation portion 704 has changed to reflect the height of the bus.

Figure 11V:
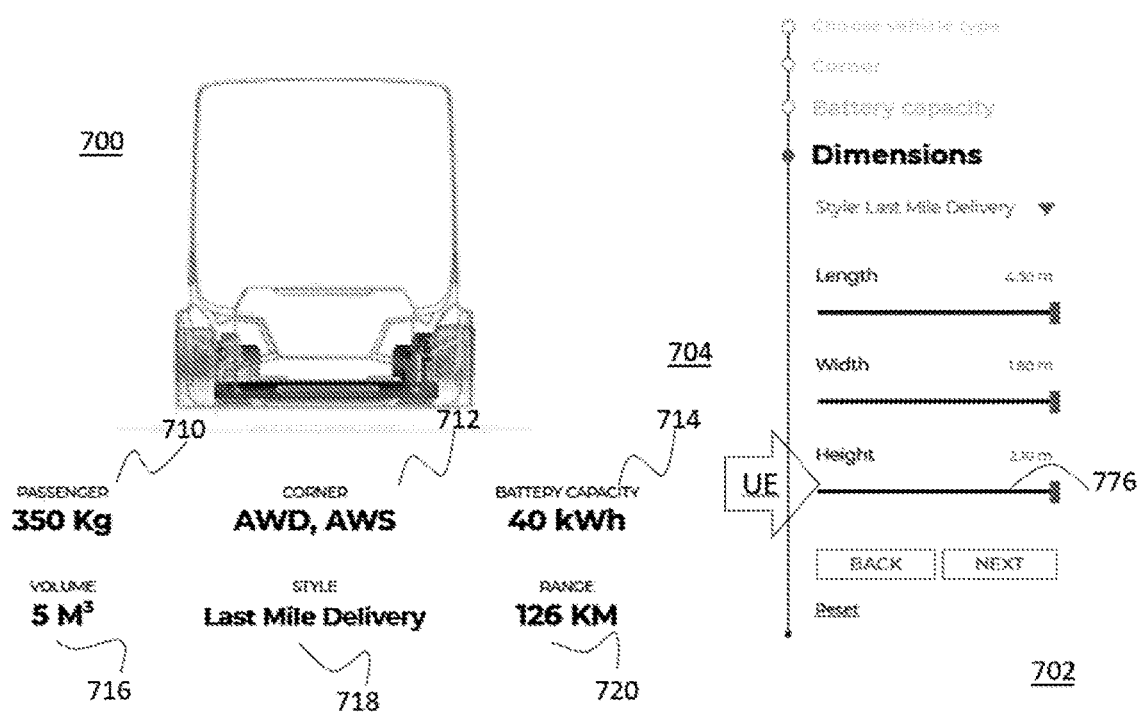

In FIG. 11V, it is seen that user engagement of 'Height' UIC 776 has moved the slider thereof to the leftmost position, indicating the greatest width of the vehicle, namely 2.10 m. Consequently, the volume field 716 has been updated to reflect a larger volume than that shown in FIG. 11U, in which the height of the vehicle was smaller. Conversely, the range field 720 has been updated to reflect a shorter range than that shown in FIG. 11U. The image region of presentation portion 704 has changed, relative that shown in FIG. 11U to reflect the greater height of the vehicle.

Figure 11W:
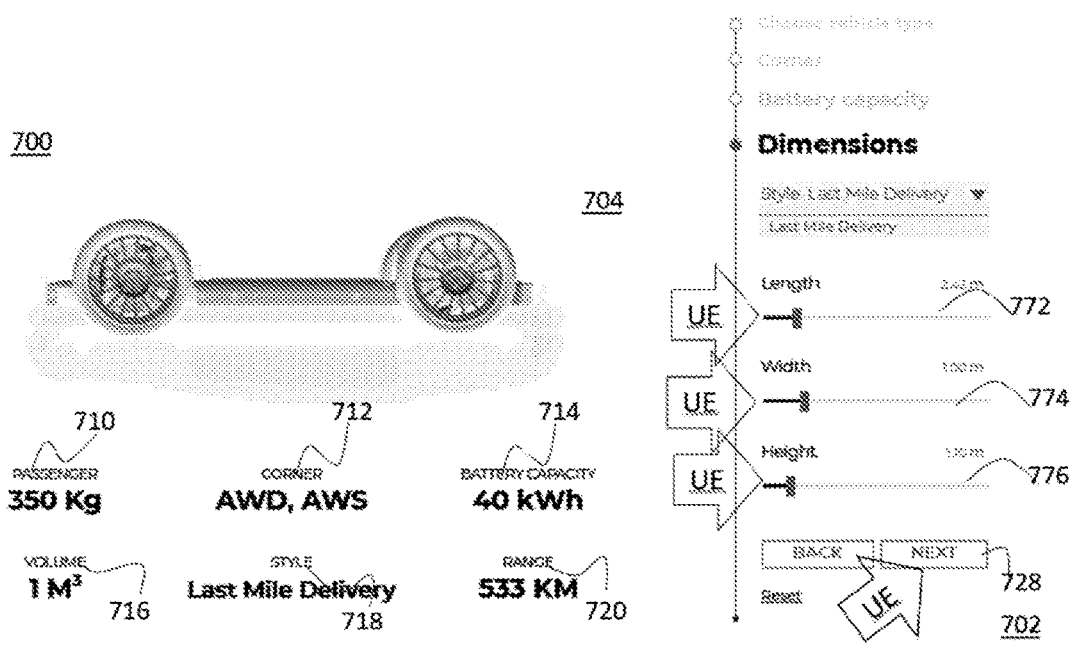

Turning to FIG. 11W, it is seen that user engagement of 'Length' UIC 772 has moved the slider thereof to an interim position, indicating a vehicle length of 2.43 m, user engagement of 'Width' UIC 774 has moved the slider thereof to an interim position, indicating a vehicle width of 1.00 m, and user engagement of 'Height' UIC 776 has moved the slider thereof to an interim position, indicating a vehicle height of 1.10 m. Consequently, the volume field 716 has been updated to reflect a smaller volume than that shown in FIG. 11V and the range field 720 has been updated to reflect a longer range than that shown in FIG. 11V. The image region of presentation portion 704 has changed to reflect the current selected height of the vehicle. The user then engages the 'NEXT' UIC button 728, to confirm the selection made in the dimensions segment, and to finalize the configuration of the vehicle.

Turning to FIG. 11X, it is seen that following the user engagement of 'NEXT' UIC button 728, the specification of the vehicle defined by user interaction with GUI 700 is displayed to the user. As seen, the specification has three sections—a first section relating to configuration of the corner and battery, a second region relating to configuration of the vehicle type and architecture, and a third section relating to the vehicle dimensions. All of the user's selections, made by interaction with GUI 700, are reflected in the specification, as well as additional characteristics of the vehicle which were not selected by the user and which are required for a vehicle, including the characteristics selected by the user, to be electrically and mechanically compliant.

FIG. 11Y shows multiple virtual models of vehicles that meet the specification of FIG. 11X, which may be displayed to the user as described hereinabove with respect to FIG. 8Y.

EXAMPLE APPLICATIONS

Some non-limiting examples of concepts of the present invention are recited below.

Example 1. A method of controlling manufacture of a mechanically and electrically compliant Vehicle-Corner-Module (VCM) based vehicle, the method comprising: (a) providing to a display device, associated with a user-operated device, one or more user interface components for manual and explicit selection of one or more initial vehicle characteristics of the vehicle for display thereon; (b) receiving manual and explicit selection of one or more selected initial vehicle characteristics; (c) for the one or more selected initial vehicle characteristics, computing VCM-related mechanical and electrical constraints on a plurality of VCM characteristics, which mechanical and electrical constraints are required for the VCM-based vehicle having the one or more selected initial vehicle characteristics to be compliant; (d) computing a first subset of the plurality of VCM characteristics which are compatible with the VCM-related mechanical and electrical constraints, the first subset being a proper subset of the VCM characteristics; (e) for each VCM characteristic in the first subset, providing to the display device one or more respective user interface components for manual and explicit selection of the VCM characteristic for display thereon, wherein, for each said VCM characteristic, the one or more respective user interface components are provided for display in a specific order; and (f) responsive to manual and explicit selection of one or more VCM characteristics in the first subset defining one or more selected VCMs, generating a specification of a mechanically and electrically compliant VCM-based vehicle including the selected initial vehicle characteristics and the one or more selected VCMs.

Example 2. The method of example 1, further comprising: (g) at least for the one or more selected initial vehicle characteristics, computing additional mechanical and electrical constraints on a plurality of additional vehicle characteristics of the vehicle, which mechanical and electrical constraints are required for the VCM-based vehicle to be compliant; (h) computing a second subset of the plurality of additional vehicle characteristics which are compatible with the additional VCM-based mechanical and electrical constraints, the second subset being a proper subset of the additional vehicle characteristics; and (i) for each additional vehicle characteristic in the second subset, providing to the display device one or more respective user interface components for manual and explicit selection of the additional vehicle characteristic for display thereon, wherein, for each said additional vehicle characteristic, the one or more respective user interface components are provided for display in a second specific order; wherein the generating of the specification of the mechanically and electrically compliant VCM-based vehicle is also responsive to manual and explicit selection of one or more additional vehicle characteristics in the second subset.

Example 3. The method of example 2, wherein steps g-i are carried out simultaneously with steps c-e and prior to step f, and the VCM-based mechanical and electrical constraints include the additional mechanical and electrical constraints.

Example 4. The method of example 3, wherein the specific order of display of the interface components for each VCM characteristic and the second specific order for display of the interface components for each additional vehicle characteristic are determined using a machine-learning engine based on a plurality of previous selections of initial vehicle characteristics and corresponding selections of VCM characteristics and additional vehicle characteristics.

Example 5. The method of example 4, wherein: (i) in the specific order, VCM characteristics identified, in previous selections, to be frequently selected together with a specific initial vehicle characteristic, are higher in the specific order when the selected initial vehicle characteristic is the specific initial vehicle characteristic than VCM characteristics identified to be less frequently selected together with the specific initial vehicle characteristic; or (ii) in the second specific order, additional vehicle characteristics identified, in previous selections, to be frequently selected together with a specific initial vehicle characteristic, are higher in the second specific order when the selected initial vehicle characteristic is the specific initial vehicle characteristic than additional vehicle characteristics identified to be less frequently selected together with the specific initial vehicle characteristic.

Example 6. The method of example 4 or example 5, wherein the providing of the one or more user interface components for manual and explicit selection of one or more VCM characteristics and the providing of the one or more user interface components for manual and explicit selection of one or more additional vehicle characteristics comprises providing for display only ones of the VCM characteristics or additional vehicle characteristics identified to be frequently selected together with the selected initial vehicle characteristic, and providing at least one user interface component allowing a user to request presentation of additional, less frequently selected, VCM characteristics or additional vehicle characteristics.

Example 7. The method of example 2, wherein steps g-i are carried out subsequent to step e and prior to step f, and the computing of the additional mechanical and electrical constraints are required for the VCM-based vehicle having the one or more selected initial vehicle characteristics and the one or more selected VCMs to be compliant.

Example 8. The method of example 7, wherein the specific order of display of the interface components for each characteristic is determined using a machine-learning engine based on a plurality of previous selections of initial vehicle characteristics and corresponding selections of VCM characteristics.

Example 9. The method of example 8, wherein, in the specific order, VCM characteristics identified, in previous selections, to be frequently selected together with a specific initial vehicle characteristic, are higher in the specific order when the selected initial vehicle characteristic is the specific initial vehicle characteristic, than VCM characteristics identified to be less frequently selected together with the specific initial vehicle characteristic.

Example 10. The method of example 8 or 9, wherein the providing of the one or more user interface components for manual and explicit selection of one or more VCM characteristics comprises providing for display only ones of the VCM characteristics identified to be frequently selected together with the selected initial vehicle characteristic, and providing at least one user interface component allowing a user to request presentation of additional, less frequently selected, VCM characteristics.

Example 11. The method of any one of examples 8 to 10, wherein the second specific order of display of the interface components for each additional vehicle based characteristic is determined using the machine-learning engine based on a plurality of previous selections of initial vehicle characteristics and VCM characteristics and corresponding selections of additional vehicle characteristics.

Example 12. The method of example 9, wherein, in the second specific order, additional vehicle characteristics identified, in previous selections, to be frequently selected together with a specific initial vehicle characteristic or with a specific VCM characteristic, are higher in the second specific order when the selected initial vehicle characteristic is the specific initial vehicle characteristic or when the selected VCM characteristic is the specific VCM characteristic, than additional vehicle characteristics identified to be less frequently selected together with the specific initial vehicle characteristic or the specific VCM characteristic.

Example 13. The method of example 11 or 12, wherein the providing of the one or more user interface components for manual and explicit selection of one or more additional vehicle characteristics comprises providing for display only ones of the additional vehicle characteristics identified to be frequently selected together with the selected initial vehicle characteristic or the selected VCM characteristics, and providing at least one other user interface component allowing a user to request presentation of additional, less frequently selected, additional vehicle characteristics.

Example 14. The method of any one of examples 1 to 13, further comprising, following the generating, presenting a virtual model of at least one mechanically and electrically compliant VCM-based vehicle fulfilling the generated specification.

Example 15. The method of any one of examples 1 to 14, further comprising, following the generating, based on the specification, generating an engineering design specification for the VCM-based vehicle.

Example 16. The method of example 15, further comprising, electronically transmitting the engineering design specification to a manufacturing facility for manufacture of a mechanically and electrically compliant VCM-based vehicle fulfilling the specification.

Example 17. The method of any one of examples 1 to 16, wherein the specification is an engineering specification.

Example 18. The method of any one of examples 1 to 16, wherein the specification is a design specification.

Example 19. The method of any one of examples 1 to 16, wherein the specification is a manufacturing specification.

Example 20. The method of any one of examples 1 to 19, wherein the providing, for each VCM characteristic in the first subset, one or more respective user interface components comprising providing the user interface components corresponding to the VCM characteristics also in a characteristic-specific order of the VCM characteristics in the first subset.

Example 21. The method of any one of examples 2 to 20, wherein the providing, for each additional vehicle characteristic in the second subset, one or more respective user interface components comprising providing the user interface components corresponding to the additional vehicle characteristics also in a characteristic-specific order of the additional vehicle characteristics in the second subset.

Example 22. The method of any one of examples 2 to 21, wherein the providing of the one or more user interface components for manual and explicit selection of one or more additional vehicle characteristics comprises providing a slider for selection of at least one dimension of the vehicle, the slider providing a continuous range of values for the at least one dimension.

Example 23. The method of any one of examples 1 to 22, wherein the one or more selected VCMs include at least two VCMs, a first of the at least two VCMs being of a first type, and a second of the at least two VCMs being of a second type, the second type being different from the first type.

Example 24. The method of example 23, wherein at least one of the first and second types is a VCM having a steering function.

Example 25. The method of example 23 or example 24, wherein at least one of the first and second types is a VCM devoid of a steering function.

Example 26. The method of any one of examples 23 to 25, wherein at least one of the first and second types is a VCM having a drive function.

Example 27. The method of any one of examples 23 to 26, wherein at least one of the first and second types is a VCM devoid of a drive function.

Example 28. The method of any one of examples 1 to 27, wherein the VCM characteristic comprises a steering function.

Example 29. The method of example 28, wherein the steering function comprises all-wheel steering.

Example 30. The method of example 28, wherein the steering function comprises front-wheel steering.

Example 31. The method of example 28, wherein the steering function comprises rear-wheel steering.

Example 32. The method of any one of examples 1 to 31, wherein the VCM characteristic comprises a drive function.

Example 33. The method of example 32, wherein the drive function comprises all-wheel drive.

Example 34. The method of example 32, wherein the drive function comprises front-wheel drive.

Example 35. The method of example 32, wherein the drive function comprises rear-wheel drive.

Example 36. A system for defining a specification of a mechanically and electrically compliant Vehicle-Corner-Module (VCM)-based vehicle, the system comprising: (a) a server network interface for connection to at least one network, said at least one network including at least one other, user-operated device or system having a user interface including at least one input interface and at least one display; (b) at least one server processor, and (c) at least one server storage medium for instructions execution by the at least one server processor, the server storage medium having stored: (i) instructions forming a display-engine, including: (A) instructions to provide to the at least one other device or system, for display on the at least one display, one or more user interface components for manual and explicit selection of one or more initial vehicle characteristics of the vehicle; (B) instructions to receive the manual and explicit selection of the one or more initial vehicle characteristics; (C) instructions to provide to the at least one other device or system, for display on the at least one display, one or more user interface components for manual and explicit selection of one or more VCM characteristics, which VCM characteristics are compatible with the one or more selected initial vehicle characteristics; and (D) instructions to receive the manual and explicit selection of the one or more VCM characteristics defining selected VCMs; (ii) instructions, forming a constraint-engine, to compute, for the one or more selected initial vehicle characteristics, VCM-related mechanical and electrical constraints on a plurality of VCM characteristics, which VCM-related mechanical and electrical constraints are required for the vehicle including the one or more selected initial vehicle characteristics to be compliant; (iii) instructions forming a compatibility-engine, comprising: (A) instructions to compute a first subset of the plurality of VCM characteristics that are compatible with the VCM-related mechanical and electrical constraints, the first subset being a proper subset of the plurality of VCM characteristics; and (B) instructions to provide the VCM characteristics in the first subset, to the display engine, in a specific order; and (iv) instructions forming an ordering-engine, comprising: (A) instructions to receive from the display-engine manual and explicit selection of the one or more VCM characteristics compatible with the VCM-related mechanical and electrical constraints; and (B) instructions to generate a specification of a mechanically and electrically compliant CVM-based vehicle based on the one or more selected VCMs and the one or more selected initial vehicle characteristics.

Example 37. The system of example 36, wherein: (i) the instructions forming the constraint engine further include instruction to compute, for the one or more selected initial vehicle characteristics, additional mechanical and electrical constraints on a plurality of additional vehicle characteristics, which additional mechanical and electrical constraints are required for the vehicle including the one or more selected initial vehicle characteristics to be compliant; (ii) the instructions forming the compatibility engine further include: (A) instructions to compute a second subset of the plurality of additional vehicle characteristics that are compatible with the additional mechanical and electrical constraints, the second subset being a proper subset of the plurality of additional vehicle characteristics; and (B) instructions to provide the additional vehicle characteristics in the second subset, to the display engine, in a second specific order; (iii) the instructions forming the display-engine further include: (A) instructions to provide to the at least one other device or system, for display on the at least one display, one or more user interface components for manual and explicit selection of one or more additional vehicle characteristics, which additional vehicle characteristics are compatible with the one or more selected initial vehicle characteristics; and (B) instructions to receive the manual and explicit selection of the one or more additional vehicle characteristics; and (C) the instructions to generate the specification include instructions to generate the specification of the mechanically and electrically compliant CVM-based vehicle based on the one or more selected VCMs, the one or more selected initial vehicle characteristics, and the one or more selected additional vehicle characteristics from the second subset.

Example 38. The system of example 36 or example 37, wherein said compatibility engine is a machine learning engine, and the specific order is determined based on a plurality of previous selections of initial vehicle characteristics and corresponding selections of VCM characteristics.

Example 39. The system of example 38, wherein VCM characteristics identified to be frequently selected together with a specific initial vehicle characteristics, are higher in the specific order when the selected initial vehicle characteristic is the specific initial vehicle characteristic than VCM characteristics identified to be less frequently selected together with the specific initial vehicle characteristic.

Example 40. The system of example 39, wherein the instructions to provide the one or more user interface components for manual and explicit selection of one or more VCM characteristics include instructions to provide only ones of the VCM characteristics identified to be frequently selected together with the selected initial vehicle characteristics, and to additionally provide a user interface component allowing the user to request presentation of additional, less frequently selected, VCM characteristics.

Example 41. The system of any one of examples 36 to 41, wherein the instructions to compute the additional mechanical and electrical constraints comprise instructions to compute additional mechanical and electrical constraints that are required for the vehicle including the one or more selected initial vehicle characteristics and the one or more selected VCMs to be compliant.

Example 42. The system of example 41, wherein the second specific order is determined based on a plurality of previous selections of initial vehicle characteristics or VCM characteristics and corresponding selections of additional vehicle characteristics.

Example 43. The system of example 42, wherein additional vehicle characteristics identified to be frequently selected together with a specific initial vehicle characteristics or with a specific VCM, are higher in the second specific order when the selected initial vehicle characteristic is the specific initial vehicle characteristic or when the selected VCM is the specific VCM, than additional vehicle characteristics identified to be less frequently selected together with the specific initial vehicle characteristic or the specific VCM.

Example 44. The system of example 43, wherein the instructions to provide the one or more user interface components for manual and explicit selection of one or more additional vehicle characteristics include instructions to provide only ones of the additional vehicle characteristics identified to be frequently selected together with the selected initial vehicle characteristics or the selected one or more VCMs, and to additionally provide another user interface component allowing the user to request presentation of additional, less frequently selected, additional vehicle characteristics.

Example 45. The system of any one of examples 36 to 44, wherein the instructions forming the display-engine further includes instructions to provide to the at least one other device or system, for display thereon, a virtual model of at least one electrically compliant VCM-based vehicle fulfilling the generated specification.

Example 46. The system of any one of examples 36 to 44, wherein the instructions forming the ordering-engine further include instructions to generate an engineering design specification for the VCM-based vehicle, based on the specification.

Example 47. The system of example 46, wherein the instructions forming the ordering-engine further include instructions to electronically transmit the engineering design specification to a manufacturing facility for manufacture of a mechanically and electrically compliant VCM-based vehicle fulfilling the specification.

Example 48. The system of any one of examples 36 to 47, wherein the specification is an engineering specification.

Example 49. The system of any one of examples 36 to 47, wherein the specification is a design specification.

Example 50. The system of any one of examples 36 to 47, wherein the specification is a manufacturing specification.

Example 51. The system of any one of examples 37 to 50, wherein at least one of the user interface components for manual and explicit selection of additional vehicle characteristics comprises a slider for selection of at least one dimension of the vehicle, the slider providing a continuous range of values for the at least one dimension.

Example 52. The system of any one of examples 36 to 51, wherein the at least one server processor comprises a separate server processor for executing the instructions of each of the display-engine, the constraint-engine, the compatibility-engine, and the ordering-engine.

Example 53. The system of any one of examples 36 to 52, wherein the at least one server storage medium comprises a separate server storage medium for storing the instructions of each of the display-engine, the constraint-engine, the compatibility-engine, and the ordering-engine.

Example 54. The system of any one of examples 36 to 53, wherein the one or more selected VCMs include at least two VCMs, a first of the at least two VCMs being of a first type, and a second of the at least two VCMs being of a second type, the second type being different from the first type.

Example 55. The system of example 54, wherein at least one of the first and second types is a VCM having a steering function.

Example 56. The system of example 54 or example 55, wherein at least one of the first and second types is a VCM devoid of a steering function.

Example 57. The system of any one of examples 54 to 56, wherein at least one of the first and second types is a VCM having a drive function.

Example 58. The system of any one of examples 54 to 57, wherein at least one of the first and second types is a VCM devoid of a drive function.

Example 59. The system of any one of examples 36 to 58, wherein the VCM characteristic comprises a steering function.

Example 60. The system of example 59, wherein the steering function comprises all-wheel steering.

Example 61. The system of example 59, wherein the steering function comprises front-wheel steering.

Example 62. The system of example 59, wherein the steering function comprises rear-wheel steering.

Example 63. The system of any one of examples 36 to 62, wherein the VCM characteristic comprises a drive function.

Example 64. The system of example 63, wherein the drive function comprises all-wheel drive.

Example 65. The system of example 63, wherein the drive function comprises front-wheel drive.

Example 66. The system of example 63, wherein the drive function comprises rear-wheel drive.

Example 67. A network designed for defining a specification of a mechanically and electrically compliant Vehicle-Corner-Module (VCM)-based vehicle by a user using a computing device at a first network node on said network, said computing device associated with at least one input interface and with at least one display, data sent via said network including, in order: (a) one or more of one or more user interface components, rules, or datasets for manual and explicit selection of one or more initial vehicle characteristics for display on the at least one display; (b) manual and explicit selection, by the user, of one or more initial vehicle characteristics; (c) one or more of one or more user interface components, rules, or datasets for manual and explicit selection of one or more VCM characteristics which are compatible with mechanical and electrical constraints required for a vehicle including the one or more selected initial vehicle characteristics to be compliant; (d) manual and explicit selection of one or more said compatible VCM characteristics to define one or more selected VCMs; and (e) a specification of a mechanically and electrically compliant VCM-based vehicle including the one or more selected initial vehicle characteristics and the selected one or more VCMs.

Example 68. The network of example 67, the data sent via the network further including: (f) one or more of one or more user interface components, rules, or datasets for manual and explicit selection of one or more additional vehicle characteristics which are compatible with mechanical and electrical constraints required for a vehicle including the one or more selected initial vehicle characteristics to be compliant; and (g) manual and explicit selection of one or more said compatible additional vehicle characteristics, wherein the specification of the mechanically and electrically compliant VCM-based vehicle is also responsive to manual and explicit selection of the one or more additional vehicle characteristics.

Example 69. The network of example 68, wherein the data in (f) is transmitted together with the data in (c), and the data in (g) is transmitted together with the data in (d).

Example 70. The network of example 68, wherein: (i) the data in (f) and (g) is transmitted subsequently to the data in (c) and (d) and prior to the data in (e); and (ii) the additional vehicle characteristics are compatible with mechanical and electrical constraints required for a vehicle including the one or more selected initial vehicle characteristics and the one or more selected VCMs to be compliant.

Example 71. The network of any one of examples 67 to 69, wherein the data sent via said network further includes a virtual model of at least one mechanically and electrically compliant VCM-based vehicle fulfilling the specification.

Example 72. The network of any one of examples 67 to 69, wherein the data sent via said network further includes an engineering design specification for the VCM-based vehicle, generated based on the specification.

Example 73. The network of example 67, further comprising a second computing device at a second network node on said network, the second computing device being associated with a manufacturing facility for manufacture of a mechanically and electrically compliant VCM-based vehicles, wherein the specification is transmitted, via the network, to the second computing device.

Example 74. The network of any one of examples 67 to 73, wherein the one or more respective user interface components corresponding to each VCM characteristic are in a characteristic-specific order of the VCM characteristics.

Example 75. The network of any one of examples 68 to 74, wherein the one or more user interface components for manual and explicit selection of one or more additional vehicle characteristics includes a slider for selection of at least one dimension of the vehicle, the slider providing a continuous range of values for the at least one dimension.

Example 76. The network of any one of examples 67 to 75, wherein the one or more selected VCMs include at least two VCMs, a first of the at least two VCMs being of a first type, and a second of the at least two VCMs being of a second type, the second type being different from the first type.

Example 77. The network of example 76, wherein at least one of the first and second types is a VCM having a steering function.

Example 78. The network of example 76 or example 77, wherein at least one of the first and second types is a VCM devoid of a steering function.

Example 79. The network of any one of examples 76 to 78, wherein at least one of the first and second types is a VCM having a drive function.

Example 80. The network of any one of examples 76 to 79, wherein at least one of the first and second types is a VCM devoid of a drive function.

Example 81. The network of any one of examples 67 to 80, wherein the VCM characteristic comprises a steering function.

Example 82. The network of example 81, wherein the steering function comprises all-wheel steering.

Example 83. The network of example 81, wherein the steering function comprises front-wheel steering.

Example 84. The network of example 81, wherein the steering function comprises rear-wheel steering.

Example 85. The network of any one of examples 67 to 84, wherein the VCM characteristic comprises a drive function.

Example 86. The network of example 85, wherein the drive function comprises all-wheel drive.

Example 87. The network of example 85, wherein the drive function comprises front-wheel drive.

Example 88. The network of example 85, wherein the drive function comprises rear-wheel drive.

Example 89. A method of controlling manufacture of a mechanically and electrically compliant Vehicle-Corner-Module (VCM) based vehicle, the method comprising: (a) providing to a display device, one or more user interface components for manual and explicit selection of one or more VCM characteristics of one or more VCMs for display thereon; (b) receiving manual and explicit selection of one or more VCM characteristics of one or more VCMs, to define one or more selected VCMs; (c) for the one or more selected VCMs, computing VCM-based mechanical and electrical constraints on a plurality of vehicle characteristics of the vehicle, which VCM-based mechanical and electrical constraints are required for the vehicle including the one or more selected VCMs to be compliant; (d) computing a subset of the plurality of vehicle characteristics which are compatible with the VCM-based mechanical and electrical constraints, the subset being a proper subset of the plurality of vehicle characteristics; (e) for each vehicle characteristic in the subset, providing to the display device one or more respective user interface components for manual and explicit selection of the vehicle characteristic for display thereon, wherein, for each said vehicle characteristic, the one or more respective user interface components are provided for display in a specific order; and (f) responsive to manual and explicit selection of one or more vehicle characteristics in the subset, generating a specification of a mechanically and electrically compliant VCM-based vehicle including the one or more selected VCMs and the selected one or more vehicle characteristics.

Example 90. The method of example 89, further comprising, following the generating, presenting a virtual model of at least one mechanically and electrically compliant VCM-based vehicle fulfilling the generated specification.

Example 91. The method of examples 89 or 90, further comprising, following the generating, based on the specification, generating an engineering design specification for the VCM-based vehicle.

Example 92. The method of any one of example 91, further comprising, electronically transmitting the engineering design specification to a manufacturing facility for manufacture of a mechanically and electrically compliant VCM-based vehicle fulfilling the specification.

Example 93. The method of any one of examples 89 to 92, wherein the specification is an engineering specification.

Example 94. The method of any one of examples 89 to 92, wherein the specification is a design specification.

Example 95. The method of any one of examples 89 to 92, wherein the specification is a manufacturing specification.

Example 96. The method of any one of examples 89 to 95, wherein the providing, for each vehicle characteristic in the subset, one or more respective user interface components comprising providing the user interface components corresponding to the vehicle characteristics also in a characteristic-specific order of the vehicle characteristics in the subset.

Example 97. The method of any one of examples 89 to 96, wherein the specific order of display of the interface components for each vehicle characteristic is determined using a machine-learning engine based on a plurality of previous selections of VCMs and corresponding selections of vehicle characteristics.

Example 98. The method of example 97, wherein, in the specific order, vehicle characteristics identified, in previous selections, to be frequently selected together with a specific VCM, are higher in the specific order when the selected VCM module is the specific VCM than vehicle characteristics identified to be less frequently selected together with the specific VCM.

Example 99. The method of any one of examples 97 to 98, wherein the providing of the one or more user interface components for manual and explicit selection of one or more vehicle characteristics comprises providing for display only ones of the vehicle characteristics identified to be frequently selected together with the selected VCM, and providing a user interface component allowing a user to request presentation of additional, less frequently selected, vehicle characteristics.

Example 100. The method of any one of examples 89 to 99, wherein the providing of the one or more user interface components for manual and explicit selection of one or more vehicle characteristics comprises providing a slider for selection of at least one dimension of the vehicle, the slider providing a continuous range of values for the at least one dimension.

Example 101. The method of example 89, wherein the one or more selected VCMs include at least two VCMs, a first of the at least two VCMs being of a first type, and a second of the at least two VCMs being of a second type, the second type being different from the first type.

Example 102. The method of example 101, wherein at least one of the first and second types is a VCM having a steering function.

Example 103. The method of example 101 or example 102, wherein at least one of the first and second types is a VCM devoid of a steering function.

Example 104. The method of any one of examples 101 to 103, wherein at least one of the first and second types is a VCM having a drive function.

Example 105. The method of any one of examples 101 to 104, wherein at least one of the first and second types is a VCM devoid of a drive function.

Example 106. The method of any one of examples 89 to 105, wherein the VCM characteristic comprises a steering function.

Example 107. The method of example 106, wherein the steering function comprises all-wheel steering.

Example 108. The method of example 106, wherein the steering function comprises front-wheel steering.

Example 109. The method of example 106, wherein the steering function comprises rear-wheel steering.

Example 110. The method of any one of examples 89 to 109, wherein the VCM characteristic comprises a drive function.

Example 111. The method of example 110, wherein the drive function comprises all-wheel drive.

Example 112. The method of example 110, wherein the drive function comprises front-wheel drive.

Example 113. The method of example 110, wherein the drive function comprises rear-wheel drive.

Example 114. A system for defining a specification of a mechanically and electrically compliant Vehicle-Corner-Module (VCM)-based vehicle, the system comprising: (a) a server network interface for connection to at least one network, said at least one network including at least one other device or system having a user interface including at least one input interface and at least one display; (b) at least one server processor; and (c) at least one storage medium for instructions execution by the at least one server processor, the storage medium having stored: (i) instructions forming a display-engine, including: (A) instructions to provide to the at least one other device or system, for display on the at least one display, one or more user interface components for manual and explicit selection of one or more VCM characteristics; (B) instructions to receive the manual and explicit selection of the one or more VCM characteristics, thereby to define one or more selected VCMs; (C) instructions to provide to the at least one other device or system, for display on the at least one display, one or more user interface components for manual and explicit selection of one or more vehicle characteristics of the vehicle, which vehicle characteristics are compatible with the one or more selected VCMs; and (D) instructions to receive the manual and explicit selection of the one or more vehicle characteristics; (ii) instructions, forming a constraint-engine, to compute, for the one or more selected VCMs, VCM-based mechanical and electrical constraints on a plurality of vehicle characteristics of the vehicle, which VCM-based mechanical and electrical constraints are required for the vehicle including the one or more selected VCMs to be compliant; (iii) instructions forming a compatibility-engine, comprising: (A) instructions to compute a subset of the plurality of vehicle characteristics that are compatible with the VCM-based mechanical and electrical constraints, the subset being a proper subset of the plurality of vehicle characteristics; and (B) instructions to provide the vehicle characteristics in the subset, to the display engine, in a specific order; and (iv) instructions forming an ordering-engine, comprising: (A) instructions to receive from the display-engine manual and explicit selection of the one or more vehicle characteristics compatible with the VCM-based mechanical and electrical constraints; and (B) instructions to generate a specification of a mechanically and electrically compliant CVM-based vehicle based on the one or more selected VCMs and the selected one or more vehicle characteristics.

Example 115. The system of example 114, wherein the instructions forming the display-engine further includes instructions to provide to the at least one other device or system, for display thereon, a virtual model of at least one electrically compliant VCM-based vehicle fulfilling the generated specification.

Example 116. The system of example 114 or example 115, wherein the instructions forming the ordering-engine further include instructions to generate an engineering design specification for the VCM-based vehicle, based on the specification.

Example 117. The system of example 116, wherein the instructions forming the ordering-engine further include instructions to electronically transmit the engineering design specification to a manufacturing facility for manufacture of a mechanically and electrically compliant VCM-based vehicle fulfilling the specification.

Example 118. The system of any one of examples 114 to 117, wherein the specification is an engineering specification.

Example 119. The system of any one of examples 114 to 117, wherein the specification is a design specification.

Example 120. The system of any one of examples 114 to 117, wherein the specification is a manufacturing specification.

Example 121. The system of any one of example 114 to 120, wherein said compatibility engine is a machine learning engine, and the specific order is determined based on a plurality of previous selections of VCMs and corresponding selections of vehicle characteristics.

Example 122. The system of example 121, wherein characteristics identified to be frequently selected together with a specific VCM, are higher in the specific order when the selected VCM is the specific VCM than characteristics identified to be less frequently selected together with the specific VCM.

Example 123. The system of example 121 or example 122, wherein the instructions to provide the one or more user interface components for manual and explicit selection of one or more vehicle characteristics include instructions to provide only ones of the vehicle characteristics identified to be frequently selected together with the selected VCM, and to additionally provide a user interface component allowing the user to request presentation of additional, less frequently selected, vehicle characteristics.

Example 124. The system of any one of examples 114 to 123, wherein at least one of the user interface components for manual and explicit selection of vehicle characteristics comprises a slider for selection of at least one dimension of the vehicle, the slider providing a continuous range of values for the at least one dimension.

Example 125. The system of any one of examples 114 to 124, wherein the at least one processor comprises a separate processor for executing the instructions of each of the display-engine, the constraint-engine, the compatibility-engine, and the ordering-engine.

Example 126. The system of any one of examples 114 to 125, wherein the at least one server storage medium comprises a separate server storage medium for storing the instructions of each of the display-engine, the constraint-engine, the compatibility-engine, and the ordering-engine.

Example 127. The system of any one of examples 114 to 126, wherein the one or more selected VCMs include at least two VCMs, a first of the at least two VCMs being of a first type, and a second of the at least two VCMs being of a second type, the second type being different from the first type.

Example 128. The system of example 127, wherein at least one of the first and second types is a VCM having a steering function.

Example 129. The system of example 127 or example 128, wherein at least one of the first and second types is a VCM devoid of a steering function.

Example 130. The system of any one of examples 127 to 129, wherein at least one of the first and second types is a VCM having a drive function.

Example 131. The system of any one of examples 127 to 130, wherein at least one of the first and second types is a VCM devoid of a drive function.

Example 132. The system of any one of examples 114 to 131, wherein the VCM characteristic comprises a steering function.

Example 133. The system of example 132, wherein the steering function comprises all-wheel steering.

Example 134. The system of example 132, wherein the steering function comprises front-wheel steering.

Example 135. The system of example 132, wherein the steering function comprises rear-wheel steering.

Example 136. The system of any one of examples 114 to 135, wherein the VCM characteristic comprises a drive function.

Example 137. The system of example 136, wherein the drive function comprises all-wheel drive.

Example 138. The system of example 136, wherein the drive function comprises front-wheel drive.

Example 139. The system of example 136, wherein the drive function comprises rear-wheel drive.

Example 140. A network designed for defining a specification of a mechanically and electrically compliant Vehicle-Corner-Module (VCM)-based vehicle by a user using a computing device at a first network node on said network, said computing device associated with at least one input interface and with at least one display, data sent via said network including, in order: (a) one or more of one or more user interface components, rules, or datasets for manual and explicit selection of one or more VCM characteristics of one or more VCMs for display on the at least one display; (b) manual and explicit selection, by the user, of one or more VCM characteristics of one or more VCMs, to define one or more selected VCMs; (c) one or more of one or more user interface components, rules, or datasets for manual and explicit selection of one or more vehicle characteristics which are compatible with mechanical and electrical constraints required for a vehicle including the one or more selected VCMs to be compliant; (d) manual and explicit selection of one or more vehicle characteristics; and (e) a specification of a mechanically and electrically compliant VCM-based vehicle including the one or more selected VCMs and the selected one or more vehicle characteristics.

Example 141. The network of example 140, wherein the data sent via said network further includes a virtual model of at least one mechanically and electrically compliant VCM-based vehicle fulfilling the specification.

Example 142. The network of example 140 or example 141, wherein the data sent via said network further includes an engineering design specification for the VCM-based vehicle, generated based on the specification.

Example 143. The network of example 142, further comprising a second computing device at a second network node on said network, the second computing device being associated with a manufacturing facility for manufacture of a mechanically and electrically compliant VCM-based vehicles, wherein the engineering design specification is transmitted, via the network, to the second computing device.

Example 144. The network of any one of examples 140 to 143, wherein the one or more respective user interface components corresponding to each said vehicle characteristic are in a specific order or in a characteristic-specific order of the vehicle characteristics.

Example 145. The network of any one of examples 140 to 144, wherein the one or more user interface components for manual and explicit selection of one or more vehicle characteristics includes a slider for selection of at least one dimension of the vehicle, the slider providing a continuous range of values for the at least one dimension.

Example 146. The network of any one of examples 140 to 145, wherein the one or more selected VCMs include at least two VCMs, a first of the at least two VCMs being of a first type, and a second of the at least two VCMs being of a second type, the second type being different from the first type.

Example 147. The network of example 146, wherein at least one of the first and second types is a VCM having a steering function.

Example 148. The network of example 146 or example 147, wherein at least one of the first and second types is a VCM devoid of a steering function.

Example 149. The network of any one of examples 146 to 148, wherein at least one of the first and second types is a VCM having a drive function.

Example 150. The network of any one of examples 146 to 149, wherein at least one of the first and second types is a VCM devoid of a drive function.

Example 151. The network of any one of examples 140 to 150, wherein the VCM characteristic comprises a steering function.

Example 152. The network of example 151, wherein the steering function comprises all-wheel steering.

Example 153. The network of example 151, wherein the steering function comprises front-wheel steering.

Example 154. The network of example 151, wherein the steering function comprises rear-wheel steering.

Example 155. The network of any one of examples 140 to 154, wherein the VCM characteristic comprises a drive function.

Example 156. The network of example 155, wherein the drive function comprises all-wheel drive.

Example 157. The network of example 155, wherein the drive function comprises front-wheel drive.

Example 158. The network of example 155, wherein the drive function comprises rear-wheel drive.

DEFINITIONS

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

a. "computing device"—Any device having a processing unit into which it is possible to install code that can be executed by the processing unit. The installation of the code may be possible even while the device is operative in the field or it may be possible only in the factory.

b. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

c. "explicitly selecting"—Directly and clearly selecting, by a human user, of one option out of multiple options available to human user, leaving no room for doubt and not relying on making deductions by a computing device.

d. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

e. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device. In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

f. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

A display device of a user interface of a computing device may share a common housing with the computing device (e.g. a touch-screen of a tablet), or may be physically separate from the computing device and be in communication with it, either through a physical port (e.g. an HDMI port) or wirelessly. User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

g. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

CONCLUDING COMMENT

All references cited herein are incorporated by reference in their entirety. Citation of a reference does not constitute an admission that the reference is prior art.

It is further noted that any of the embodiments described above may further include receiving, sending or storing instructions and/or data that implement the operations described above in conjunction with the figures upon a computer readable medium. Generally speaking, a computer readable medium (e.g. non-transitory medium) may include storage media or memory media such as magnetic or flash or optical media, e.g. disk or CD-ROM, volatile or non-volatile media such as RAM, ROM, etc.

Having thus described the foregoing exemplary embodiments it will be apparent to those skilled in the art that various equivalents, alterations, modifications, and improvements thereof are possible without departing from the scope and spirit of the claims as hereafter recited. In particular, different embodiments may include combinations of features other than those described herein. Accordingly, the claims are not limited to the foregoing discussion.

What is claimed is:

1. A method of controlling manufacture of a mechanically and electrically compliant Vehicle-Corner-Module (VCM) based vehicle, the method comprising:

a. providing to a display device, associated with a user-operated device, one or more user interface components for manual and explicit selection of one or more initial vehicle characteristics of the vehicle for display thereon;
b. receiving manual and explicit selection of one or more selected initial vehicle characteristics;
c. for the one or more selected initial vehicle characteristics, computing VCM-related mechanical and electrical constraints on a plurality of VCM characteristics, which mechanical and electrical constraints are required for the VCM-based vehicle having the one or more selected initial vehicle characteristics to be compliant;
d. computing a first subset of the plurality of VCM characteristics which are compatible with the VCM-related mechanical and electrical constraints, the first subset being a proper subset of the VCM characteristics;
e. for each VCM characteristic in the first subset, providing to the display device one or more respective user interface components for manual and explicit selection of the VCM characteristic for display thereon, wherein, for each said VCM characteristic, the one or more respective user interface components are provided for display in a specific order;
f. responsive to manual and explicit selection of one or more VCM characteristics in the first subset defining one or more selected VCMs, generating a specification of a mechanically and electrically compliant VCM-based vehicle including the selected initial vehicle characteristics and the one or more selected VCMs.

2. The method of claim 1, further comprising:
g. at least for the one or more selected initial vehicle characteristics, computing additional mechanical and electrical constraints on a plurality of additional vehicle characteristics of the vehicle, which mechanical and electrical constraints are required for the VCM-based vehicle to be compliant;
h. computing a second subset of the plurality of additional vehicle characteristics which are compatible with the additional VCM-based mechanical and electrical constraints, the second subset being a proper subset of the additional vehicle characteristics; and
i. for each additional vehicle characteristic in the second subset, providing to the display device one or more respective user interface components for manual and explicit selection of the additional vehicle characteristic for display thereon, wherein, for each said additional vehicle characteristic, the one or more respective user interface components are provided for display in a second specific order; and
wherein the generating of the specification of the mechanically and electrically compliant VCM-based vehicle is also responsive to manual and explicit selection of one or more additional vehicle characteristics in the second subset.

3. A method of controlling manufacture of a mechanically and electrically compliant Vehicle-Corner-Module (VCM) based vehicle, the method comprising:
a. providing to a display device, one or more user interface components for manual and explicit selection of one or more VCM characteristics of one or more VCMs for display thereon;
b. receiving manual and explicit selection of one or more VCM characteristics of one or more VCMs, to define one or more selected VCMs;
c. for the one or more selected VCMs, computing VCM-based mechanical and electrical constraints on a plurality of vehicle characteristics of the vehicle, which VCM-based mechanical and electrical constraints are required for the vehicle including the one or more selected VCMs to be compliant;
d. computing a subset of the plurality of vehicle characteristics which are compatible with the VCM-based mechanical and electrical constraints, the subset being a proper subset of the plurality of vehicle characteristics;
e. for each vehicle characteristic in the subset, providing to the display device one or more respective user interface components for manual and explicit selection of the vehicle characteristic for display thereon, wherein, for each said vehicle characteristic, the one or more respective user interface components are provided for display in a specific order; and
f. responsive to manual and explicit selection of one or more vehicle characteristics in the subset, generating a specification of a mechanically and electrically compliant VCM-based vehicle including the one or more selected VCMs and the selected one or more vehicle characteristics.

4. The method of claim 1, wherein the one or more selected VCMs include at least two VCMs, a first of the at least two VCMs being of a first type, and a second of the at least two VCMs being of a second type, the second type being different from the first type.

5. The method of claim 4, wherein at least one of the first and second types being selected from the group of a VCM having a steering function, a VCM devoid of a steering function, a VCM having a drive function, and a VCM devoid of a drive function.

* * * * *